United States Patent [19]
Anglin et al.

[11] Patent Number: 5,862,322
[45] Date of Patent: Jan. 19, 1999

[54] METHOD AND APPARATUS FOR FACILITATING CUSTOMER SERVICE COMMUNICATIONS IN A COMPUTING ENVIRONMENT

[75] Inventors: David M. Anglin, Roswell; Vernon J. Adams, Norcross; Julia C. Walker, Marietta; Kevin P. Kleinfelter, Atlanta; Michael T. Nugent, Kennesaw, all of Ga.

[73] Assignee: Dun & Bradstreet Software Services, Inc., Atlanta, Ga.

[21] Appl. No.: 601,972

[22] Filed: Feb. 15, 1996

Related U.S. Application Data

[63] Continuation of Ser. No. 271,947, Jul. 7, 1994, abandoned, which is a continuation-in-part of Ser. No. 213,022, Mar. 14, 1994.

[51] Int. Cl.⁶ ..................................................... G06F 11/00
[52] U.S. Cl. ................................... 395/185.1; 395/183.22
[58] Field of Search .......................... 395/183.01, 183.22, 395/184.01, 185.01, 185.02, 182.02, 185.1, 200.36, 200.53, 200.54

[56] References Cited

U.S. PATENT DOCUMENTS

| | | |
|---|---|---|
| 4,464,543 | 8/1984 | Kline et al. . |
| 4,937,825 | 6/1990 | Ballard et al. ......................... 371/20.1 |
| 5,287,505 | 2/1994 | Calvert et al. .......................... 395/600 |
| 5,295,244 | 3/1994 | Dev et al. ............................... 395/161 |
| 5,309,448 | 5/1994 | Boüloutas et al. ................. 395/183.22 |
| 5,333,183 | 7/1994 | Herbert .................................... 379/112 |
| 5,367,667 | 11/1994 | Wahlquist et al. ................. 395/183.22 |
| 5,446,883 | 8/1995 | Kirkbride et al. ................. 395/200.01 |
| 5,568,618 | 10/1996 | Motoyama ......................... 395/183.22 |

OTHER PUBLICATIONS

Douglas E. Comer "Internetworking with TCP/IP" vol. 1 Chapter 9,14. Published 1991.

*Primary Examiner*—Albert DeCady
*Attorney, Agent, or Firm*—Troutman Sanders LLP; Joel S. Goldman, Esq.

[57] ABSTRACT

A method and apparatus is provided for facilitating end user support communications in a computing environment, wherein a product request may be initiated, and forwarded to a product administrator for review and resolution. The product request may be either initiated by the end user, or may automatically be initiated by the end user's computer in response to a serious error. In the latter case, diagnostic information is automatically captured and included in the product request, so that the product administrator may know the state of the end user's machine when determining the cause of the problem. In one embodiment, if the product administrator is unable to resolve the problem, he may access a database maintained by the vendor of the software and/or forward the product request to the vendor for resolution.

25 Claims, 75 Drawing Sheets

Microfiche Appendix Included
(31 Microfiche, 2968 Pages)

ACTIVITY - 210

Class Registration

Possible EVENTS - 220

(1) Add Class
   (2) Delete Class
   (3) Change Class

FIG. 5

NEXT STEP - 230

(1) Next Activity/Task (250) to be performed
(2) User/Group of Users responsible for performing the Next Activity/Task (250)
(3) Message revealing to the user/group of users the nature of the Next Activity/Task (250)

FIG. 6

TABLE 1000

| | COLUMN 1 | COLUMN 2 | COLUMN 3 |
|---|---|---|---|
| ROW 1 | | | |
| ROW 2 | | | |
| ROW 3 | | | |
| ⋮ | | | |

FIG. 10

Product Request - TSITH 6/17/93 11:52:17

Request Information

Product: SmartStream 2.0   Type: Question

Description:
I have a question about using folders.
-- Saved by TSITH and sent to SJONE on 6/17/93 11:53:01

Short Desc: Question about using folders:

User Information
Name: Tom Sithers   User: TSMITH   Date Created: 6/17/93 11:52:17
Phone: 555-1212   Ext: 6

For Product Administrator Use
Product Administrator: SJONE   Status: New
Reference Number:   Request Priority:

Product Request - GMCML 5/26/93 19:59:38

Diagnostic Information

User: GMCML          Date Created: 5/26/93 19:59:38

Diagnostic Information:

4401

Runtime Information

Error Number     = 22
Error Test       = Unknown object type: mam0010_activity_master
Window/Menu      = pc10040_open
Object           = pc10040_open
Object Event     = pc10040_open
Line             = 49

4402

Application Information

Window ID        =
Window Title     = Activity
Activity ID      =
DBMS Vendor      = Sybase

| Change User | |
|---|---|
| User | Name |
| CCURT | Cynthia Curtis |
| JLAWR | Jane Lawrence |
| VWALK | Vernon Walker |
| SGREE | Sidney Green |
| PHARP | Pat Harper |
| DVANN | David VanNess |
| SBRAD | Sara Bradley |
| CMOOR | Chris Moore |
| SOMAL | Sam O'Malley |

[ OK ]  [ Cancel ]  [ Help ]

FIG. 53

METHOD AND APPARATUS FOR FACILITATING CUSTOMER SERVICE COMMUNICATIONS IN A COMPUTING ENVIRONMENT

CROSS-REFERENCE TO RELATED APPLICATION

This is a continuation of application Ser. No. 08/271,947, filed on Jul. 7, 1994, now abandoned, which is a Continuation-in-Part of U.S. patent application Ser. No. 08/213,022, filed on Mar. 14, 1994.

REFERENCE TO MICROFISCHE APPENDIX

A microfische appendix containing a computer program listing has been filed with this application. The appendix contains 31 microfische with 2968 total frames.

BACKGROUND OF THE INVENTION

1. Technical Field

This invention relates generally to administering end user support in a computing environment, and more particularly to a method and apparatus for providing communications between an end user, a product administrator and/or customer support service personnel.

2. Description of the Prior Art

The use of computer systems as a means of gathering and processing information has become commonplace in modern business (and other types of) organizations. Both the hardware underlying such computer systems, and the software which operates on this hardware, have necessarily become sophisticated and complex, given both the constant innovation in this technological field, as well as the ever-increasing demands of the end user. With sophistication and complexity often comes an enhanced difficulty (at least perceived) from the end user's viewpoint in learning how to use the computer system, as well as a greater chance for error (bugs) when designing the underlying software code.

In the past, it was often difficult for the vendor of software (and hardware) to assist the end user when the end user encountered a "problem" when running the software. Because of the inherent complexity of a sophisticated piece of software, much time and effort had to be taken by the vendor and/or the local administrator of the computer system to determine what had happened, and to further determine whether the "problem" occurred due to the end user's misunderstanding of how the software operated, or whether the "problem" was truly an error in coding (a bug) which needed to be fixed by the vendor. In either case, determining the cause of the "problem" could be a grueling task.

For example, if an end user of a piece of software running on the computer system encountered a situation which required assistance from the local system administrator or vendor, the end user would typically telephone or send an electronic mail message to the system administrator in an attempt to describe what led to the problem. Often, the system administrator would not immediately understand the problem due to the inherent complex nature of modern software applications, and would need to spend additional time with the end user determine the exact nature of the problem.

Even if the system administrator did understand what led to the problem, the system administrator might not understand how to resolve the problem, and would often need to contact the software vendor for further assistance. This would cause additional delay in the resolution of the problem. Finally, either the system administrator acting alone, or the system administrator working with a representative of the vendor would (hopefully) solve the problem, but not without much time and effort (and hence cost) in manually trying to recreate the problem to isolate the problem (or fix the bug).

The above-described shortcomings, and other shortcomings of prior art techniques for providing support for an end user in a computer system are effectively overcome by the present invention, as described in further detail below.

SUMMARY OF THE INVENTION

A method and apparatus is provided for facilitating end user support communications in a computing environment, wherein a product request, which in essence may be an electronic message containing data which support personnel might need in order to solve a problem, may be initiated, and forwarded to a product administrator for review and resolution. The product request may be either initiated by the end user, or may automatically be initiated by the software running on the end user's computer in response to a serious error. In the latter case, diagnostic information is automatically captured and included in the product request, so that the product administrator may know the state of the vendor's software when determining the cause of the problem. This allows the vendor's support personnel to know information (e.g., line number, parameters, error message number, etc.) about the state of the software at the time of the error. In one embodiment, if the product administrator is unable to resolve the problem, he may access a database maintained by the vendor of the software to solve the problem him or herself and/or forward the product request to the vendor for resolution.

BRIEF DESCRIPTION OF THE DRAWINGS

FIG. 5 depicts an example of an activity and associated events.

FIG. 6 depicts the primary information contained in a next step according to a preferred embodiment of the present invention.

FIG. 10 depicts the structure of a table according to a preferred embodiment of the present invention.

FIGS. 43 through 53 depict sample user interface windows which may be used in conjunction with the Product Request/Smartstream Assistant feature of the present invention, in a preferred embodiment.

DETAILED DESCRIPTION OF THE INVENTION

The present invention is a component of the invention disclosed in co-pending U.S. patent application Ser. No. 08/213,022, filed on Mar. 14, 1994, and is subject to assignment to the assignee of record for this prior filed application. application Ser. No. 08/213,022 is therefore incorporated herein by reference thereto.

Co-pending U.S. patent application Ser. No. 08/213,022 discloses (along with the present invention) a process and apparatus for facilitating the flow of information to complete predefined procedures within an organization. One of the inventions taught in that application facilitates the flow of information by providing a novel method for logically and automatically routing information through a predefined sequence of activities to users who need the information. The invention taught by the present application is designed, in a preferred embodiment, to work in conjunction with the above-described invention taught in application Ser. No. 08/213,022. The above-described invention of application Ser. No. 08/213,022 (referred to as "The Underlying Activity Manager Smartstream Technology") will first be described in detail below, and the present invention (referred to as "The Smartstream Assistant and Product Request Component") will be described thereafter.

The Underlying Activity Manager Smartstream Technoloqy

Figure 1:
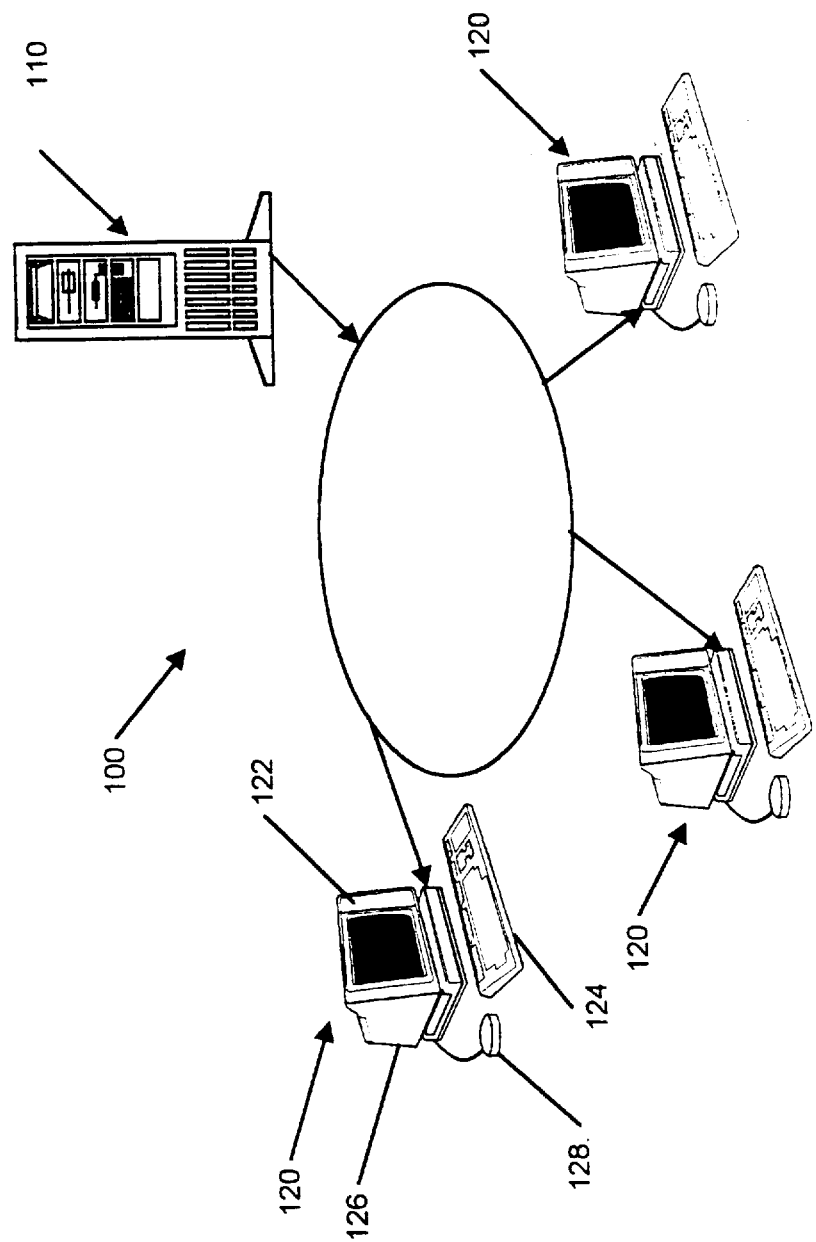
FIG. 1 depicts a diagram of a client/server network.

The computer system 100 of the present invention is preferably implemented on a client/server network 100 as shown in FIG. 1. The client/server network 100 includes a server 110, such as an HP/UX, Data General DG-UX, Microsoft NT, IBM RS/6000, or an OS/2 server, connected to a plurality of clients 120, also known as end user workstations. Each end user workstation preferably includes a terminal 126 which has a screen 122, a keyboard 124, a mouse 128, and a memory device. The end user workstations 120 may be an IBM compatible PC running MS-DOS and Microsoft Windows or their equivalent. The preferred client/server network of the present invention is a Novell Netware or a PC LAN. Though these are the preferred clients, servers, and client/server networks, as may be appreciated by one of ordinary skill in the art, suitable equivalents may be used.

A more complete understanding of the aforementioned component aspects of the present invention may be obtained by reference to Sections I-I through I-VII, infra. These sections are included as a part of the present specification, and the section reference Roman numerals (e.g., "Section I-I", etc.) are included at the top of the first page of the respective sections. This convention is used to identify the remaining sections referenced throughout the present specification.

Figure 2:
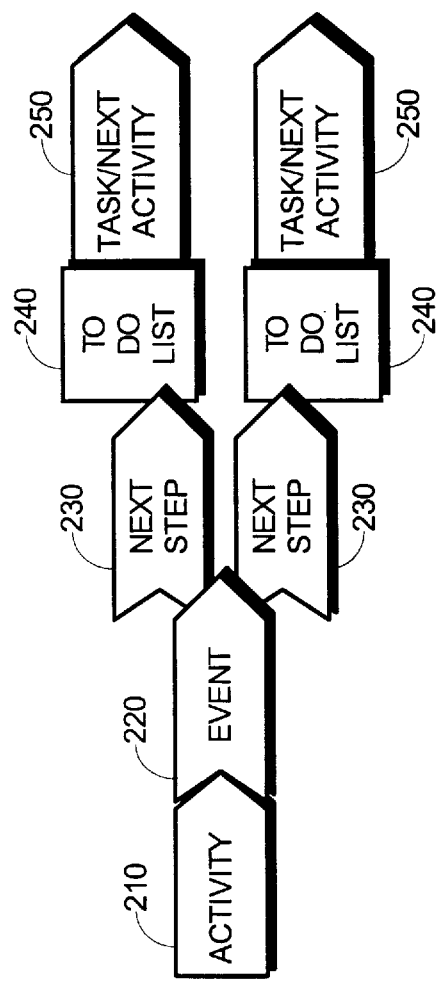
FIG. 2 depicts a flow diagram of the basic information flow process according to the present invention.

Referring to FIG. 2, a flow chart is shown which depicts the basic flow process for the present invention. This flow process assures that information is routed through the organization's predefined information flow path to the users who need it.

Figure 3:
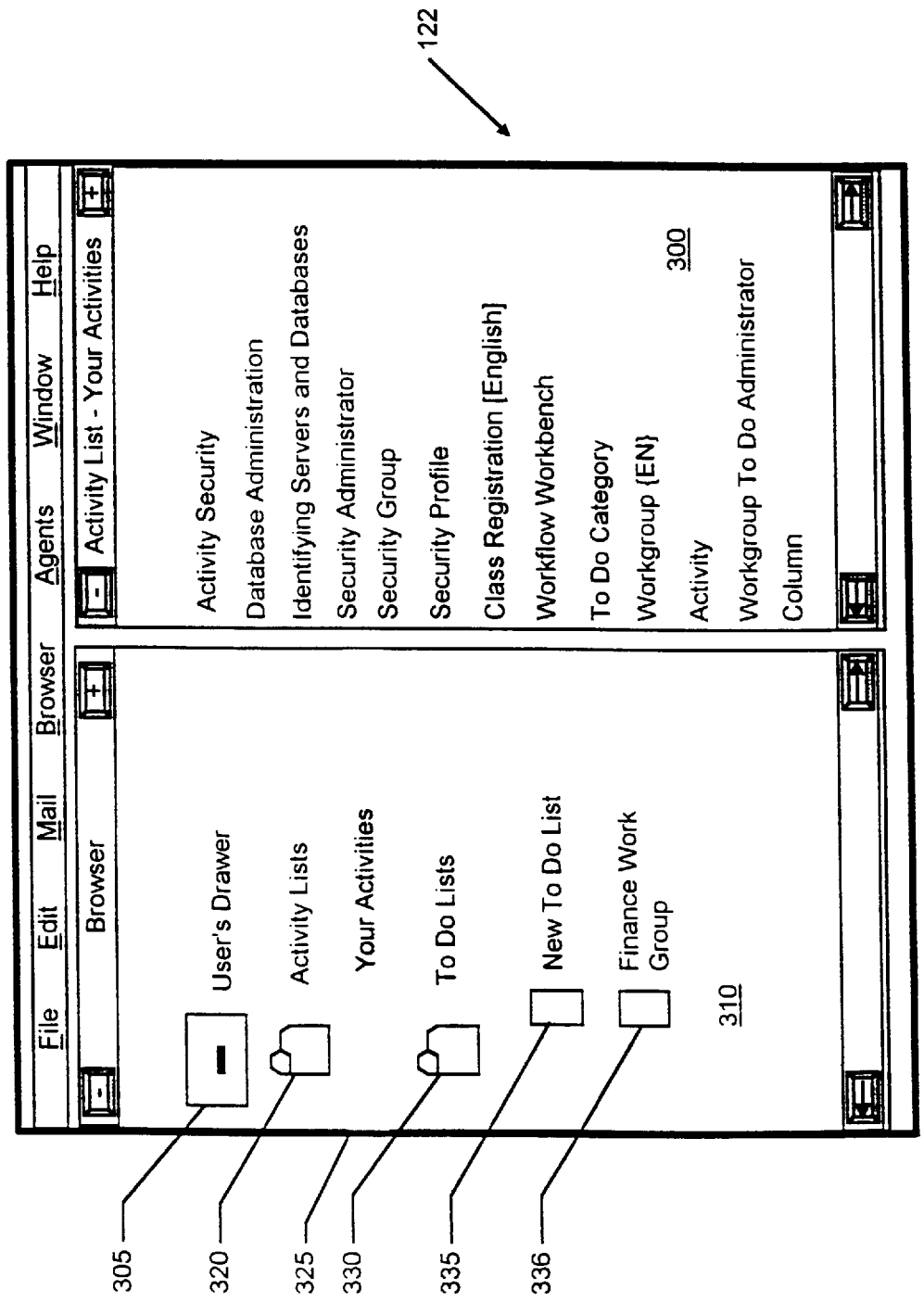
FIG. 3 depicts a computer screen, according to a preferred embodiment of the present invention, displaying a user's drawer, folders and lists.

In a preferred embodiment, a user may access the computer system 100 of the present invention from an end user workstation 120 (see FIG. 1). As shown in FIG. 3, the computer system of the present invention searches the user's drawer 305 to provide an Activity Lists folder 320 and a To Do List folder 330 on the user's computer terminal screen 122. These are preferably displayed in a Browser mode window 310.

A more complete understanding of the aforementioned component aspects of the present invention, may be obtained by reference to Sections II-I through II-IV, infra.

The Activity Lists folder 320 may contain one or more lists of activities that the user may select and act upon. In this example, the Activity Lists folder 320 contains a "Your Activities" To Do List 325. The To Do Lists folder 330 may contain one or more lists of tasks to be completed by the user or the user's work group. In this example, the To Do List folder 330 contains a "New To Do List" To Do List 335 and a "Finance Workgroup" To Do List 336. The Activity Lists folder 320, To Do Lists folder 330 and the contents of both folders may be displayed using a commercially available graphic user interface such as Microsoft Windows.

In this example, the user selects a list from either the Activity Lists folder 320 or To Do Lists folder 330. If the user selects the "Your Activities" list 325, the system provides a list of available activities 300 for the "Your Activities" list 325. This selection may be made, for example, by clicking over the chosen activity 210 with the mouse 128 or by cursoring over the chosen activity 210 with the tab key and hitting the return key on the keyboard 124.

In response to the user's selection of a list, the system displays a list 300 of available activities or tasks. For this example, the user's "Your Activities" list 325 contains such activities as Activity Security, Database Administration and Class Registration [English]. The user may then select an activity 210 from the list 300. The system responds to the selection by displaying a screen relating to the activity 210 to be acted upon.

Figure 4:
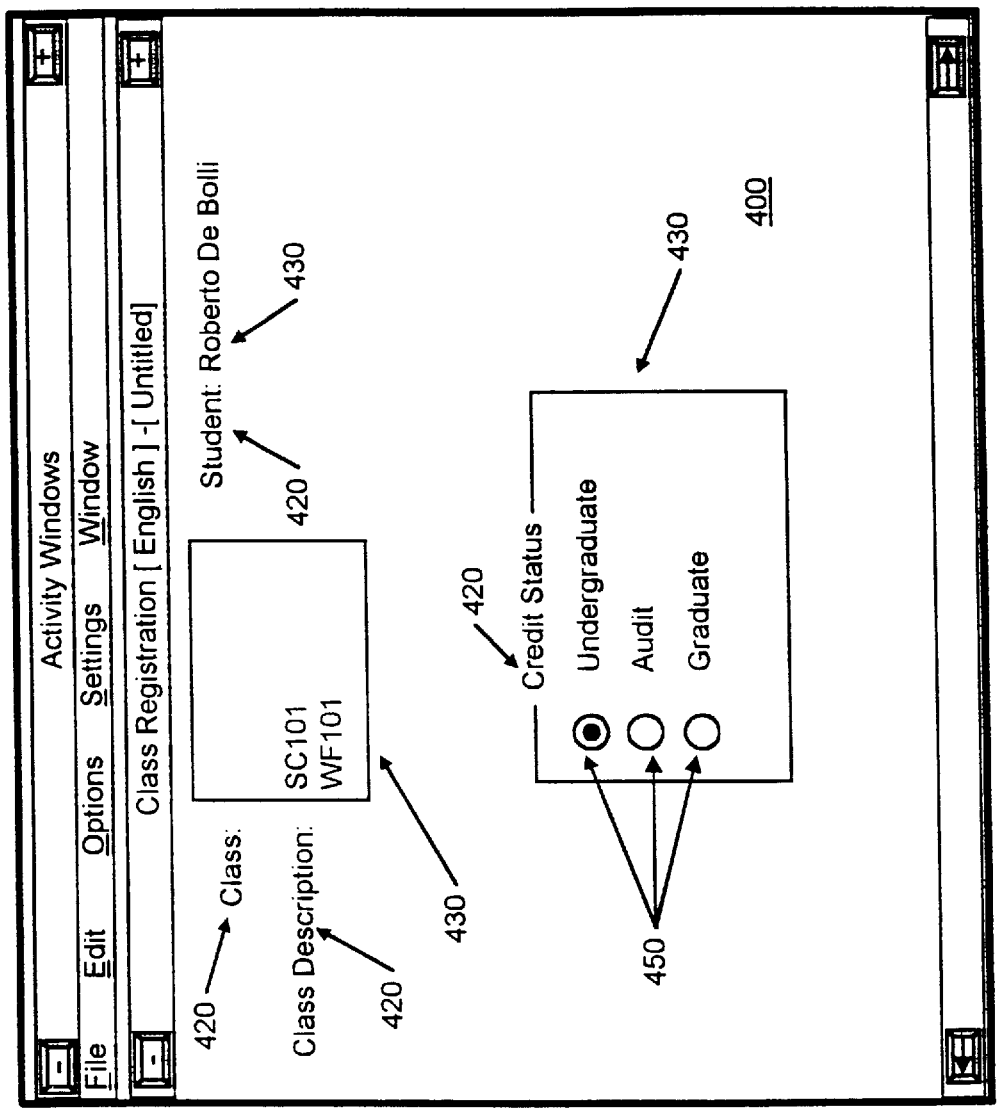
FIG. 4 depicts a computer screen, according to a preferred embodiment of the present invention, displaying an activity window.

FIG. 4 illustrates a screen which the system displays in response to the user choosing the Class Registration [English] activity 210 from his or her "Your Activities" list 325 (see FIG. 3). The Class Registration activity is displayed in an activity window 400, which preferably reveals information in the form of headings 420 and values 430.

To illustrate, the activity window 400 for a user attempting to register for a class may reveal the headings 420 as class, student, class description and credit status. Examples of values 430 associated with the credit status heading 420 are undergraduate, graduate, and audit. The activity window 400 also typically includes prompts, also referred to as blank fields, 450. Examples of prompts 450 in the activity window 400 are shown to the left of the undergraduate, graduate, and audit values 430 under the credit status heading 420. These prompts 450 may be filled in to represent information input by the user. In this example, the student/user has filled in the prompt 450 to the left of the undergraduate value 430. In a preferred embodiment of the present invention, other information may be entered by the student/user by simply clicking over the chosen value 430 with the mouse 128 (see FIG. 1) or cursoring over the chosen value 430 with the tab key on the keyboard 124 (see FIG. 1).

Referring back to FIG. 2, after all of the information or data required for activity 210 has been entered by the user, the user acts to indicate to the system that the chosen activity 210 has been completed and the data supplied by the user during performance of activity 210 should be saved. In a preferred embodiment, the user may make their indication using the mouse 128 to "click over" a "save file" icon on the computer screen 122 which, in a preferred embodiment, resembles a floppy disk (not shown). Alternatively, the user may depress the keyboard "Control" and "S" keys simultaneously (see FIG. 1). After the data relating to activity 210 has been saved and the user indicates that the activity 210 has been completed, the system triggers one of the events 220 associated with the activity 210.

An event 220 is a representation of a set of conditions stored in the computer system in accordance with the present invention. Whenever the set of conditions for an event is satisfied, the corresponding event is triggered. Each activity 210 has one or more events 220 associated with it. Additional software stored in the computer system, which, for example, may be written in Power Builder, COBOL, or C programming languages, chooses an appropriate one of the events 220 for execution. Three events that may be executed during the course of the performance of an activity are, for example, "add," "delete" and "change." As illustrated in FIG. 5, three events identified when a user has selected the class registration activity may be "add class," "delete class," or "change class." Each of these events may be chosen for execution in response to a corresponding action by the user.

Referring back to FIG. 2, when an event 220 is chosen, a stored procedure makes a determination of all possible next steps 230 which are associated with that event 220. After the event 220 determines which next steps 230 are associated with it, the event makes a further determination as to which next steps 230 are to be chosen. This determination assures that a next user or group of users is able to perform a next activity 250, also referred to as a task 250, associated with the information entered by the user and/or data input from an automated process, such as an MRP system.

As shown in FIG. 6, a next step 230 may include the following information: (1) the next activity/task 250 to be performed; (2) the user/group of users responsible for performing the next activity/task 250; and (3) a message revealing to the user/group of users the nature of the next activity/task 250 to be acted upon. The next step 230 may also contain information or data disclosing the name of the entity within the organization in which the user/group of users fall under, which is ultimately responsible for performing the next activity/task 250. The list of information shown in FIG. 6, as described, is merely exemplary of the types of information that may be included in the next step 230.

Referring back to FIG. 2, based on the information contained in the chosen next steps 230, the computer system sends a message, representative of an associated category of next activity/task 250, to the To Do List 240 of the user or the group of users responsible for performing the next activity/task 250. Once the message is added to the To Do List 240 for the user or the group of users, the next activity/task 250 may be selected, viewed, and acted upon by the user associated with the To Do List 240 in a similar fashion as described for selecting the initial activity 210 which started the flow of the current information.

Figure 7:
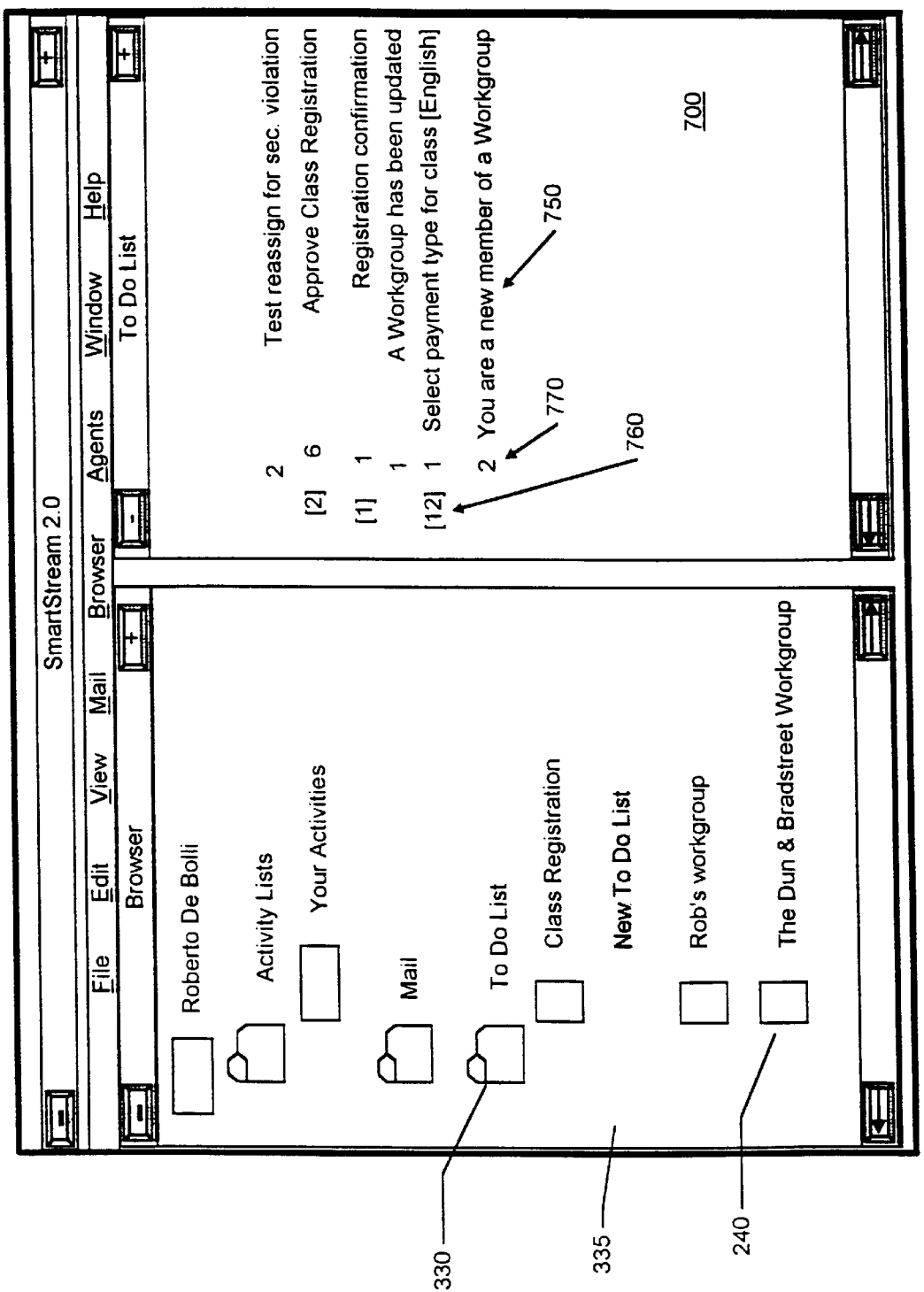
FIG. 7 depicts a computer screen, according to a preferred embodiment of the present invention, displaying a user's To Do Lists in the user's To Do List folder and an exemplary user's personalized To Do list containing next activities.

As shown in FIG. 7, a user may select a next activity/task 250 (see FIG. 2) from one or more To Do lists 240 located in the user's To Do List folder 330. In a preferred embodiment, a user may select a message 750 from a user's To Do List 700 personalized for the user. Alternatively, he or she may select a message 750 from the work group's To Do List 800 (see FIG. 8). In this example, the user selects the "New To Do List" 335 from the To Do Lists Folder 330.

To illustrate, the "New To Do List" 335 represents the user's personalized To Do List 700 set up for the user. Types of next activities/tasks 250 represented as messages 750 available to this user in his or her "New To Do List" To Do List window 700 are "Approve class registrations", "Registration confirmation," and "Select payment type for class [English]". These messages 750 represent next activities/tasks 250 categories subsequent to the initial activity 210 of class registration. In a preferred embodiment, the To Do list window 700 also displays the number of done/completed 760 and new 770 next activities/tasks 250 to the left of each message 750. In this example, the To Do list window 700, to the left of the "Approve class registrations" message 750, reveals that there are eight next activities/tasks 250 for this category, where six are new 770 and two are done 760.

Figure 8:
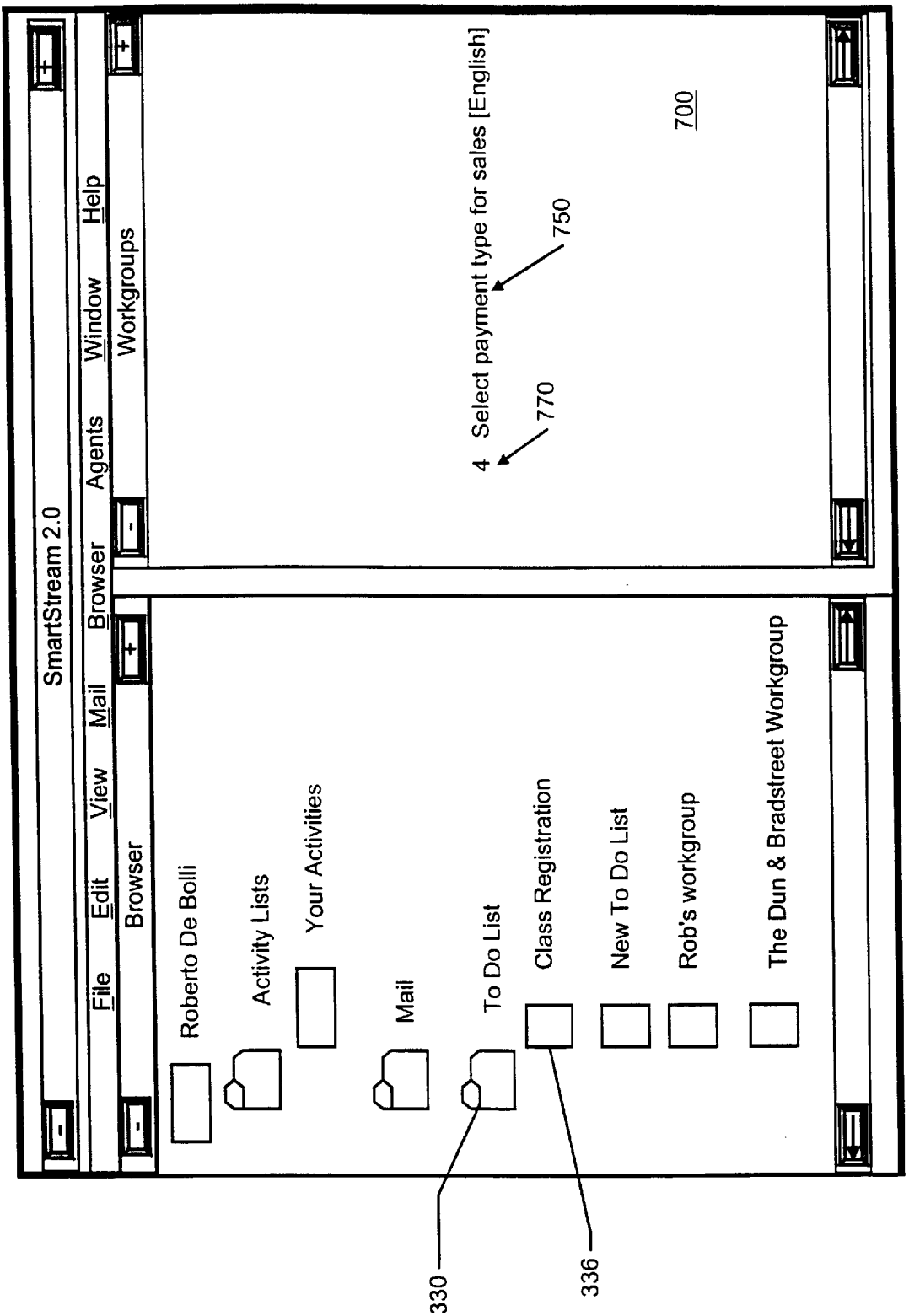
FIG. 8 depicts a computer screen, according to a preferred embodiment of the present invention, displaying a user's To Do Lists in the user's To Do list folder and an exemplary work group To Do list containing next activities.

Referring to FIG. 8, the user may also select a next activity/task 250 from a work group To Do List 700. This work group To Do List may be used when it does not matter which user among a group of users completes the next activity/task 250. For this example, the user has selected the Class Registration work group To Do List 336 from the To Do Lists folder 330. The message 750 revealed in the Class Registration work group To Do List is "Select payment type for class." This message 750 represents a next activity/task 250 subsequent to a prior user registering for a class. The user has four new 770 next activity/tasks 250 associated with this message 750.

Once the user selects the next activity/task 250 from the user's personalized To Do List 700 (see FIG. 7) or the user's work group To Do List 700 (see FIG. 8), referring to FIG. 2, the process for the flow of information which occurred after the initial activity 210 was selected may be repeated. As described above, the process would include the user entering relevant information into the activity window 400 (see FIG. 4) for the next activity/task 250, the user triggering an event 220, one or more next steps 230 being determined, and a corresponding message 750 (see FIG. 7) being added to the To Do List 240 of the user or work group responsible for performing the next activity/task 250. This cycle, inclusive of the user accessing the next activity/ task 250 from the relevant To Do List 240, may continue until each piece of information is pushed entirely through the organization's predefined information flow path.

Figure 9:
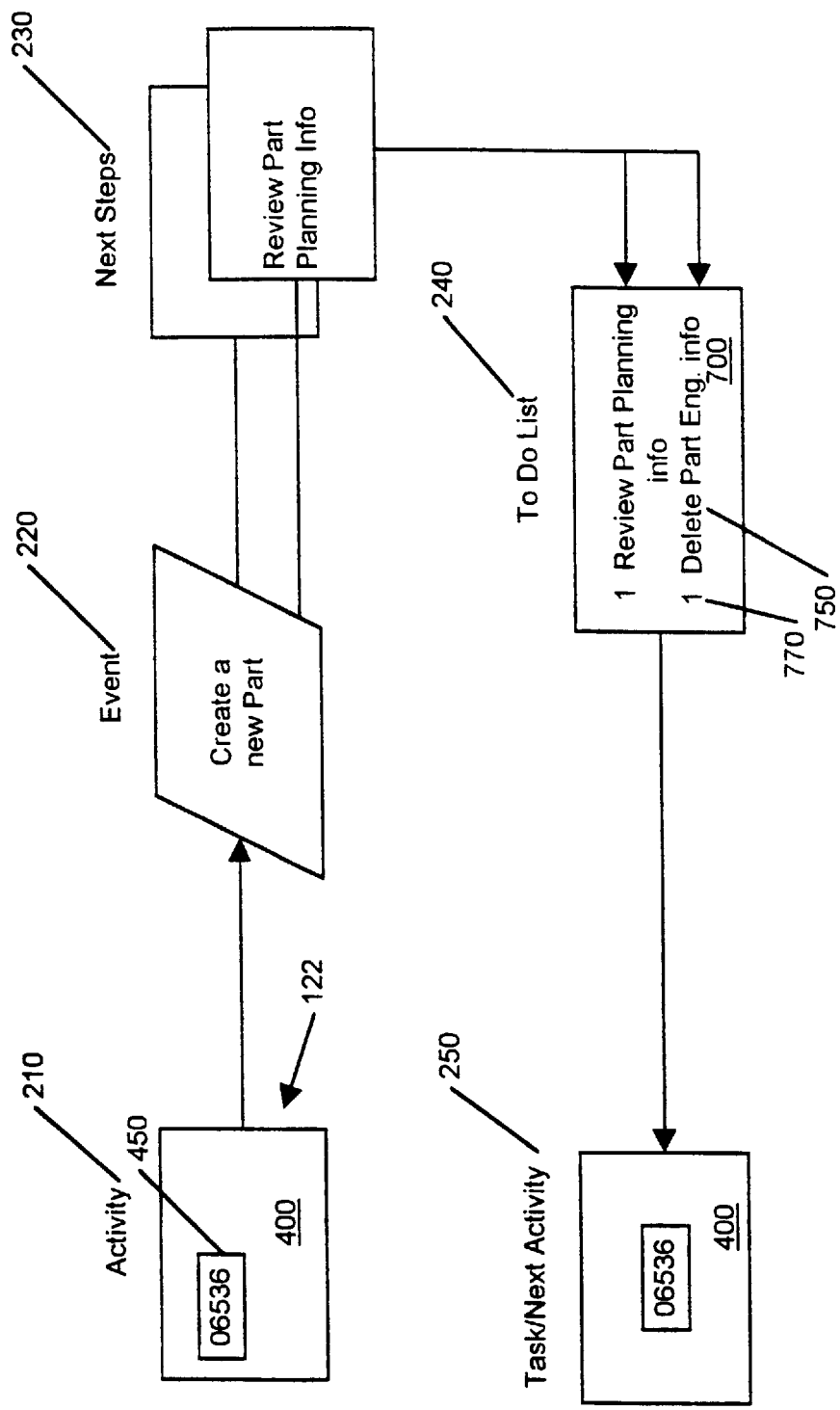
FIG. 9 depicts an illustrative example of the basic information flow process depicted in FIG. 2.

An example of the information flow process of the present invention is illustrated in FIG. 9. This example shows how the information flow process of the present invention is implemented, where the activity to be performed is to add a new part to a system for controlling a manufacturing operation.

In this example, the user (e.g., an engineer) chooses the "Part" activity 210 from his or her activity list (not shown) in order to create a new part for a manufacturing process within the organization. In response to this choice, the system displays a "Part" activity screen on the engineer's terminal screen 122 within activity window 400. This window 400 includes a prompt area 450, in which the engineer enters the number of the part (i.e., "06536").

When the engineer appropriately signals the system that the activity 210 is complete, the system responds by triggering execution of one of the events 220 associated with the activity 210. In this example, the event 220 triggered is the "Create a new Part" event 220.

The software "create a new part" event 220 then makes decisions based upon the addition of the part number to determine the next steps 230 to be undertaken in this flow process. For this example, the next steps 230 are "Review Part Planning information" to be done by the manufacturing manager and "approve part planning" (not shown) to be done by the quality department manager.

The "review part planning information" message 750, representative of a next activity/task 250 category, is then displayed by the system in the manufacturing manager's To Do List 240. In this example, the manufacturing manager has two messages 750, "Review part planning info" and "Define Part Eng. info.", listed in his personalized ("Things to do") To Do List window 700. The manufacturing manager may then select the "Review Part Planning info." message from his To Do List window 700, and the next activity/task 250 associated with this message is displayed in the manager's next activity/task window 400. Finally, this process for the flow of information through the organization is repeated as the manager enters relevant information into the window 400 for the next activity/task 250. The present invention then triggers an event 220 for determining the next steps 230 in the organizations procedure, and a message 750 representative of a next activity/task 250 category is added to another user's or work group's To Do List 240. As discussed above, this cycle continues until each piece of information is routed entirely through the organization's predefined information flow path (i.e., appropriately acted upon by all appropriate personnel in the organization in the proper sequence).

A more complete understanding of the aforementioned component aspects of the present invention may be obtained by reference to Sections III-I through III-III, infra.

Set forth below is a description of the computer software for implementing a presently preferred embodiment of the present invention. As one of ordinary skill in the art would understand and appreciate, the following is merely one way of implementing the invention and many equivalent ways exist to achieve the same functions and results of the invention.

Referring to FIG. 1, application programs are created using PowerBuilder code (application development software available from Powersoft, of Burlington, Mass.) and are stored on the client side 120 of the client/server network 100. Tables and stored procedures are created using SQL (Structured Query Language) code and are stored on the server side 110. Though PowerBuilder and SQL are the preferred software tools for the present invention, one of ordinary skill in the art would appreciate that the present invention could be implemented with many other equivalent types of software and/or development tools.

In a preferred embodiment, the PowerBuilder software is the preferred tool for creating the main application program of the present invention and the specific application programs to execute the windows 400 (see FIG. 4) for each activity 210 and next activity/task 250 (see FIG. 2). On the other hand, the SQL software is used primarily to create tables and stored procedures which interact with the tables and the PowerBuilder application programs to send information (e.g., data) back and forth on the network 100 (see FIG. 1). In a preferred embodiment, the stored procedures are compiled and then interpreted by SQL engines.

A more complete understanding of the aforementioned component aspects of the present invention may be obtained by reference to Sections IV-I through IV-IV, infra.

Referring to FIG. 10, data may be stored in a table 1000, also known as a database structure, in rows 1010, also referred to as records, and columns 1020, also referred to as fields. Examples of tables utilized by the present invention and the relationships of these tables with one another are illustrated by FIGS. 11–15.

The COLUMN_MASTER table 1330 (see FIG. 13) is used for mapping most of the columns in the tables by having certain information related to the columns in each table stored in this table. In a preferred embodiment, information on the column includes the column identifier (COL_ID), which is a numerical value representative of the position for that column in the COLUMN_MASTER table 1330; the column name (COL_NAME), which is the name the column is referred to in the other tables; the column label (COL_LABEL), which is the label used for viewing in the various windows; the column type (COL_TYPE), such as database datatype (i.e., character, integer, datetime, etc.); the column length (COL_LENGTH), which represents the size of the column; and the event column number (EVENT_COL_NBR), which is used to correlate an event identifier (EVENT_ID) in the EVENT_MASTER table 1220 with its particular column identifiers (COL_Ids).

Figure 15:
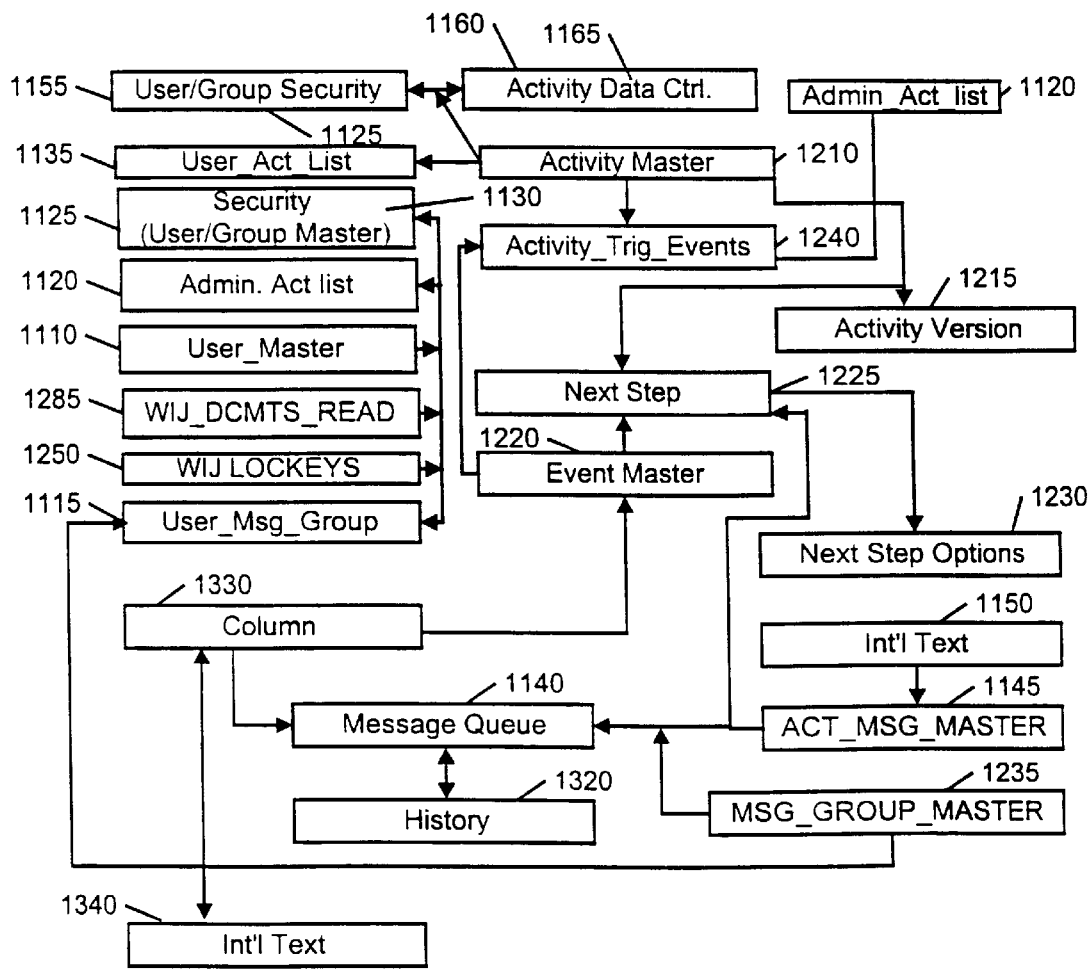

FIG. 15 shows some of the primary tables 1000 used in a preferred embodiment of the present invention. Each line between two tables indicates that information (e.g., data) between these tables 1000 is shared in a one-to-many relationship. The head of the arrow (black dots in FIGS. 11–14) at one end of each line positioned next to one of the tables 1000 indicates that the table may have many rows (records) which are associated with one row (record) of the table 1000 positioned at the other end of the line.

Set forth below is a description of how, in a preferred embodiment, the applications programs, stored procedures, and tables 1000 interact to implement the information flow process of the present invention.

The software of the present invention is activated to begin executing when a user logs onto the computer system (e.g., client/server network) 100 from his or her end user workstation (e.g., an IBM compatible PC) 120 as described for FIG. 1. After the user logs onto the system, the screen 122 on the user's terminal 126, as shown in FIG. 3, reveals the Browser mode window 310 which is preferably created with PowerBuilder software.

A more complete understanding of the aforementioned component aspects of the present invention may be obtained by reference to Section V-I, infra.

Figure 16A:
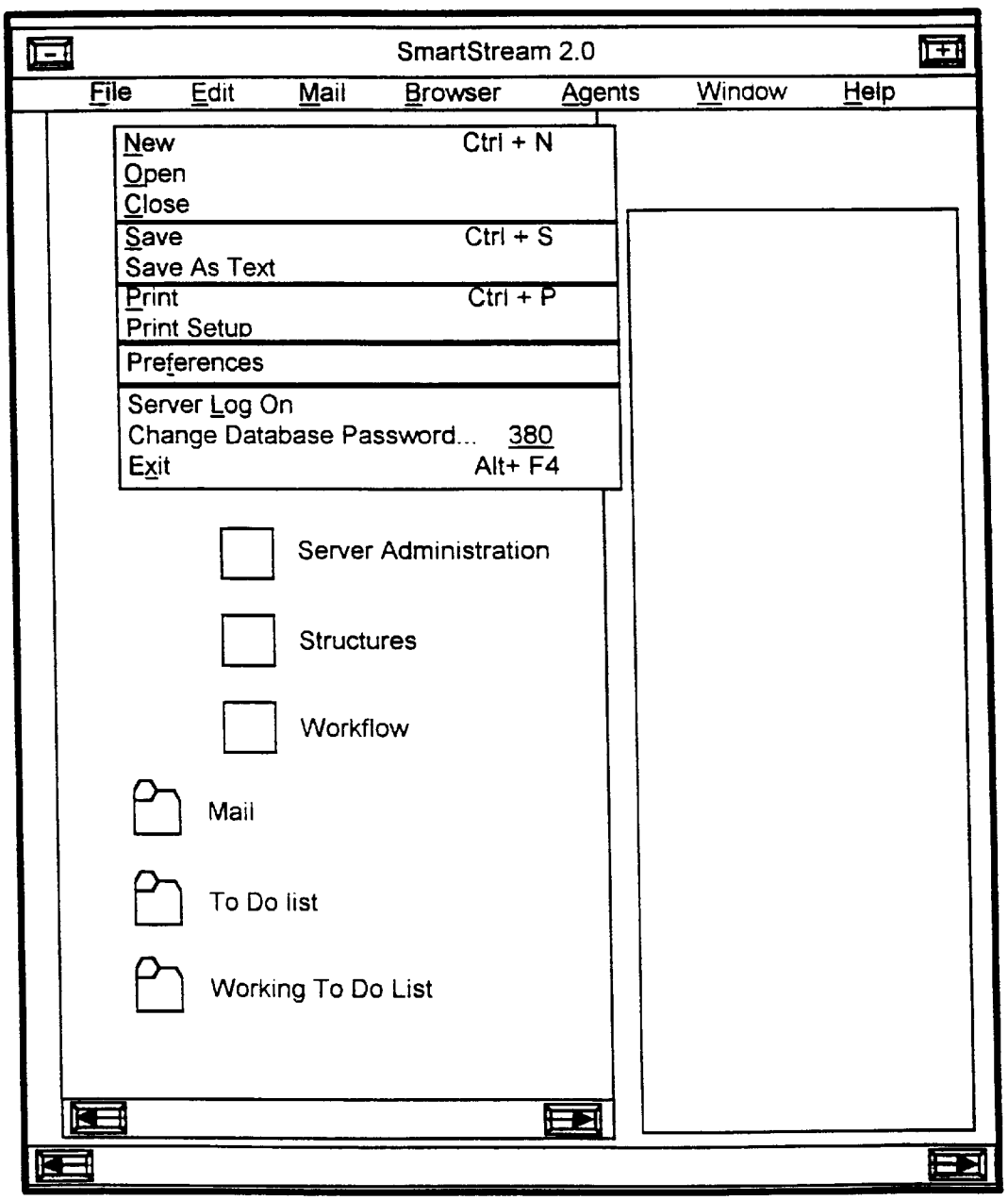
FIG. 16A depicts a computer screen, according to a preferred embodiment of the present invention, displaying the File mode where the user may select the New command to create an activity list.
Figure 16B:
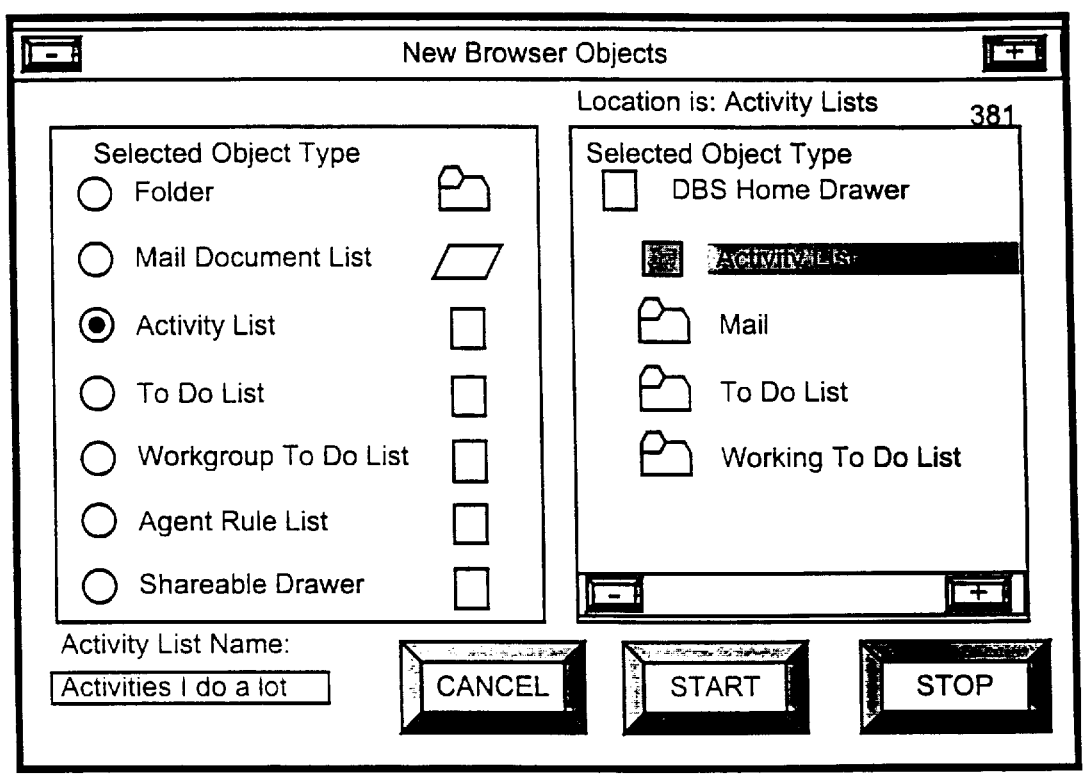
FIG. 16B depicts a computer screen, according to a preferred embodiment of the present invention, displaying the New Browser Objects window, where the user may name an activity list and select the location for the activity list.

Referring to FIG. 16A, a user may create an activity list for his or her Activity Lists folder 320 by accessing the File mode and choosing the New (Ctrl+N) selection from the File list window 380. As shown in FIG. 16B, a "New Browser Objects" window 381 is displayed by the system in response to the above action by the user. The user then selects the "Activity List" as the new object type and enters the new activity list name (e.g., "Activities I do a lot") in the bottom left hand corner of the window. Finally, the user chooses which drawer (e.g., "DBS Home Drawer") and folder (e.g., "Activity List Folder") in which to put the activity list. The user also has the option to put the activity list in a drawer without putting the activity list into a folder.

A more complete understanding of the aforementioned component aspects of the present invention may be obtained by reference to Section VI-I, infra.

In response to the above user inputs, the main application program sends the user's drawer number (referred to as the DRAWERNO in the tables), the folder number (FOLDERNO) assigned to the activity list, the description (DESCR) of the list (e.g., Activity List), and the location of the list (PARENTFOLDERNO) (e.g., the number assigned to the Activity List folder) from the client to a stored procedure at the server. In one embodiment, the name of the stored procedure is FOLDER$insert_1. The stored procedure then stores this information in the WIJ_FOLDER table 1255 (see FIG. 12) and sends a message to the main application program that the information has been stored.

Each activity list is identified and stored under a corresponding folder number (FOLDERNO). The WIJ_FOLDERS table 1255 (see FIG. 12) is used to keep track of all FOLDERNOs. The CONTAINSIND column in the WIJ_FOLDERS table 1255 indicates whether the FOLDERNO refers to a folder or to a list. More details on the WIJ_FOLDERS table 1255 are provided below.

Figure 16C:
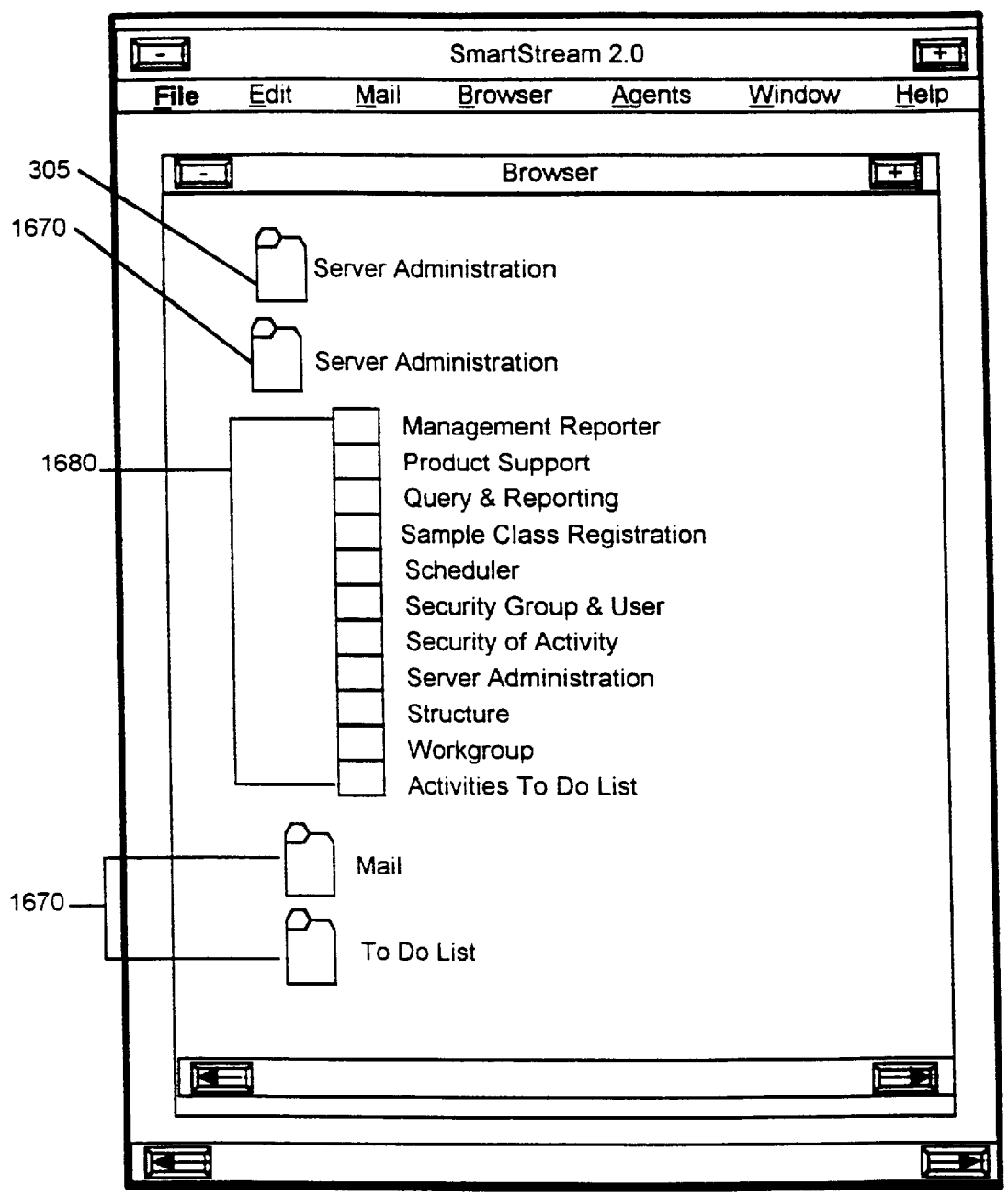
FIG. 16C depicts a computer screen, according to a preferred embodiment of the present invention, displaying the Browser mode which reveals all folders and lists for a user's drawer, where a user may select to add lists to folders.

Referring to FIG. 16C, the user may add activities to an activity list by accessing, the Browser mode. The Browser mode window 310 reveals all folders 1670 and the activity lists 1680 or To Do Lists (not shown) contained within the folders 1670 for a particular drawer 305 of the user. The user may then select an activity list 1680 in which to add activities.

If an activity list 1600 is empty, as is the "Activities I do a lot" list 1680, then the activity list representation will be blank. However, if the activity list 1680 contains one or more activities or next activities/tasks, then the activity list representation will contain horizontal lines.

Figure 16D:
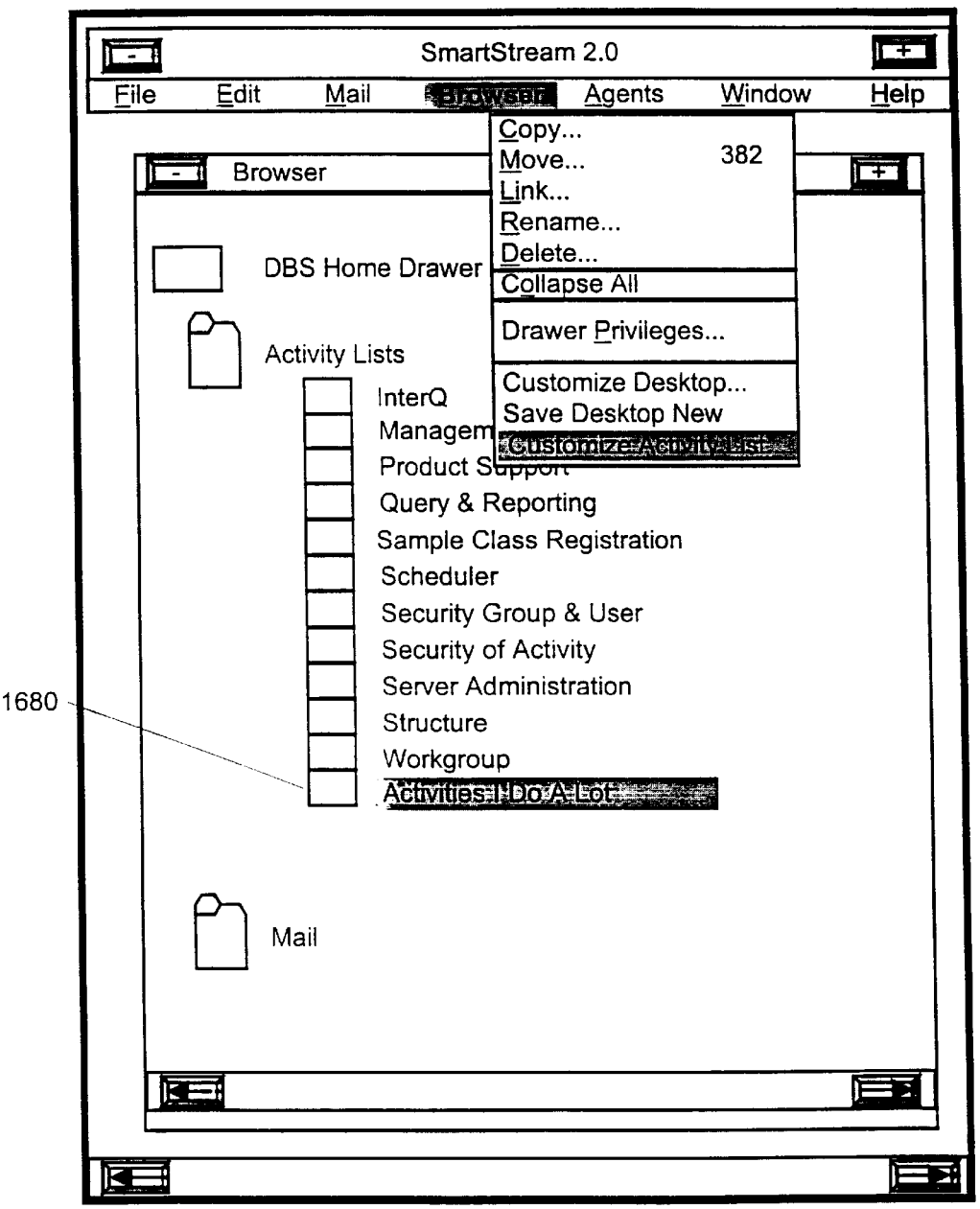
FIG. 16D depicts a computer screen, according to a preferred embodiment of the present invention, displaying the Browser list window, where the user may select the Customize Activity List command to add an activity to an activity list.

A user may add activities to an activity list by selecting, for example, the "Activities I do a lot" list 1680 in which to add one or more activities. Next, referring to FIG. 16D, the user selects the Browser list window 382 and chooses the Customize Activity List command from the Browser list window 382.

Figure 16E:
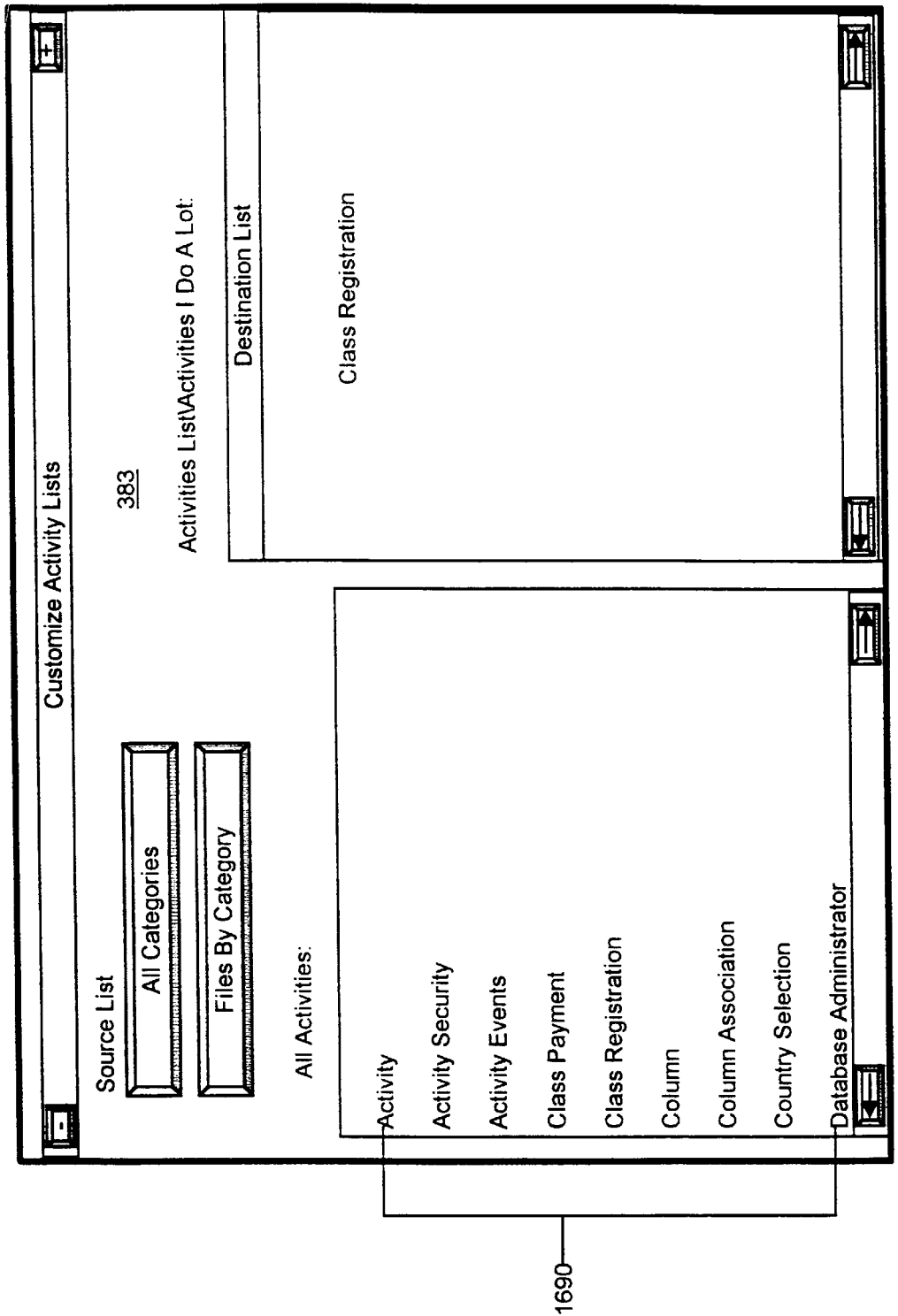
FIG. 16E depicts a computer screen, according to a preferred embodiment of the present invention, displaying the Customize Activity List window, where the window reveals a list of activities the user may access.

Referring to FIG. 16E, in response to the above actions of the user, the main application program displays a list of activities that the user may access in a Customize Activity List window 383. (The access is preferably based on security privileges predefined by an administrator of the system which is discussed further below). In determining which activities the user may access, the main application program sends the user's identifier (USER_ID) to a stored procedure. In one embodiment, the name of the stored procedure is psp_sel_avail_user_acts_1. This stored procedure then accesses the USER_SECURITY table 1125 (see FIG. 11) to determine which user specific activities, represented as activity identifiers (ACTIVITY_Ids), the user has security privileges.

Next, the stored procedure accesses the USER_MASTER table 1110 (see FIG. 11) to obtain group security identifiers (SEC_GROUP_Ids) associated with the user's USER_ID. The stored procedure then accesses the GROUP_SECURITY table 1155 (see FIG. 11) to determine which activities (ACTIVITY_Ids) the user, as a member of a group of users (work group), may access. Next, the stored procedure accesses the ACTIVITY_MASTER table 1210 (see FIG. 12) and uses the ACTIVITY_Ids to obtain a description of each activity (ACTIVITY_DESC) that the user may access. Finally, the stored procedure sends the ACTIVITY_Ids and each activity's corresponding activity description (ACTIVITY_DESC) back to the main application program at the client.

The main application program then displays each of the activities 1690 in the Customized Activity List window 383. The user may then decide which activities he or she will choose to put in an activity list by selecting specific activities from the display. In this way, a list may be created, where the list may include user specific and/or work group specific activities.

After the user has selected the activities to store in an activity list, such as "YOUR ACTIVITIES" list, the main application program sends the USER_ID, FOLDERNO, ACTIVITY_Ids and any sequencing of activities for the list (SEQ_NBR) to a stored procedure at the server. In one embodiment, the name of the stored procedure is psp_ins_usal_1. This stored procedure then accesses the USER_ACT_LIST table 1135 (see FIG. 11), where the stored procedure creates a row for each ACTIVITY_ID. The USER_ID and FOLDERNO are both stored in each row created for each ACTIVITY_ID. Moreover, the SEQ_NBR, if any, for each activity is also stored in the row for each ACTIVITY_ID. In a preferred embodiment of the invention, if no sequencing information is selected for the activity by the user, then all non-sequence specific activities will be listed in alphabetical order in the activity list.

After the stored procedure stores the activity information for a particular activity list in the USER_ACT_LIST table 1135, the stored procedure sends a message to the main application program at the client to this effect. The main application program then waits for the user to decide which action he or she wants to perform next.

Figure 16F:
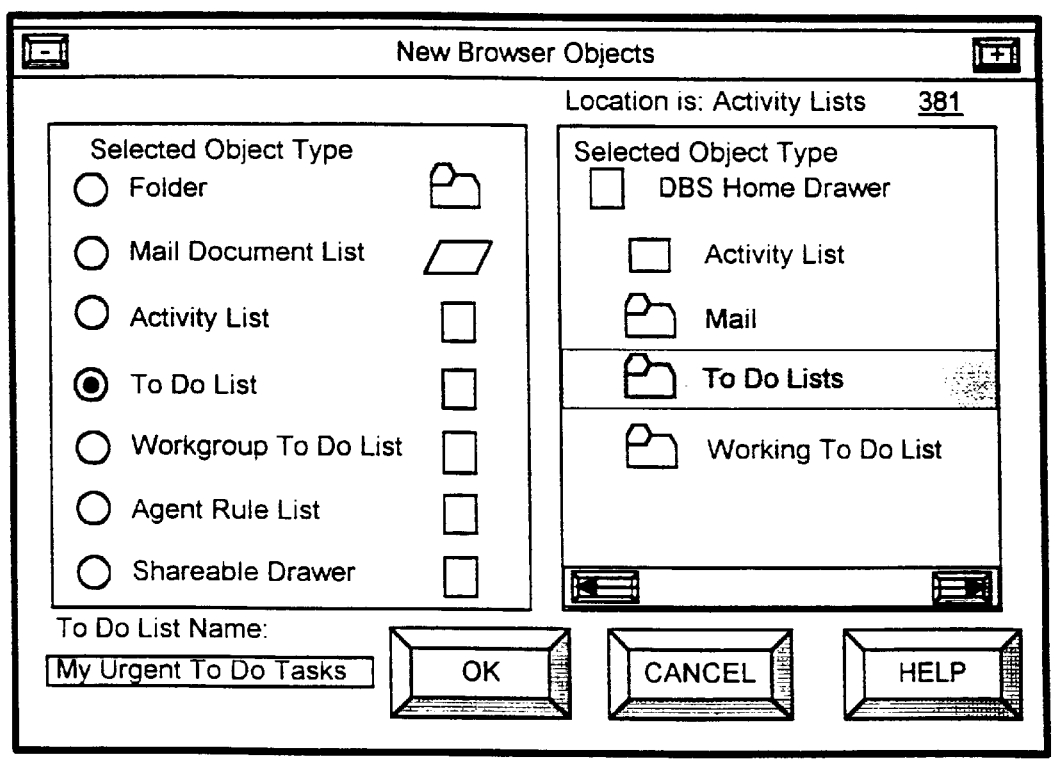
FIG. 16F depicts a computer screen, according to a preferred embodiment of the present invention, displaying the New Browser Objects window where the user may name a To Do List and Select the location for the To Do list.

A user may also create a To Do List for his or her To Do List folder 330 (see FIG. 3) by accessing, in a preferred embodiment, the File mode and choosing the New (Ctrl+N) selection from the File List window 380 (see FIG. 16A). As shown in FIG. 16F, the user then selects the "To Do List" as the object type and enters the new To Do List name (e.g., "My Urgent To Do Tasks") in the bottom left hand corner of the "New Browser Objects" window 381. Finally, the user chooses which drawer (e.g., "DBS Home Drawer") and folder (e.g., "To Do Folder") to put the To Do List. The main application program then sends the user's drawer number (DRAWERNO), the folder number (FOLDERNO) assigned to the To Do List, the description (DESCR) of the list (e.g., the To Do List), and the location of the list (PARENTFOLDERNO) (e.g., the number assigned to the To Do List folder) to a stored procedure. In one embodiment, the name of the stored procedure is FOLDER$insert_1. This stored procedure then stores this information in the WIJ_FOLDERS table 1255 (see FIG. 12) and sends a message to the main application program that the information has been stored.

Figure 16G:
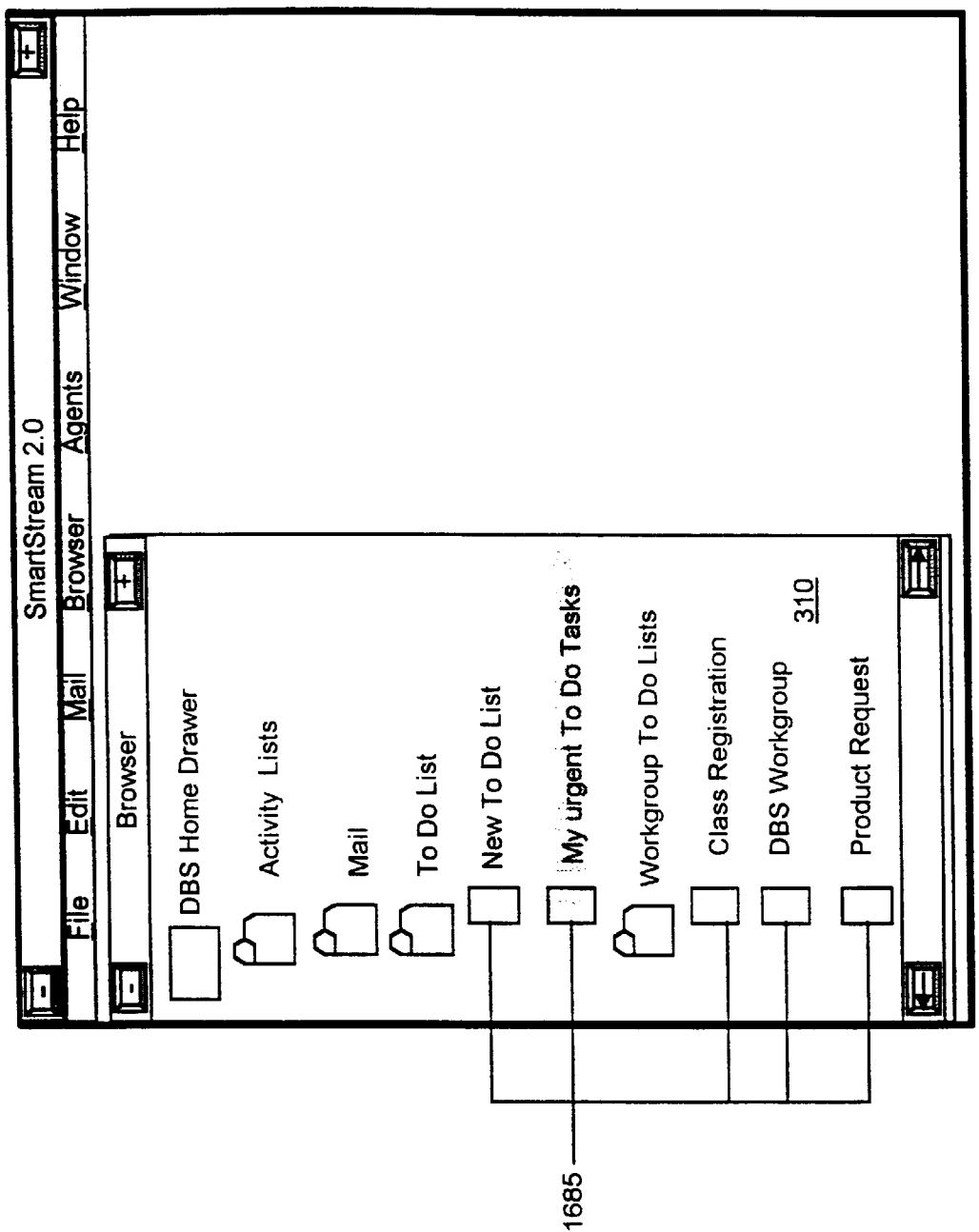
FIG. 16G depicts a computer screen, according to a preferred embodiment of the present invention, displaying the Browser mode which reveals all folders and lists for a user's drawer, where the user may select a To Do List in which to add a next activity category.

Referring to FIG. 16G, the user may move next activities/tasks categories from one To Do List 1685 to another To Do List 1685 by accessing the Browser mode. The user may then select a To Do List 1685 in which to add a next activity/task category. Like the activity lists 1680 (see FIG. 16C), the representations for the To Do Lists are blank when empty and contain horizontal lines when they contain one or more next activities/tasks.

Figure 16H:
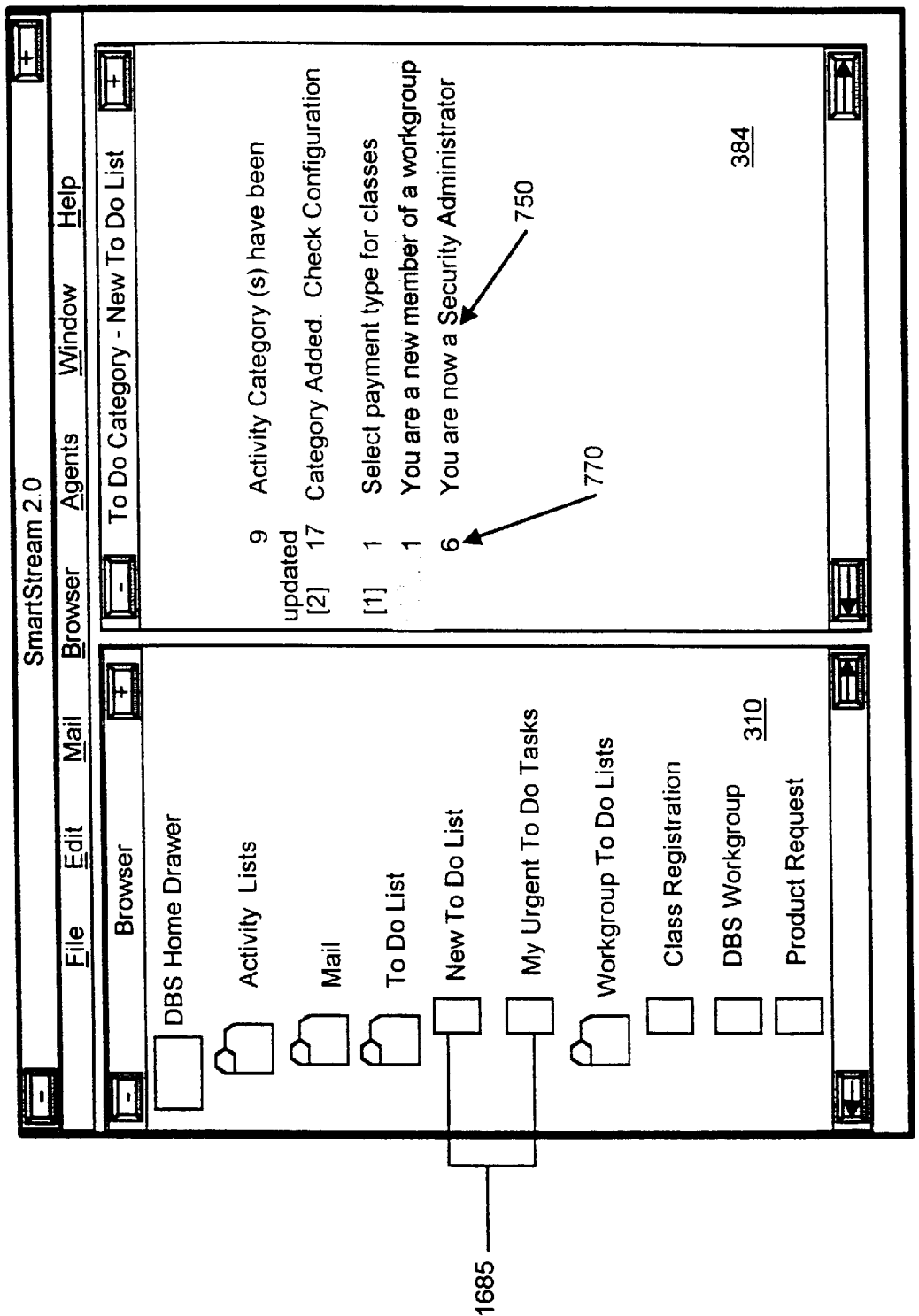
FIG. 16H depicts a computer screen, according to a preferred embodiment of the present invention, displaying a To Do List containing a plurality of next activity categories.

The user moves a next activity/task category from one To Do List 1685 to another To Do List 1685 by selecting a To Do List 1685 which contains one or more next activity/task categories. As shown in FIG. 16H, the user selects the "New To Do List" To Do List 1685 from the Browser mode list window 310. The main application program then accesses a stored procedure to determine all next activities/tasks currently stored in the "New To Do List" To Do List 1685. Details on how the main application program and the stored procedure work together to compile the list of currently stored next activities/tasks is described below.

Next, the main application program displays these next activities/tasks organized by the message 750 representative of the next activity/task category in a Summary To Do Category window 384. The user then selects a next activity/task category to move to another To Do List 1685. For this example, the user selects the "You are a new member of a Workgroup" next activity/task category, which contains one uncompleted 770 next activity/task to be moved to another To Do List 1685.

Figure 16I:
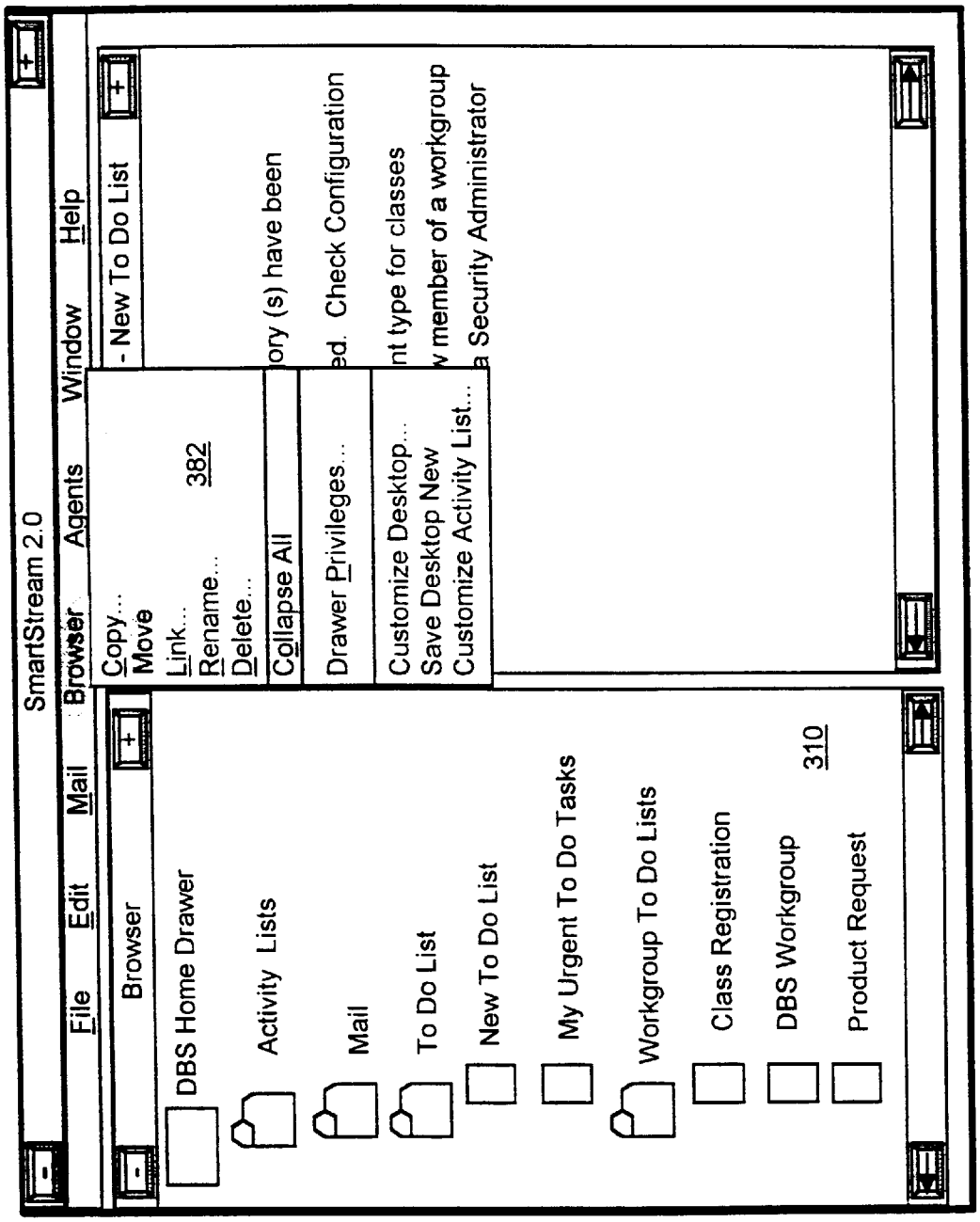
FIG. 16I depicts a computer screen, according to a preferred embodiment of the present invention, displaying the Browser list window, where the user may select the Move command to move a next activity category from the current To Do List to another To Do List.
Figure 16J:
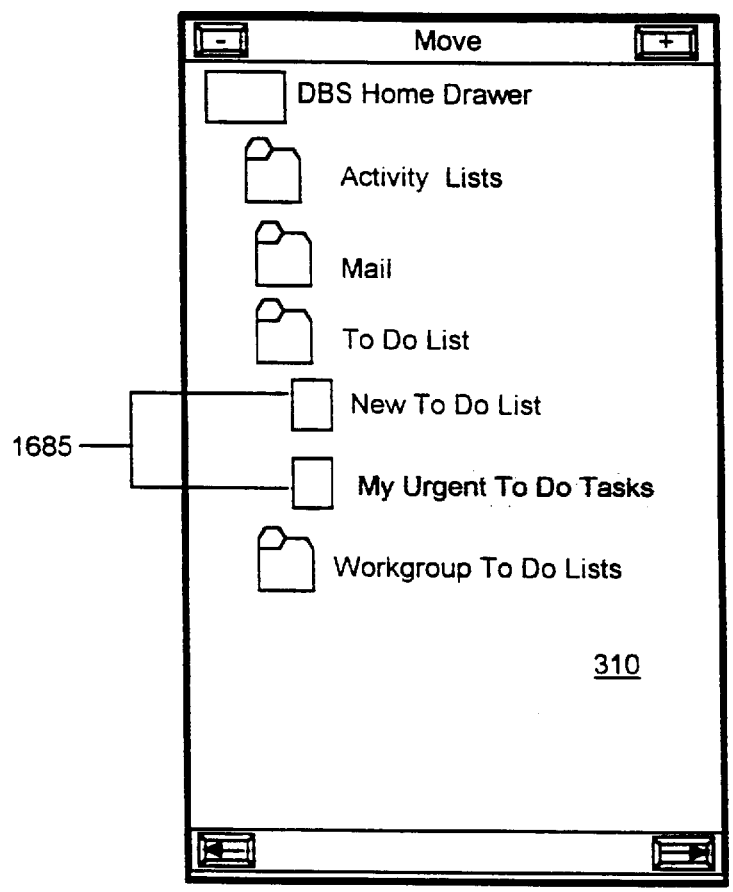
FIG. 16J depicts a computer screen, according to a preferred embodiment of the present invention, displaying the Move mode list window which reveals a list of possible To Do Lists for the user to choose to move a next activity category.
Figure 16K:
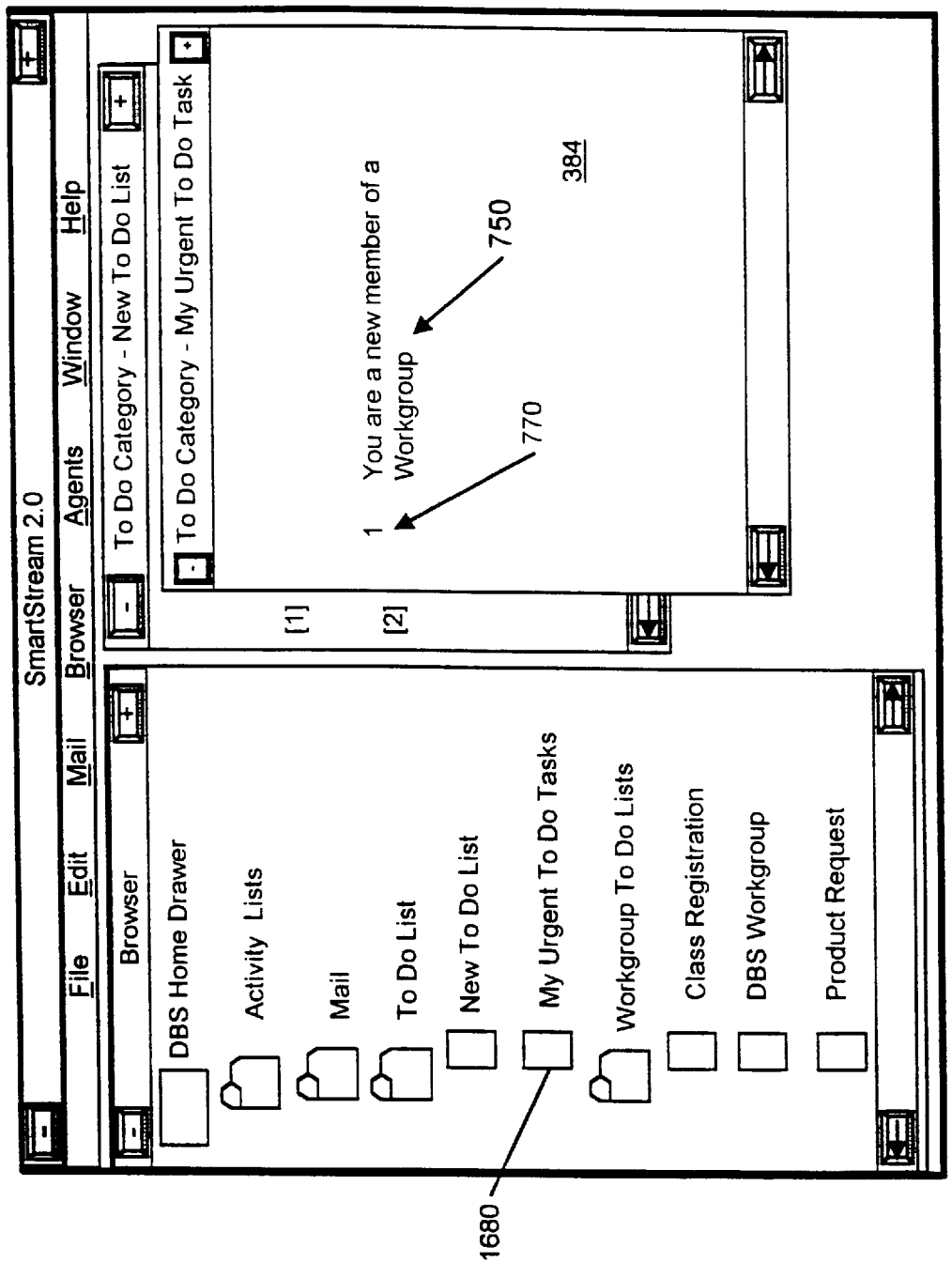
FIG. 16K depicts a computer screen, according to a preferred embodiment of the present invention, displaying a To Do List containing a next activity which has been moved by the user to this To Do List.

Finally, as shown in FIG. 16I, the user selects the Browser list 382 and chooses the Move command from the Browser list 382. As shown in FIG. 16J, the main application program then reveals a list of possible To Do Lists 1685 in the Move mode list window 310 for the user to choose to move the next activity/task category. For this example, the user selects the "My urgent To Do Tasks" To Do List 1685. Therefore, as shown in FIG. 16K, when the user accesses the "My urgent To Do Tasks" To Do List in the Summary To Do List window 384, the "You are a new member of a Workgroup" message 750 next activity/task category with its one uncompleted next activity/task is revealed.

Figure 16L:
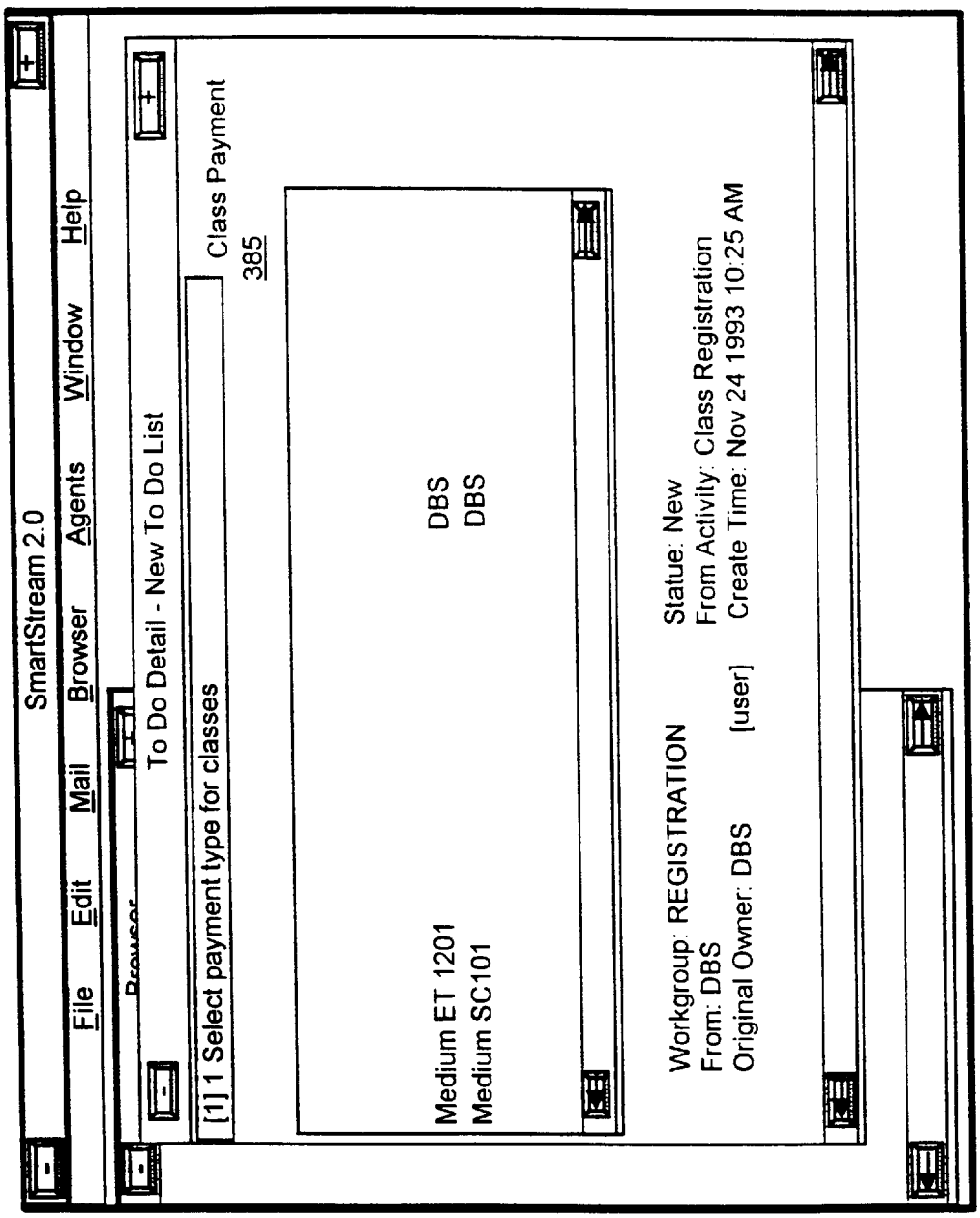
FIG. 16L depicts a computer screen, according to a preferred embodiment of the present invention, displaying a To Do List containing individual next activities, where the user may select to move an individual next activity to another To Do List.

Referring to FIG. 16L, the user may also move individual next activities/tasks from one To Do List 1685 to another To Do List 1685. The user accomplishes this by selecting a To Do List containing next activities/task while in the Browser mode (not shown). The user then accesses the Detail To Do Category window 385 and a list of each individual next activity/task is revealed for a particular next activity/task category within the To Do List.

Figure 16M:
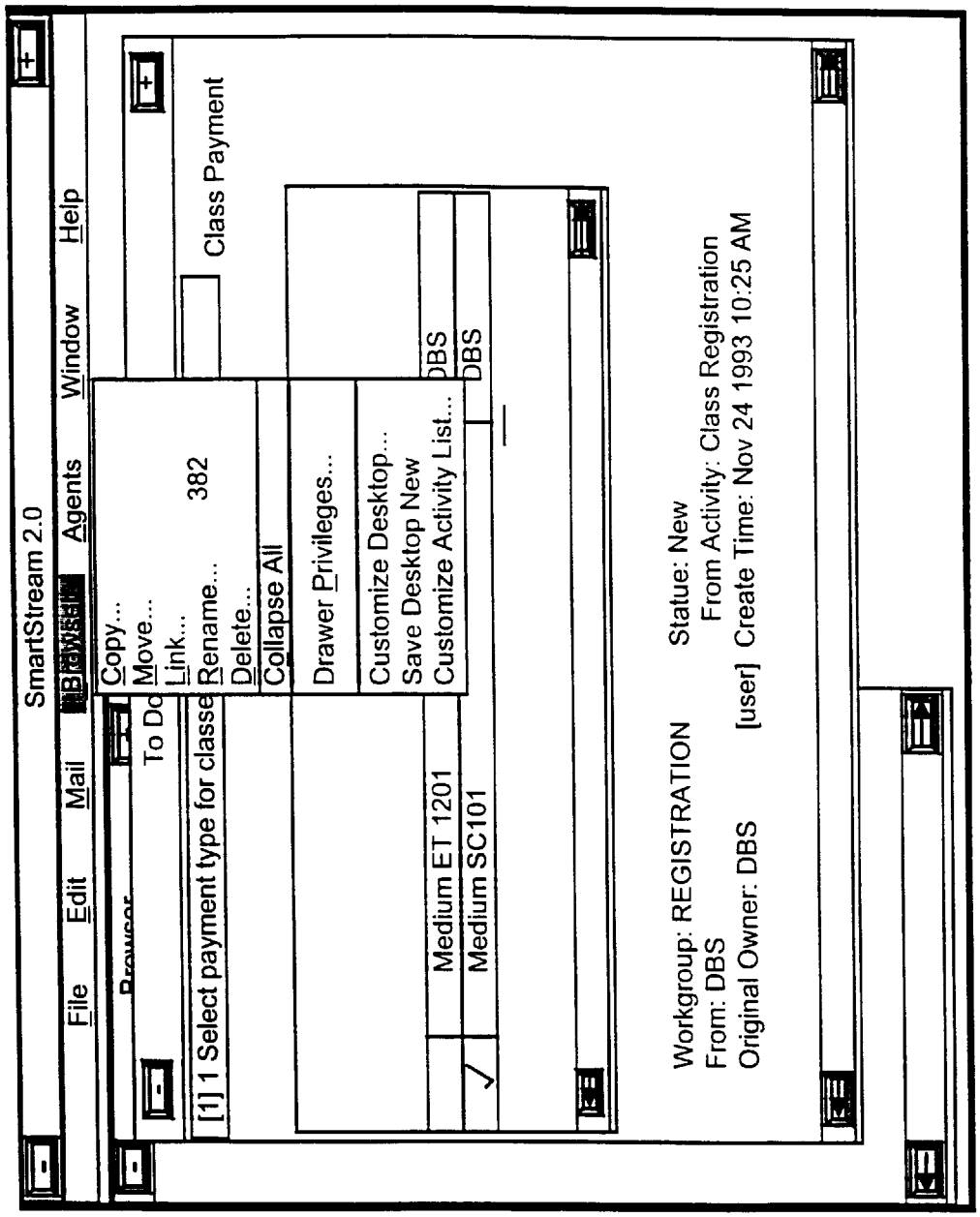
FIG. 16M depicts a computer screen, according to a preferred embodiment of the present invention, displaying the Browser list window, where the user may select the Move command to move an individual next activity from the current To Do List to another To Do List.
Figure 16N:
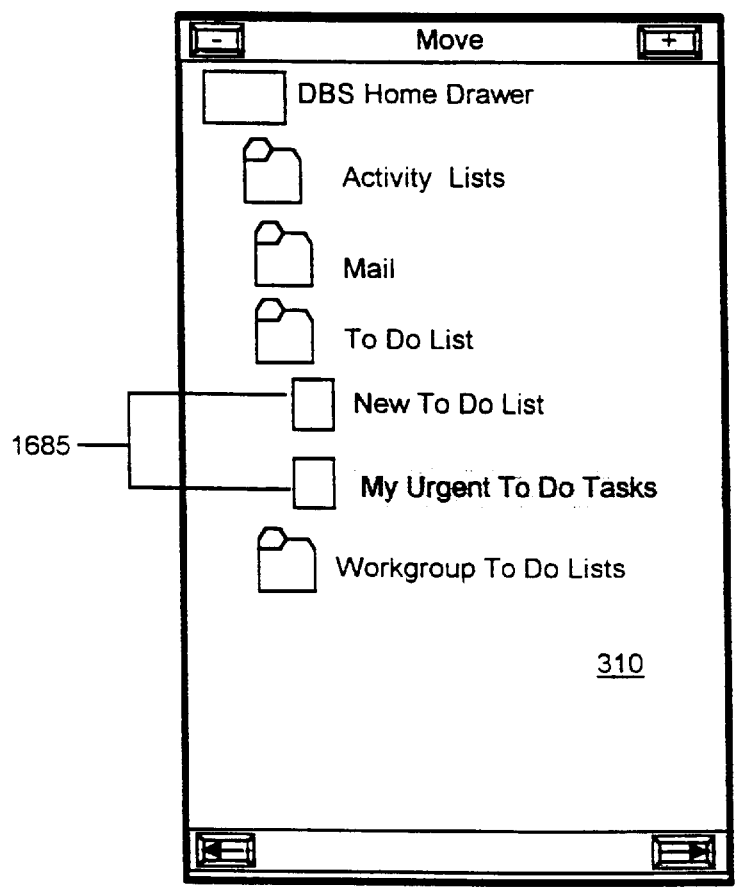
FIG. 16N depicts a computer screen, according to a preferred embodiment of the present invention, displaying the Move mode list window which reveals a list of possible To Do Lists for the user to choose to move an individual next activity.

For this example, the user selects the "New To Do List" To Do List and details on two next activities/tasks are revealed for the "Select payment type for class" next activity/task category. The user then chooses a next activity task which, for this example, is ET201, to move to another To Do List. Next, referring to FIG. 16M, the user selects the Browser list 382 and chooses the Move command from the Browser list 382. As shown in FIG. 16N, the main application program then reveals a list of possible To Do Lists 1685 in the Browser mode list window 310 for the user to choose to move the next activity/task. For this example, the user selects the "My urgent To Do Task" To Do List 1685.

Figure 16O:
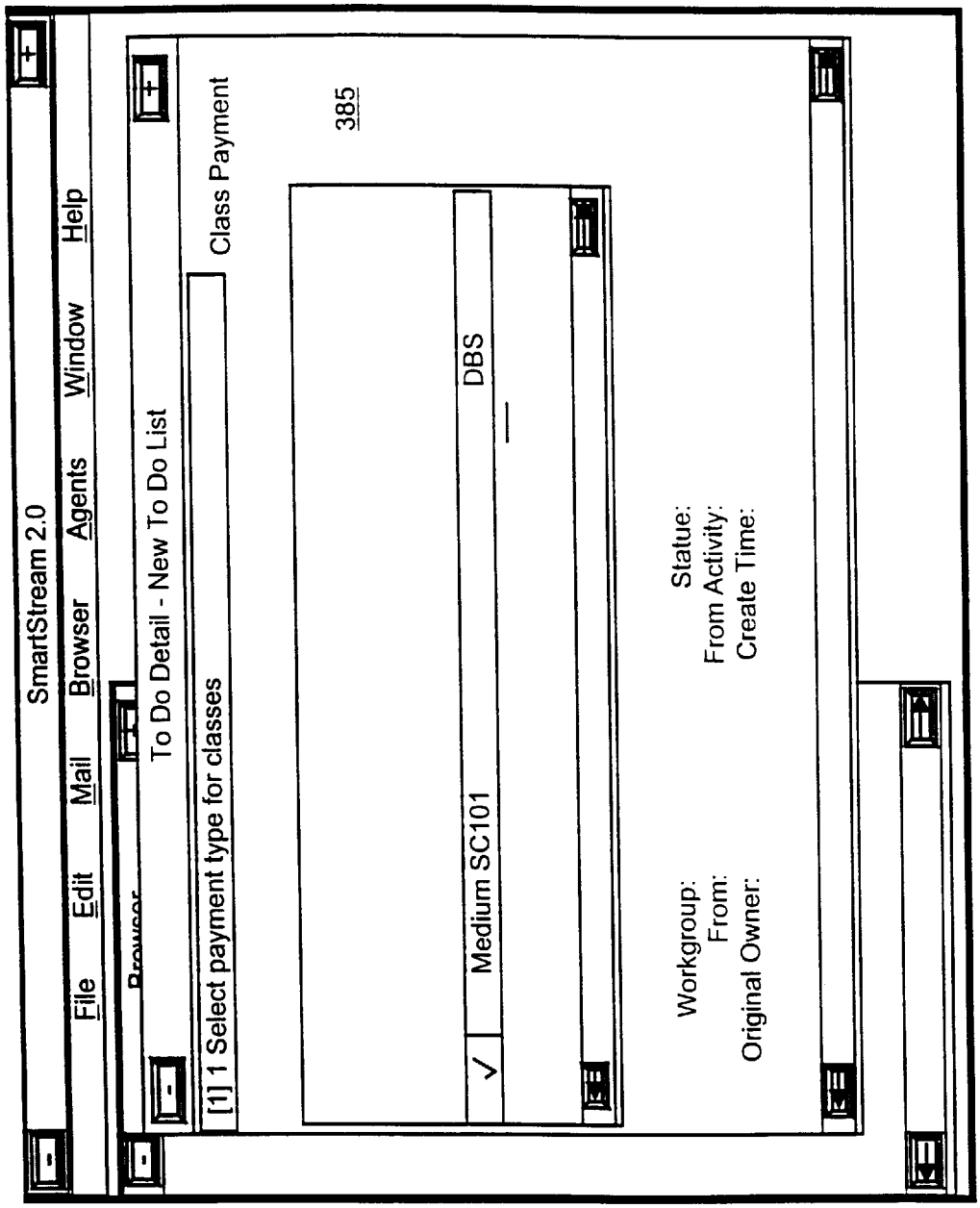
FIG. 16O depicts a computer screen, according to a preferred embodiment of the present invention, displaying a To Do List after an individual next activity has been moved to another To Do List.
Figure 16P:
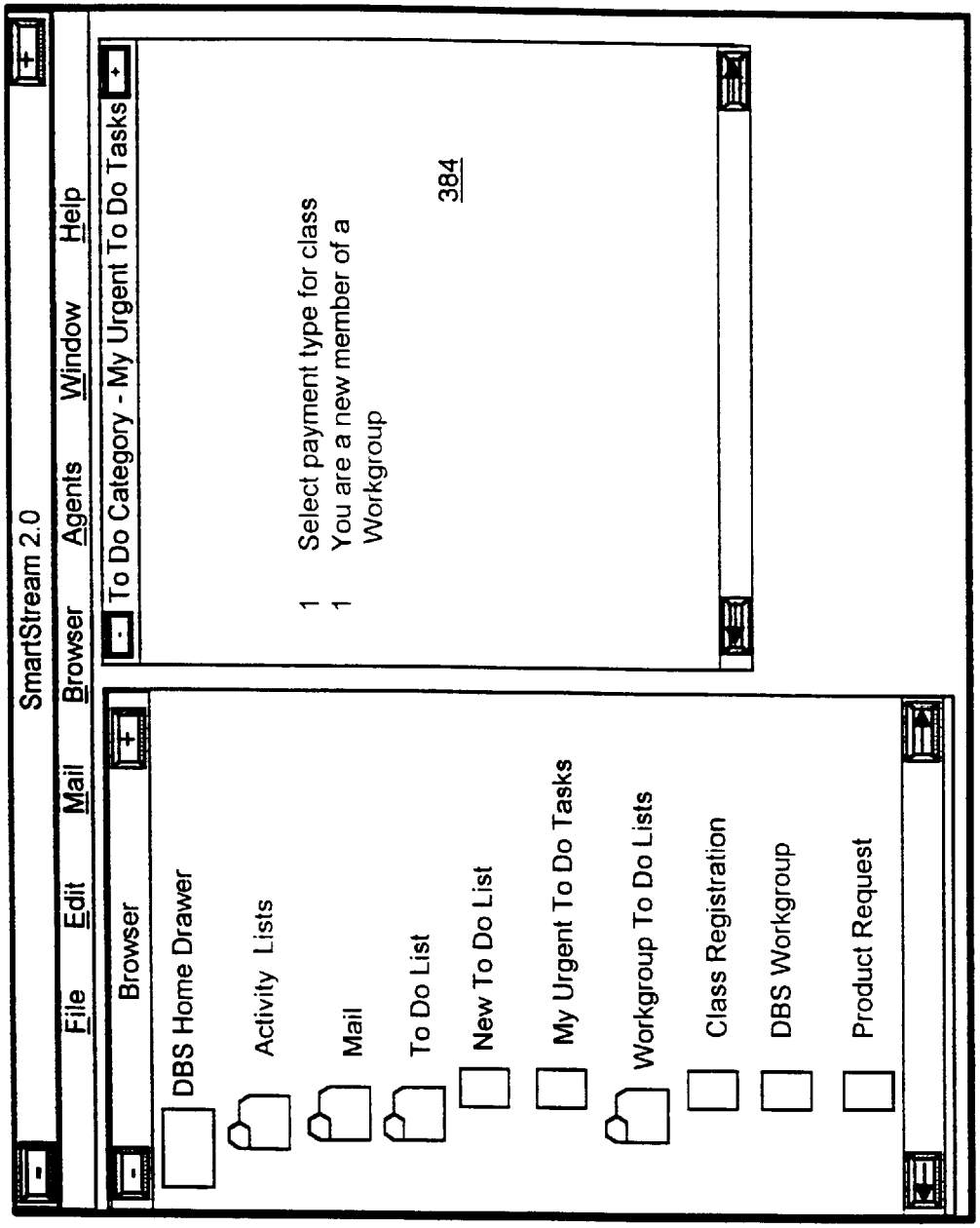
FIG. 16P depicts a computer screen, according to a preferred embodiment of the present invention, displaying a To Do List containing an individual next activity which has been moved to the To Do List from another To Do List.

Therefore, as shown in FIG. 16O, when the user access the "New To Do List" in the Detail To Do Category window 385, the ET201 class payment next activity/task no longer exists. Moreover, as shown in FIG. 16P, when the user accesses the Summary To Do Category window 384 for the "My urgent To Do Tasks," the "Select payment type for class" next activity/task category is revealed. The window 384 discloses that the "Select payment type for class" next activity/task contains one uncompleted next activity/task, which is the class payment for the ET201 class.

In another aspect of the invention, the user may create a customized folder in which to store activity lists. For example, a user may create a Class Registration folder for storing different lists of activities pertaining to registering for classes. The user accesses the File mode and chooses the New (Ctrl+N) selection from the File list window 380 (see FIG. 16A). The "New Browser Objects" window is then displayed. (see FIG. 16B). The user then selects the "Folder" as the new object type and enters the new folder name in the bottom left hand corner of the window. Finally, the user chooses the drawer in which to put the folder.

The following is an illustrative example of how the application programs at the client side and the stored procedures and tables at the server side interact to facilitate the flow of information in a work flow environment. For this example, a user registers for two classes.

In order to register for the classes, the user logs onto the system. In a preferred embodiment, after the user logs on, he or she selects the Browser mode from a list of possible modes displayed across the screen (not shown). Upon selecting the Browser mode, the main application program sends the user's USER_ID to a stored procedure at the server. The stored procedure then accesses the WIJ_DRAWERS table 1245 (see FIG. 12) to obtain information on the drawer number (DRAWERNO) and the description (DESCR) of the user's drawer.

The stored procedure then accesses the WIJ_FOLDERS table 1255 (see FIG. 12) to obtain information on all folders and lists, which are stored as folder numbers (FOLDERNOs), associated with the DRAWERNO. This information includes a description (DESCR) of the folder or list; a list indicator (CONTAINSIND), which reveals whether the FOLDERNO corresponds to a folder, an Activity List, a To Do List or some other list used in the system; and priority information (PARENTFOLDERNO), which is used to determine which folder each activity list and To Do List belongs in.

Figure 17A:
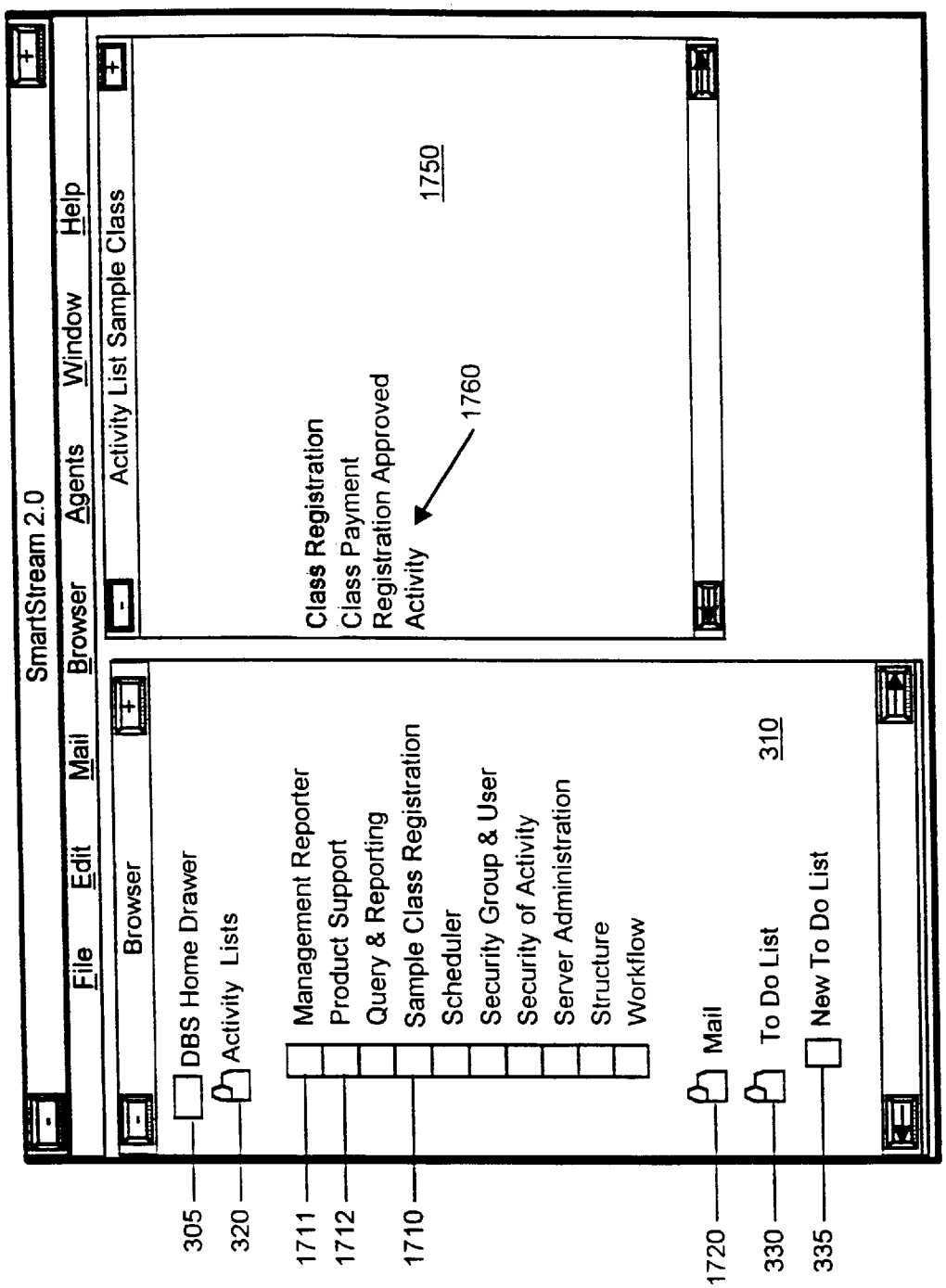
FIG. 17A depicts a computer screen, according to a preferred embodiment of the present invention, displaying the Browser mode which reveals all folders and lists for a user's drawer, where a user may select to access a list, where the Sample Class Registration list has been selected and revealed, and where the Class Registration activity has been selected.

The main application program, as shown in FIG. 16C, uses the information sent to it by the stored procedure to display the folders 1670 and lists 1680 for the user's drawer 305 in the Browser mode list window 310. As shown in FIG. 17A, to illustrate, the user's drawer 305 is described as DBS Home Drawer in the Browser mode list window 310. Moreover, the user's Drawer 305 contains an Activity Lists folder 320, a To Do Lists folder 330 and a Mail folder 1720. The Activity Lists folder 320 contains a "Sample Class Registration" list 1710, as well as other lists such as a "Management Reporter" list 1711 and a "Product Support" list 1712. The To Do Lists folder 330, for this example, contains only the user's personalized To Do List, referred to as the "New To Do List" 335.

For this example, to register for classes, the user selects the "Sample Class Registration" list 1710 and, in response, the system displays the user's customized "Sample Class Registration" list window 1750, with pre-selected activities.

The computer system of the present invention obtains the activities for the customized activity list window 1750 (e.g., "Sample Class Registration" list window) by having the main application program send the USER_ID and FOLDERNO for the activity list selected by the user to the stored procedure at the server. In one embodiment, the name of the stored procedure is psp_sel_user cando_list_1. This stored procedure then accesses the USER_ACT_LIST table 1135 (see FIG. 11) to obtain each activity, via its ACTIVITY_ID, that is associated with the USER_ID and FOLDERNO, as well as any SEQ_NBR information pertaining to the prioritizing of these activities set up by the user for displaying each activity in the activity list window 1750. The stored procedure also accesses the ACTIVITY_MASTER table 1210 (see FIG. 12) to obtain information on the type of activity (ACTIVITY_TYPE) (e.g., a PowerBuilder type window or an executable file type) and the command line (EXEC_NAME) for the activity window application program (e.g., Class Registration activity window) or executable application program which is used to execute the activity. The stored procedure then returns this information to the main application program so that the activity list window 1750 may be displayed with the activities listed in sequence specific or alphabetical order where no sequence specific information for an activity is indicated.

For this example, the user has selected the Class Registration, Class Payment, Registration Approval, and Activity activities 1760 for his or her "Sample Class Registration" list 1750. Moreover, the user has chosen to sequentially list the activities such that the Class Registration Activity has the highest SEQ_NBR, with Class Payment and Registration Approval having lower SEQ_NBRs and Activity having the lowest or no SEQ_NBR.

Figure 17B:
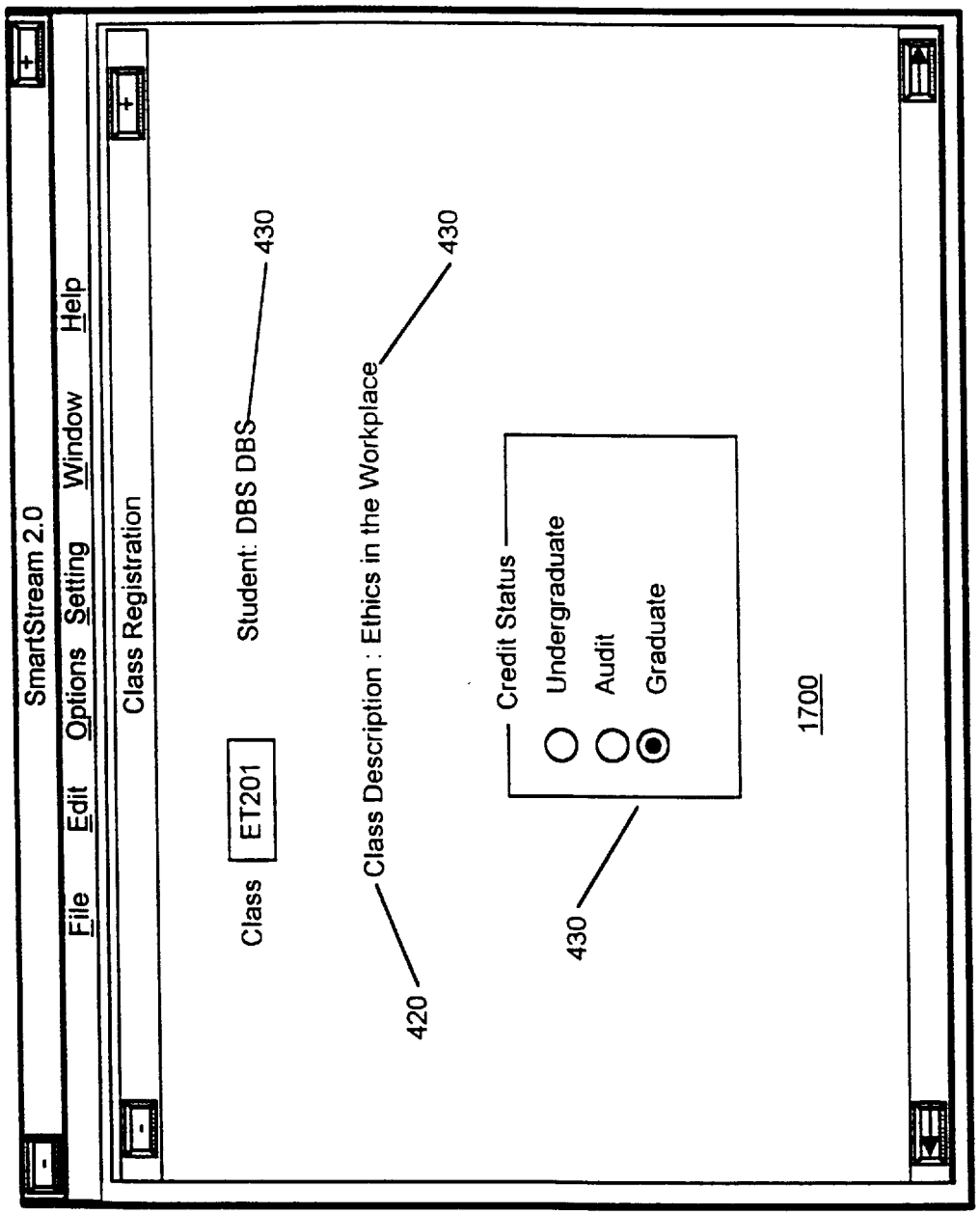
FIG. 17B depicts a computer screen, according to a preferred embodiment of the present invention, displaying an illustrative example of a Class Registration activity window.

From the "Sample Class Registration" list window 1750, the user then selects the Class Registration activity from the list of activities in order to register for a class. As shown in FIG. 17B, the main application program then calls the activity window application program represented by its EXEC_NAME by issuing an "open" command (a PowerBuilder command). The main application program then reveals the Class Registration activity in a Class Registration activity window 1700. If the user had selected to run an executable file, then the main application program would have called the executable file represented under its EXEC_NAME by sending it a "run" command (a PowerBuilder command).

The computer system reveals the activity window 1700 by having the main application program access a Class Registration application program responsible for the Class Registration activity. The Class Registration application program contains information on the structure of the window and the headings 420 (e.g., Student, Class, Class Description, and Credit Status for the Class Registration activity). The Class Registration application program then executes a stored procedure. In one embodiment, the name of the stored procedure is psp_sel_sam1_1. The server then requests this stored procedure to send it back information on available classes for the user. The stored procedure then accesses the SAMPLE_CLASS table 1360 (See FIG. 13) to obtain information on each class (CLASS) and a description (DESCRIPTION) of the class. The stored procedure then sends this information, also referred to as values, back to the Class Registration application program.

After the Class Registration application program receives the headings 420 and their associated values 430, this information is displayed in the Class Registration activity window 1700. For this example, one class at a time is listed as a value 430 next to the Class heading 420 with the corresponding information for the class filling portions of the rest of the activity window 1700. The user may then scroll (e.g. with the arrow keys on the keyboard) through all possible classes that the user has access to register.

After the user has selected a class in which to register (e.g., ET201—Ethics in the Workplace) along with the credit status (e.g., graduate), the user saves the information. The user may save the information by clicking over the "save file" icon, represented as a floppy disk (not shown), with the mouse or simply pressing the Control and S keys simultaneously on the keyboard.

Figure 17C:
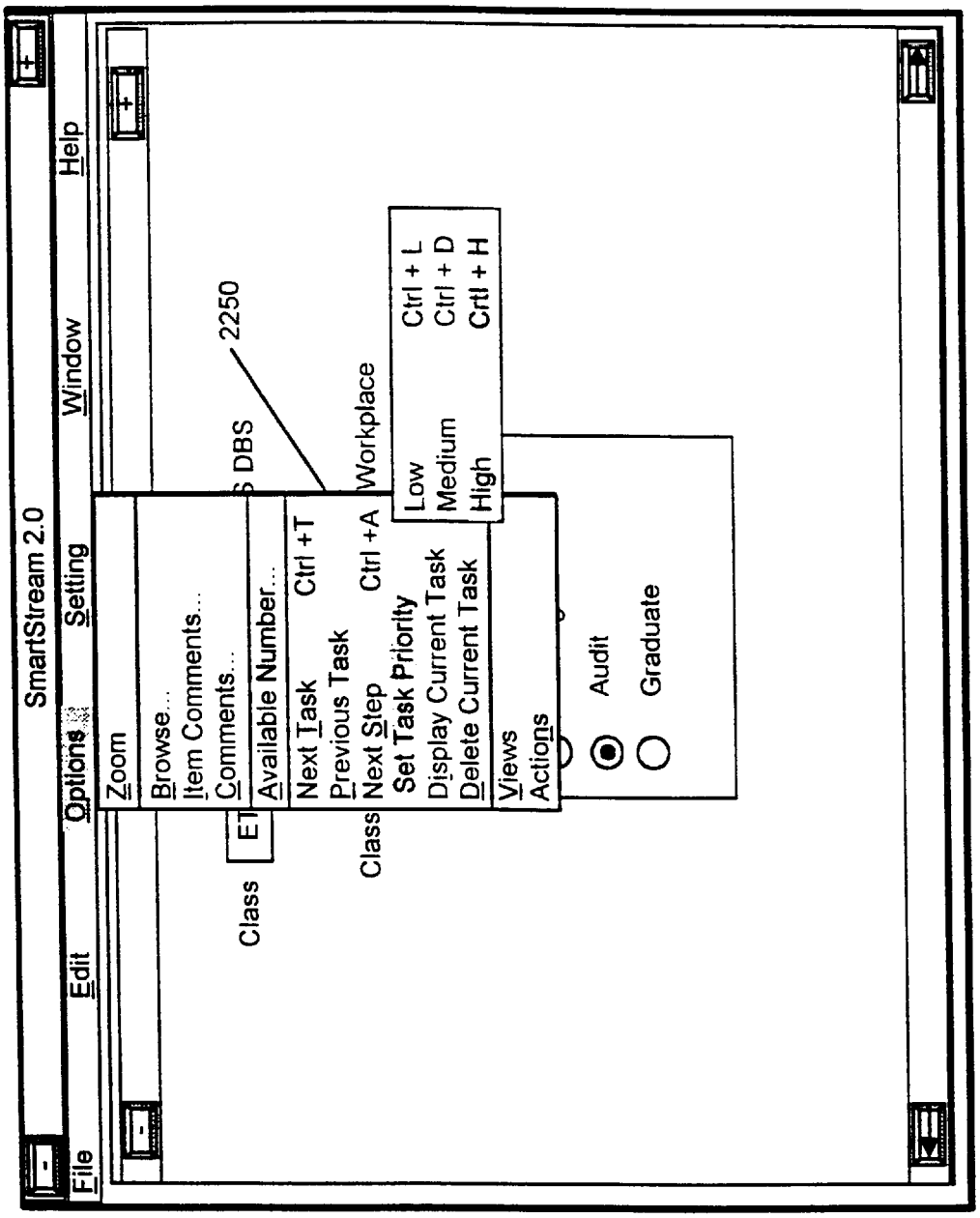
FIG. 17C depicts a computer screen, according to a preferred embodiment of the present invention, displaying the Set Task Priority option in the Options mode, where the user creating a task may set the priority of the task as low, medium or high.
Figure 17D:
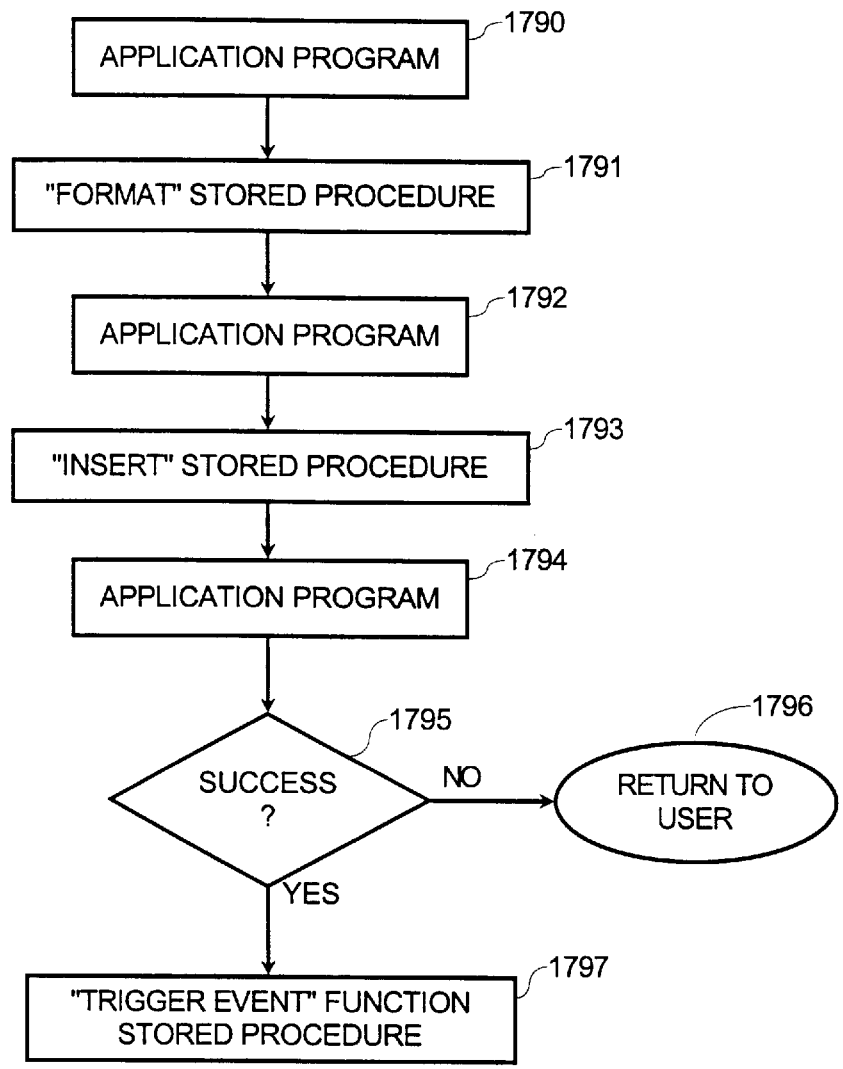
FIG. 17D depicts a flow diagram of a preferred embodiment for saving information in connection with an activity, determining the event associated with the activity, and accessing the Trigger Event function stored procedure.

The Class Registration application program saves the Class Registration activity information (e.g., ET201 for class and graduate for credit status) in the following fashion. As shown in FIG. 17D, at step 1790, the Class Registration application program (written in PowerBuilder) calls a stored procedure, at step 1791, to format the information for certain columns in the associated table at the server. For this example, the information is formatted for the class, student, and credit columns in the SAMPLE_REG table 1365 (see FIG. 13). At step 1792, the formatted information is returned to the Class Registration application program, which, at step 1793, then sends the formatted information to a stored procedure at the server. In one embodiment, the name of this stored procedure is psp_ins_sam2_1. This stored procedure then stores each piece of information (each value) in its corresponding class, student and credit column in the SAMPLE_REG table 1365. Finally, at step 1794, the stored procedure returns a message to the Class Registration application program that indicates that the information has been saved.

At step 1795, the Class Registration application program then determines whether the information was successfully saved. If not, the application program proceeds to step 1796 and returns control to the user. However, if the information was saved successfully, then the Class Registration application program determines which event to trigger. For this example, possible events associated with the Class Registration activity are "Add Class" and "Change Class". To illustrate, the user has added a new class. Therefore, the "Add Class" event is selected, along with the corresponding stored procedure for this event. In one embodiment, the name of the "Add Class" stored procedure is pamsam2ins. At step 1797, the Class Registration application program then executes the Trigger Event function stored procedure to determine the next activities/tasks and users/workgroups responsible for completing the next activities/tasks associated with the Class Registration activity. In one embodiment, the name of the Trigger Event stored procedure is called pam0011_trig_am_event. In executing the Trigger Event stored procedure, the Class Registration application program sends information to the Trigger Event stored procedure at the server.

The information sent to the Trigger Event stored procedure includes an event identifier (EVENT_ID) for the corresponding stored procedure (e.g., pamsam2ins), the entity value (NEXT_STEP_ENT_VAL) (e.g., plant, site, organization, etc.) responsible for performing the next activity/task, the USER_ID for the user who completed the activity, the ACTIVITY_ID for the activity just completed (e.g., Class Registration), and the priority of the subsequent next activity/task (MSG_PRIORITY) set by the user who has just completed the activity. As shown in FIG. 17C, the user who just completed the activity may set the priority of the subsequent next activity/task by selecting the Set Task Priority option in the Options Mode. Other information may include whether a user or a work group (OWNER_TYPE) is responsible for the next activity/task and the identification for the user or workgroup (USER_ID or MSG_GROUP_ID).

Figure 18:
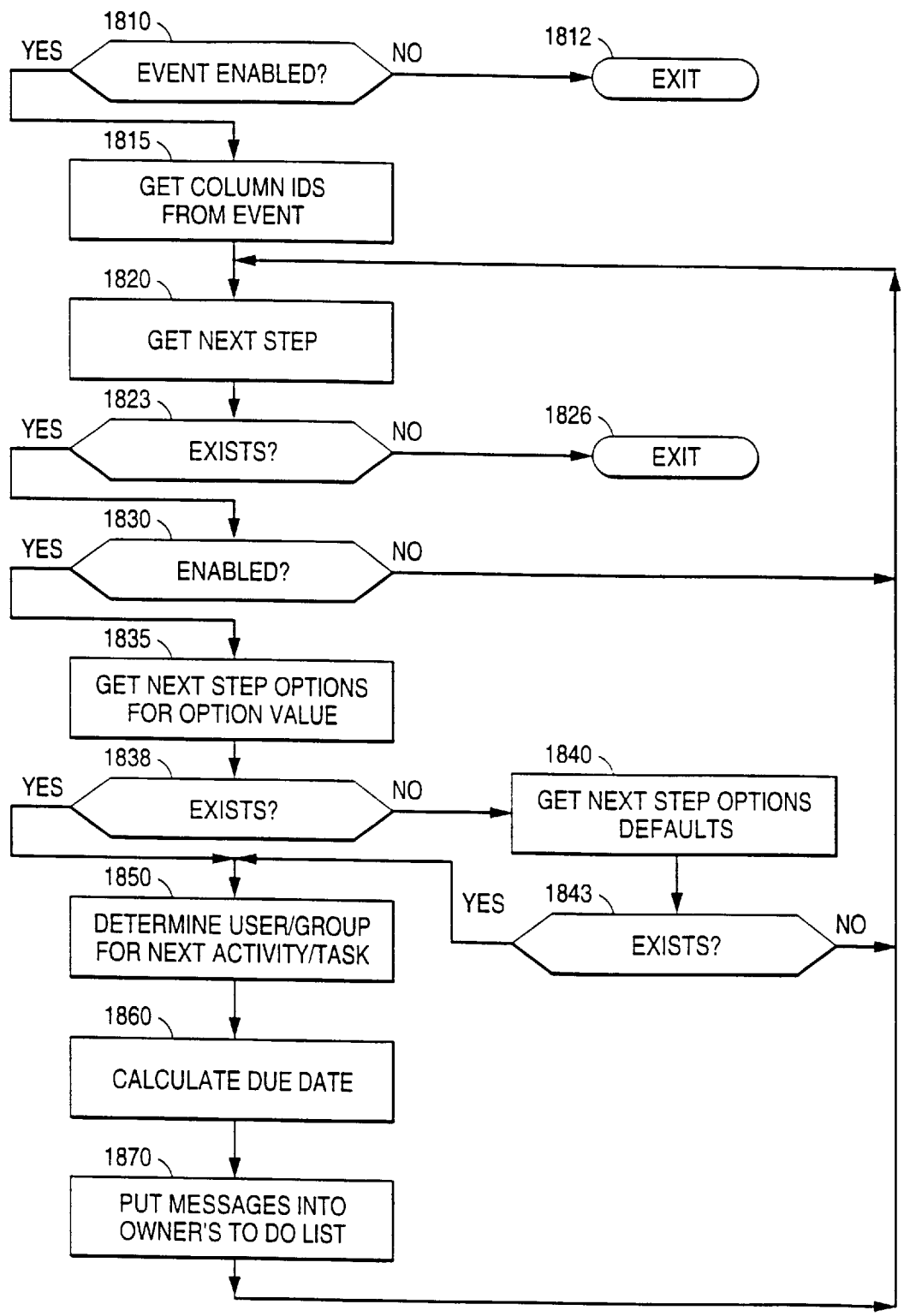
FIG. 18 depicts a flow diagram of a preferred embodiment of the Trigger Event function stored procedure which determines the next steps for the flow of information process, in particular next activity(s) and user(s) responsible for performing the next activity(s).

Referring to FIG. 18, a flow diagram is provided, for a preferred embodiment of the Trigger Event function stored procedure. This flow chart illustrates a process for determining the next activity/task(s), user/work group responsible for performing the next activity/task(s), and the like, and creating the next activity/task(s).

First, at step 1810, the Trigger Event function stored procedure determines whether the event (e.g., pamsam2ins for the "Add Class" event) is enabled. This is accomplished by accessing the EVENT_MASTER table 1220 (see FIG. 12) to determine if the ENABLED column for the EVENT_ID (e.g., pamsam2ins) contains a one or a zero. In a preferred embodiment, if the ENABLED column contains a zero, then the event is disabled, the Trigger Event function stored procedure is exited at step 1812, and control is returned to the Class Registration application program.

However, if the ENABLED column contains a one, then the event is enabled and the Trigger Event function stored procedure proceeds to step 1815. At step 1815, column identifiers (COL_Ids) are obtained from the EVENT_MASTER table 1220 for the corresponding EVENT_ID. Thus, the Trigger Event function stored procedure is able to determine which COL_Ids for the given event will be used to pass the values pertaining to the event. For this example, possible COL_Ids for the pamsam2ins EVENT_ID could be 1060 for COL_ID_1 representative of the Class heading, 1061 for COL_ID_2 representative of the Student heading, and 1062 for COL_ID_3 representative of the Credit heading.

The Trigger Event function stored procedure then proceeds to step 1820 to obtain the first of all possible next steps which are associated with the event. In doing so, at step 1823, the Trigger Event function stored procedure accesses the Next Step table 1225 (see FIG. 12) to determine if any next steps exists for the EVENT_ID. This is accomplished by determining if any rows (records) exists for the particular EVENT_ID in the Next Step table 1225. If there are no rows for the EVENT_ID in the Next Step table 1225, then the Trigger Event function stored procedure is exited at step 1826.

However, if rows for the EVENT_ID do exist in the Next Step table 1225, then, at step 1830, the Trigger Event function stored procedure determines whether the first row, which represents a particular next activity/task (ACTIVITY_ID), is enabled (ENABLED). If the ENABLED column is disabled (e.g., zero), then the Trigger Event function stored procedure returns to step 1820 to obtain the next step, if there are any. This loop continues until an enabled next step for a next activity/task corresponding to the EVENT_ID is encountered. If there are no rows enabled for the EVENT_ID, then, after the last one is encountered, the Trigger Event stored procedure will return to the Class Registration application program.

On the other hand, if a first row encountered for an EVENT_ID is enabled (e.g., one), then the Trigger Event function stored procedure obtains the message identifier (MSG_ID) representing the next activity/task category and the next activity/task identifier (ACTIVITY_ID) and proceeds to step 1835. At step 1835, the Trigger Event function stored procedure accesses the Next Step Options table 1230 (see FIG. 12) for the entity (NEXT_STEP_ENT_VAL) responsible for the next activity/task, and the stored procedure proceeds to step 1838.

At step 1838, if rows exist for the NEXT_STEP_ENT_VAL, then the Trigger Event stored procedure proceeds to step 1850. However, if no rows exists for the NEXT_STEP_ENT_VAL, then the Trigger Event stored procedure proceeds to step 1840 to obtain any default values sent from the Class Registration application program which define the entity responsible for the next activity/task. This information is stored in the Next Step Options table 1230 in the NEXT_STEP_ENT_VAL column (see FIG. 12). In one embodiment, specific entities may be delineated with an identifier or an asterisk (*) may be used to indicate that every user (enterprise wide) may have access to the next activity/task. The Trigger Event function stored procedure then proceeds to step 1843 to determine if any default values are available. If no default values are available, then the Trigger Event function stored procedure returns t o step 1820 to determine if there are any other next steps to be evaluated and acted upon as described above. However, at step 1843, if default values do exist, then t he Trigger Event stored procedure proceeds to step 1850.

At step 1850, the Trigger Event stored procedure accesses the Next Step Options table 1230 to determine the user (USER_ID) or work group (MSG_GROUP_ID) responsible for the next activity/task. In doing so, it checks the IGNORE_OVERRIDE column for the row to determine whether the USER_ID or MSG_GROUP_ID values should be used. If the IGNORE_OVERRIDE is enabled, then the values identified in the column are used. However, if the IGNORE_OVERRIDE is disabled, then the values sent from the Class Registration application program are used. On the other hand, if the Class Registration application program did not send any values, then the values from the Next Step Options table 1230 are used. Next, the Trigger Event function stored procedure proceeds to step 1860 to calculate the date and time the information for the new next activity/task is created.

Finally, the Trigger Event stored procedure proceeds to step 1870 where information pertaining to the next activity/task is added to the MESSAGE_QUEUE table 1140 (see FIG. 11) by creating a row for the next activity/task. The information in the row may then be used later for the responsible user's or work group's To Do List. This information includes the OWNER_ID which is the USER_ID; MSG_GROUP_ID (for a work group) or override value; the OWNER_TYPE, which indicates whether the OWNER_ID belongs to a user or a work group; the ACTIVITY_ID for the next activity/task; the MSG_ID pertaining to the next activity/task category; and CREATE_TIME, which indicates the date and time the next activity/task was created.

Other information that may be stored in the new next activity/task row includes the MSG_SEQ_NBR, which indicates the priority associated with the message representative of the new activity/task category, where the priority is assigned to the next activity/task category by the user or work group to perform the next activity/task in the Detail To Do Category window (see FIG. 16L); the FOLDERNO, which indicates the user's or work group users' list associated with the next activity/task; and the NEXT_STEP_ENT_VAL, which indicates the plant, site, organization or the like ultimately responsible for the next activity/task.

Finally, particular information relating to the class in which the user has registered is stored in a COL_VAL associated with a specific COL_ID. For example, COL_ID_1 which is 1060 and represents the Class heading correlates with COL_VAL_1 which stores the class value, ET201; COL_ID_2 which is 1061 and represents the student heading correlates with COL_VAL_2 which stores the student value, DBS; and COL_ID_3 which is 1062 and represents the credit heading correlates with COL_VAL_3 which stores the credit value, graduate.

After the Trigger Event stored procedure has completed step 1870 by adding the pertinent information to the new next activity/task row of the MESSAGE_QUEUE table 1140, then the stored procedure returns to step 1820 to determine if there are any other next steps to be evaluated and acted upon as described above. After the Trigger Event stored procedure has acted upon all the next steps, as described above, the stored procedure proceeds from step 1820 to step 1826. At step 1826, the Trigger Event stored procedure is exited and control is returned to the Class Registration application program.

Figure 19:
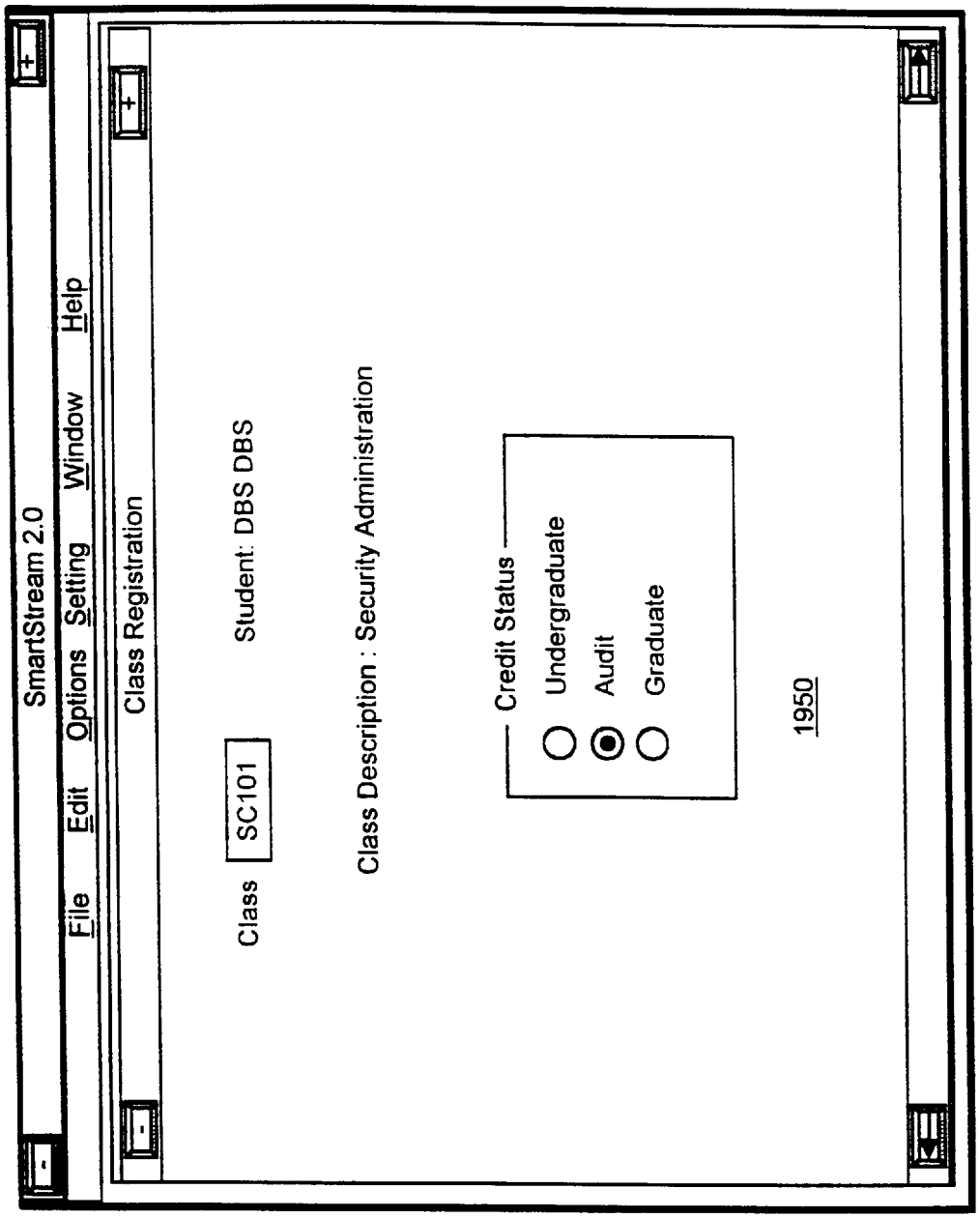
FIG. 19 depicts a computer screen, according to a preferred embodiment of the present invention, displaying an illustrative example of a second Class Registration activity window.

The Class Registration application program then displays a blank Class Registration activity window (not shown) and waits for the user to either register for another class or exit the Class Registration activity. For this example, as shown in FIG. 19, the user registers for a second class, SC101 (Security Administration) with an audit credit status. Therefore, the user executes the save command to save the class. Next, the procedure described above is repeated as the Class Registration application program formats the information entered by the user, and sends this information to be saved by the stored procedure. In one embodiment, the name of the stored procedures is psp_ins_sam1_1. After the information has been stored, the Class Registration application program determines which event to trigger and triggers the event, via the Trigger Event stored procedure, to determine the next activities/tasks and users/work groups responsible for completing the next activities/tasks.

Figure 20:
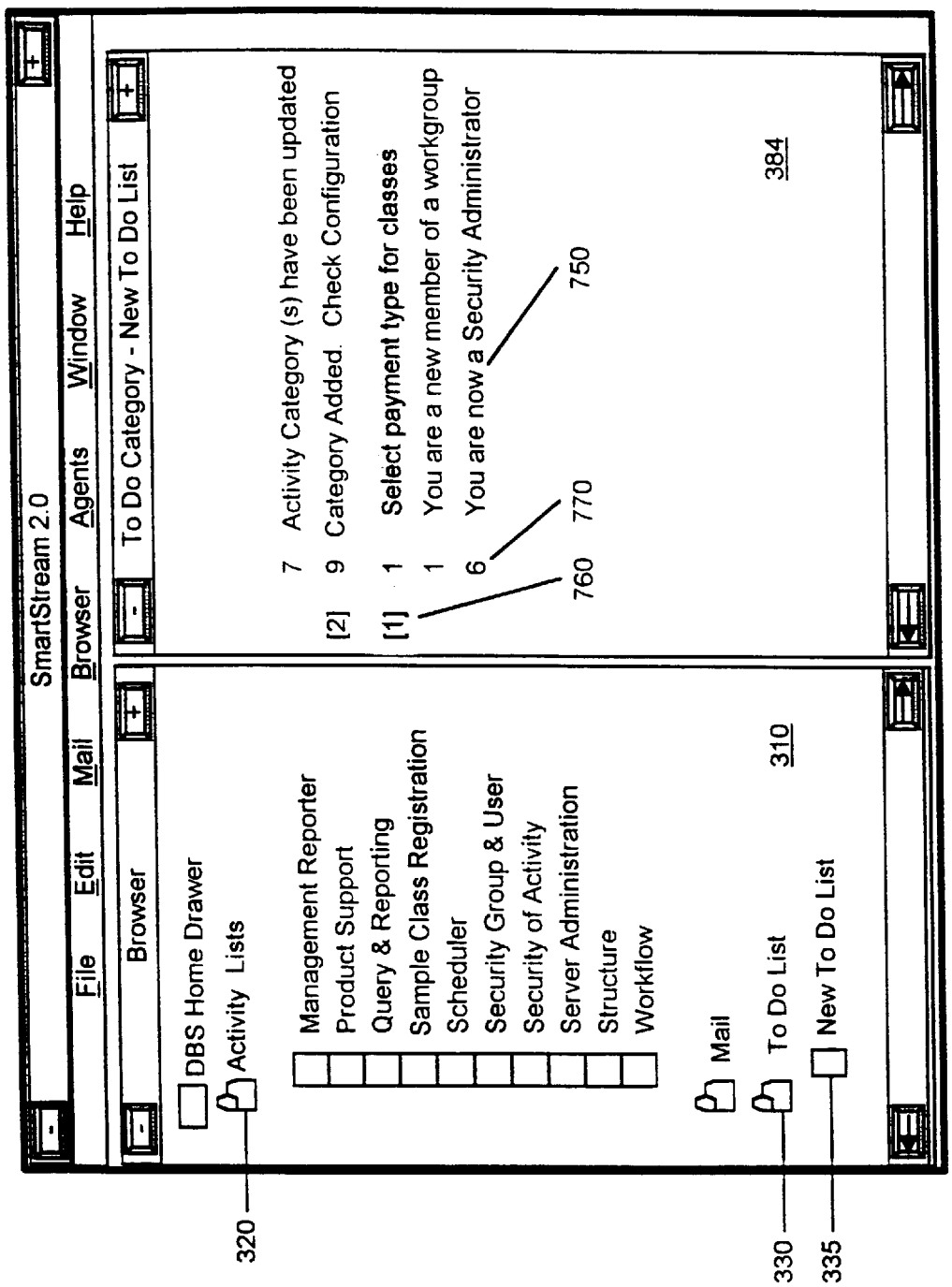
FIG. 20 depicts a computer screen, according to a preferred embodiment of the present invention, displaying the Browser mode list window where the user may access a To Do List, where the "New To Do List" To Do List has been accessed, and where a list of next activity categories for the To Do List is revealed in the Summary To Do Category window.

After the Class Registration application program receives a message from the Trigger Event stored procedure that all next activities/tasks have been added to user's/work group's To Do List, the Class Registration application program again waits for the user to either register for another class or exit the Class Registration activity. For this example, as shown in FIG. 20, the user decides to leave the Class Registration activity window and return to the Browser mode list window 310. In a preferred embodiment, the user may press the F11 key to return the user to the Browser mode list window 310.

From the Browser mode list window 310, the user may then decide whether to access another list in the Activity List Folder 320 to begin another activity or to access the user's personalized To Do List ("New To Do List") 335 in the To Do Lists folder 330. In this example, the user selects the "New To Do List" 335, and a list of next activities/tasks is displayed in the Summary To Do Category window 384.

The computer system obtains the next activities/tasks for the Summary To Do Category window 384 (e.g., "New To Do List" window) by having the main application program send the USER_ID and FOLDERNO selected for the To Do List by the user to the stored procedure. In one embodiment, the name of the stored procedure is psp_sel_mque_detail. For this example, the FOLDERNO corresponds to the user's personalized To Do List (e.g., "New To Do List").

The stored procedure then accesses the MESSAGE_QUEUE table 1140 (see FIG. 11) to obtain the message via the message identifier (MSG_ID) for each next activity/task category corresponding to the user's USER_ID (identified as the OWNER_ID) and FOLDERNO. The stored procedure also obtains any priority information regarding the message and the next activities/tasks represented by the message from the MSG_SEQ_NBR and MSG_PRIORITY columns, respectively. The status of each individual next activity/task, as to whether it has previously been completed, is also obtained by the stored procedure from the MSG_STATUS column. Moreover, the stored procedure obtains the ACTIVITY_ID, COL_Ids, and COL_VALs associated with each MSG_ID for all its corresponding next activities/tasks. The stored procedure also accesses the ACTIVITY_MASTER table 1210 (see FIG. 12) to obtain information on the type of activity (ACTIVITY_TYPE) (e.g., PowerBuilder type window or executable file type) and the command line (EXEC_NAME) for the activity window application program or executable application program which is used to execute the next activity/task. The stored procedure then sends this information back to the main application program, which organizes the messages based on priority, calculates the number of completed and uncompleted next activities/tasks for each message, and reveals the messages 750 and completed (done) 760 and uncompleted (new) 770 information in the Summary To Do Category window 384.

For the "New To Do List" Summary To Do Category window 384, there are five messages 750. These messages 750 are "Activity Category[s] have been updated", "Category Added, Check Configuration", "Select payment type for class", "You are a new member of a Workgroup", and "You are now a Security Administrator". To the left of each message 2080 is the "Done" column 760 and the "New" column 770, which represent the number of next activities/tasks completed and uncompleted for the particular message 750. To illustrate, the "Category Added, Check Configuration," message 750 has two Done (completed) 760 and nine New (uncompleted) 770 next activities/tasks associated with the message 750.

Figure 21:
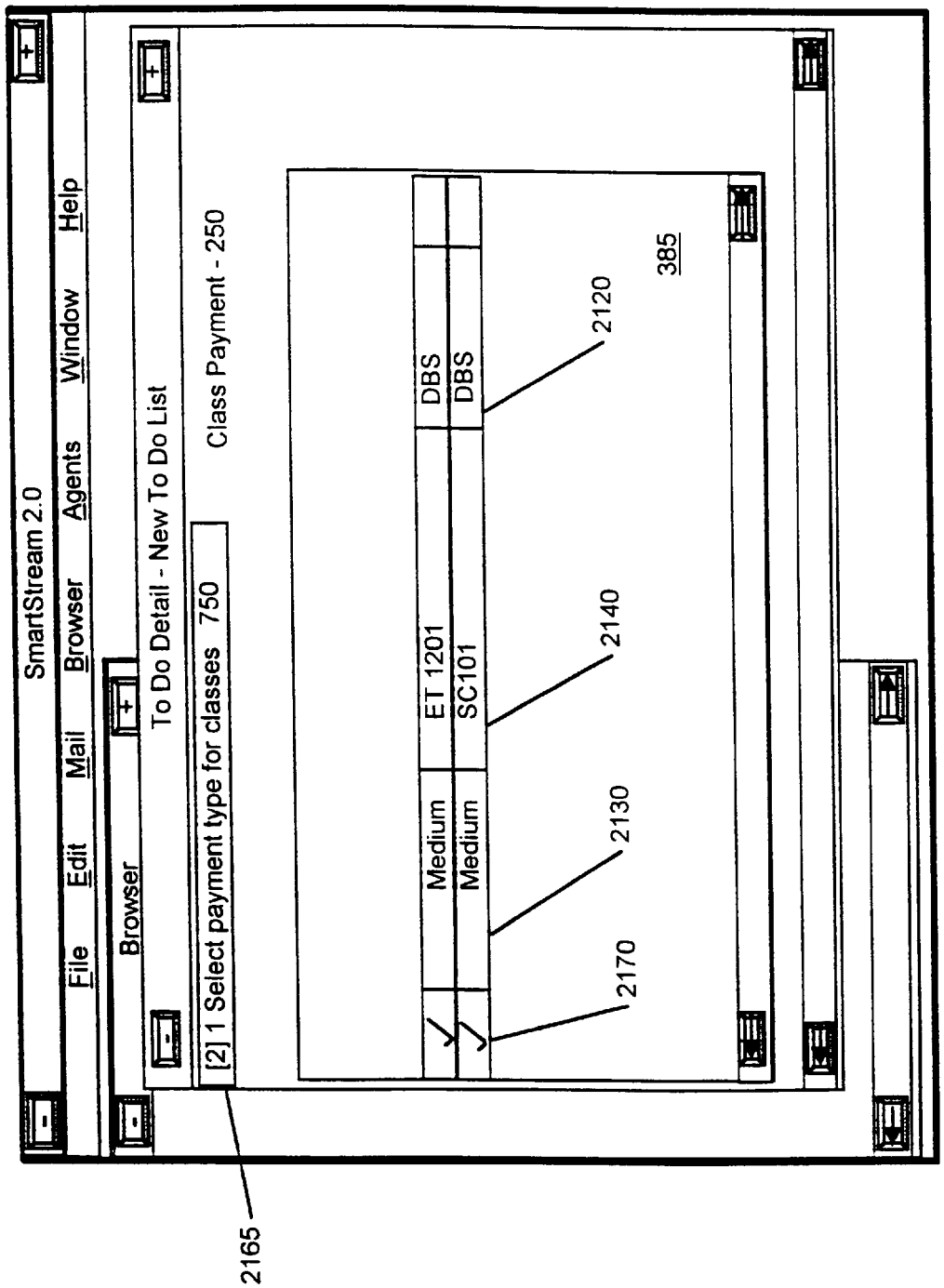
FIG. 21 depicts a computer screen, according to a preferred embodiment of the present invention, displaying the Browser mode list window where the user may access a To Do List, where the "New To Do List" To Do List has been accessed, and where a list of next activities for the To Do List is revealed in the Detailed To Do Category window.

As shown in FIG. 21, the user may also access a Detailed To Do Category window 385. In this window 385, when the user accesses the To Do List, one message 750 is revealed at a time. For this example, the main application program is displaying the "Select payment type for class" message 750. The main application program reveals, to the left of the message 750, the number of next activities/tasks 2165 that exist, and discloses, to the right of the message 750, the next activity/task 250 associated with this message 750. The main application program also lists, below the message 750, key information relating to each next activity/task 250. From left to right, this includes whether the next activity/task 250 has been completed 2170, the priority 2130 associated with each next activity/task 250, and, for this example, the class heading 2140 and student headings 2120.

To illustrate, the number of existing next activities/tasks 250 associated with the "Select payment type for class" message 750 are two, and the next activity/task 250 associated with this message 750 is Class Payment. Further, the next activities/tasks 250 relate to two classes 2140, ET201 and S2101, sought to be registered by a user/student 2120, DBS. For this example, DBS, the one originally registered for both of these classes, is also responsible for selecting a payment type for each class. The window 385 also reveals that both of these next activities/tasks 250 are uncompleted 2170 and have medium priority status 2130.

A more complete understanding of the aforementioned component aspects of the present invention may be obtained by reference to Section VII-I, infra.

Figure 22A:
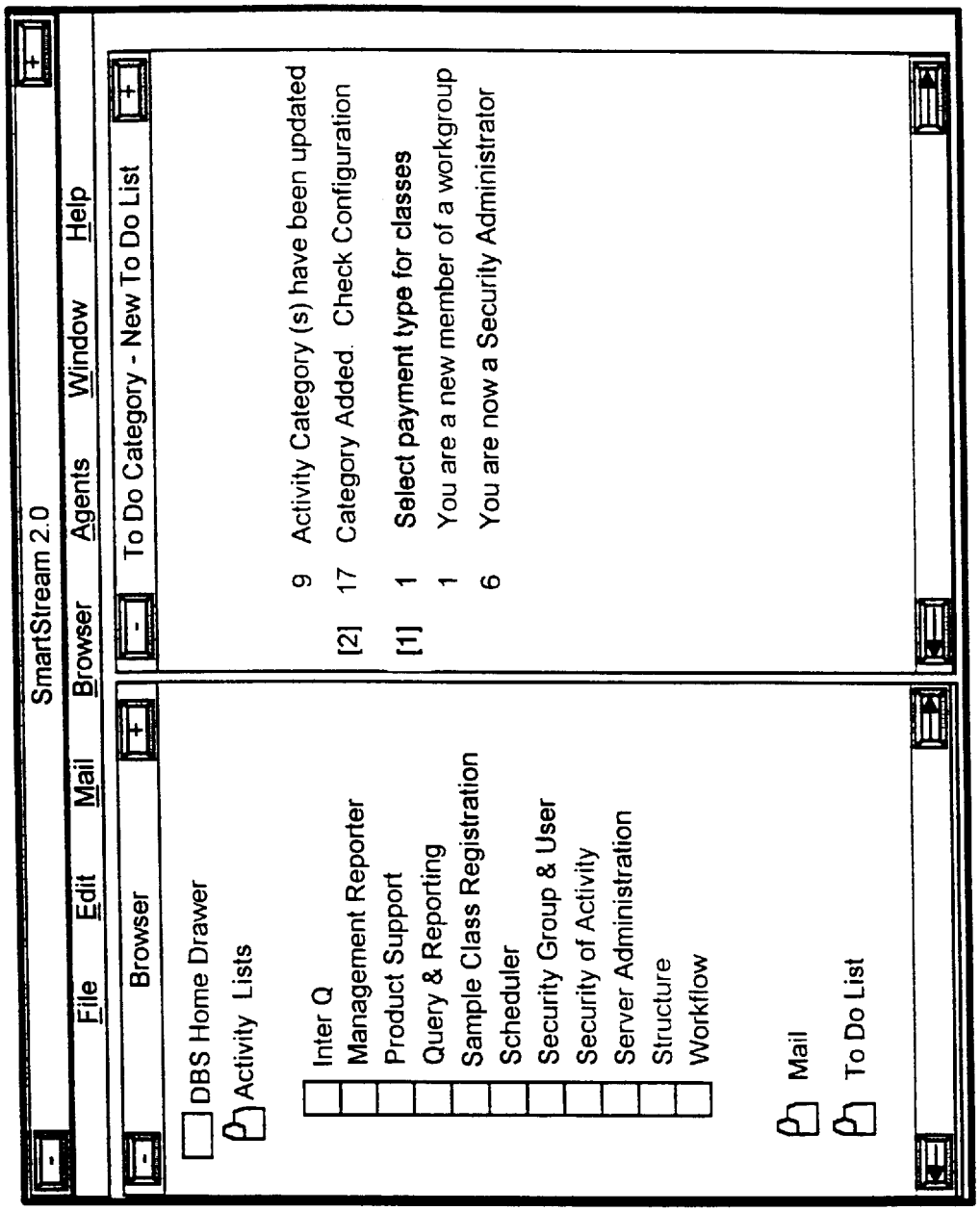
FIG. 22A depicts a computer screen, according to a preferred embodiment of the present invention, displaying the Summary To Do Category window where the "Select Payment Type for Class" next activity has been selected.

The user may select a category for a next activity/task to act upon from either the Summary To Do Category window 384 or the Detailed To Do Category window 385. For this example, the user selects the Class Payment next activity/task category, represented by the "Select payment type for class" message, from the Summary To Do Category window 384, as shown in FIG. 22A. The main application program then sends the FOLDERNO for the To Do List and the MSG_ID for the category selected to the next activity/task application program. For this example, the FOLDERNO and MSG_ID would be sent to the Class Payment application program represented by its EXEC_NAME. In one embodiment, the EXEC_NAME of the Class Payment application program is pam0510_payment.

Figure 26A:
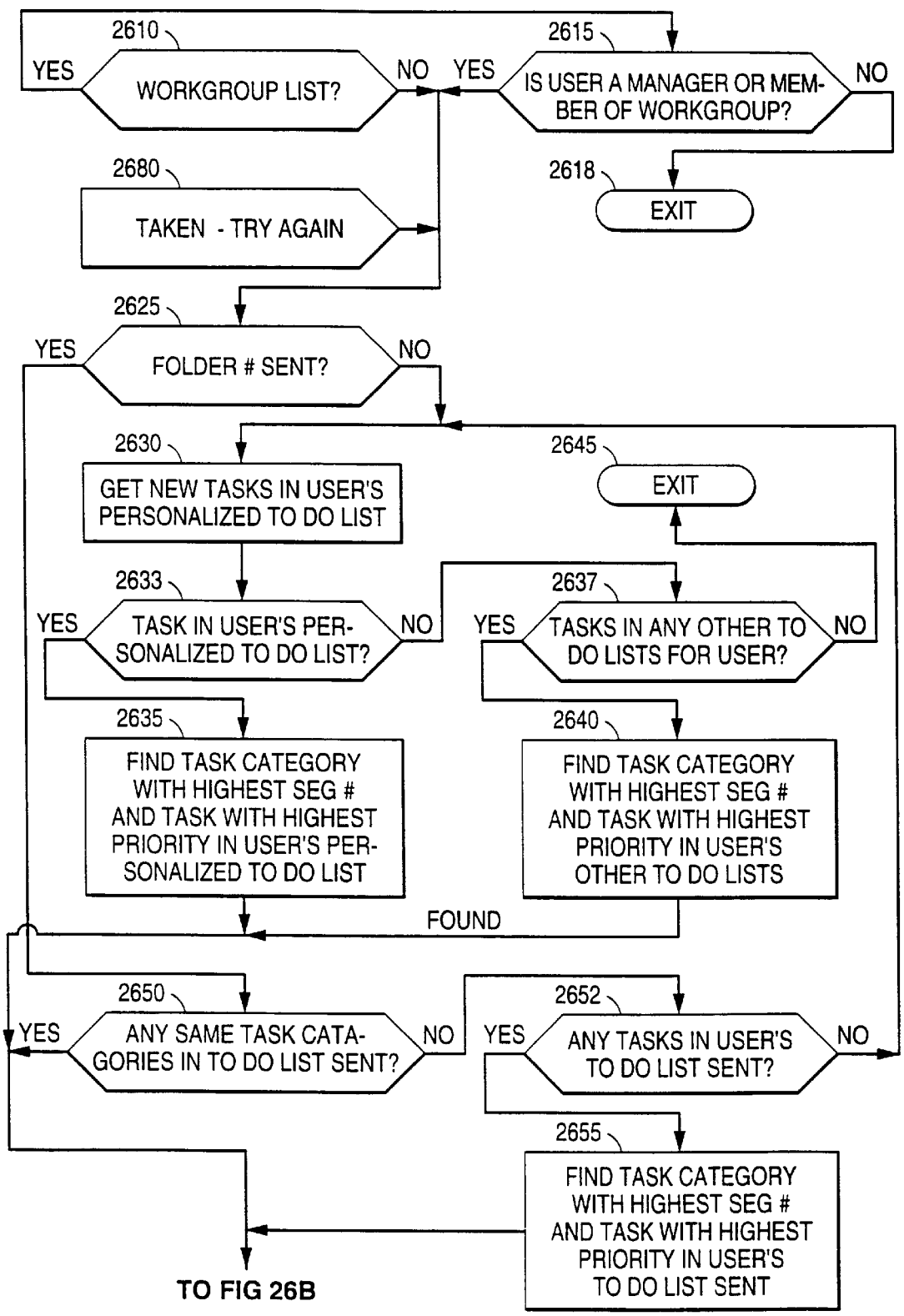
FIG. 26 depicts a flow diagram of a preferred embodiment of the Next Task procedure which determines a next activity to display on the computer screen based on priority settings.
Figure 26B:
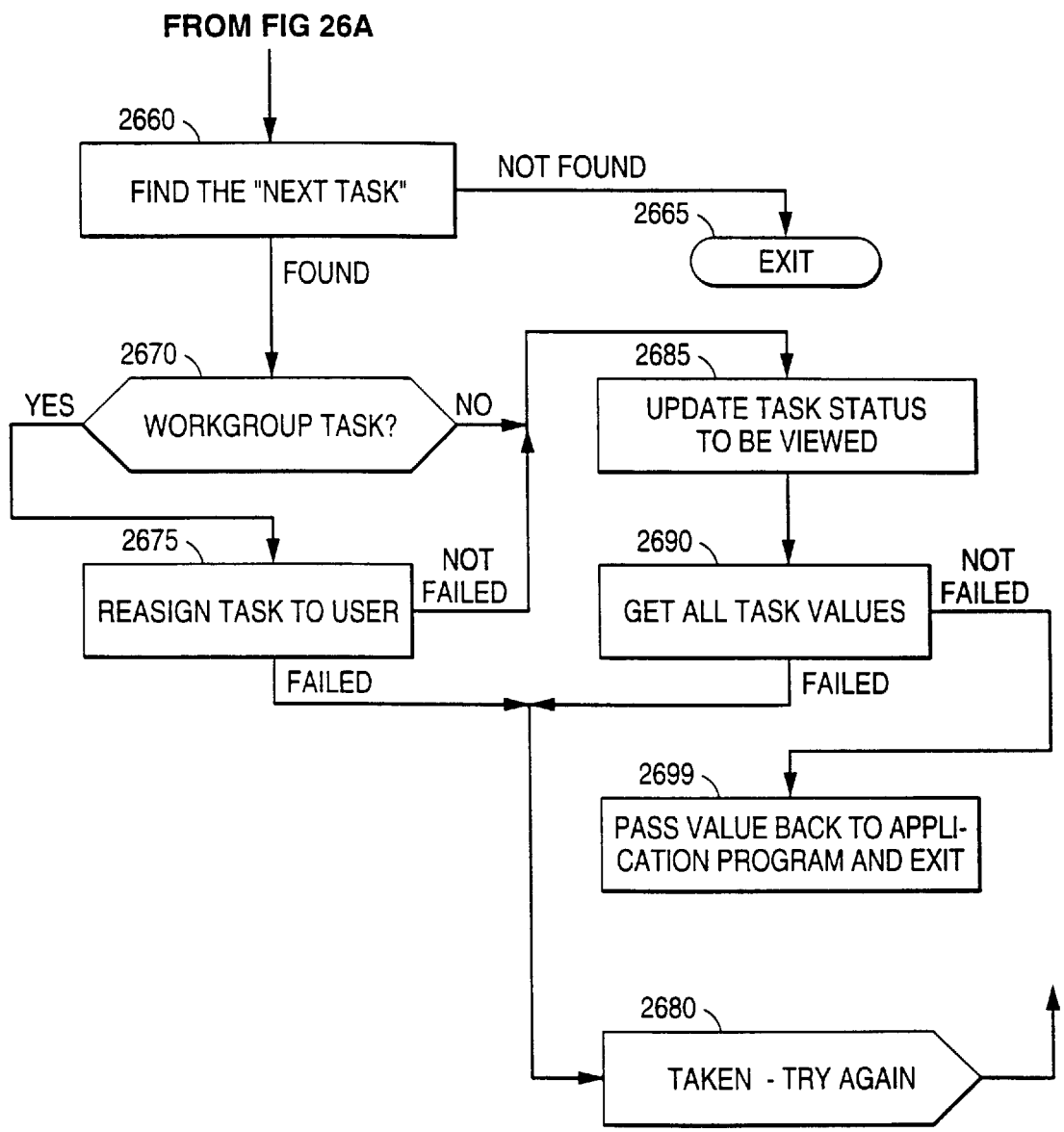

The next activity/task application program then sends the FOLDERNO and MSG_ID to a stored procedure which determines the most prioritized next activity/task for the next activity/task category. In one embodiment, the name of the stored procedure is the Next Task stored procedure, which is discussed in further detail below and is illustrated in FIG. 26. After determining the most prioritized next activity/task, the Next Task stored procedure sends information on this next activity/task (class payment), represented by its ACTIVITY_ID, to the next activity/task application program or executable application program.

Figure 22B:
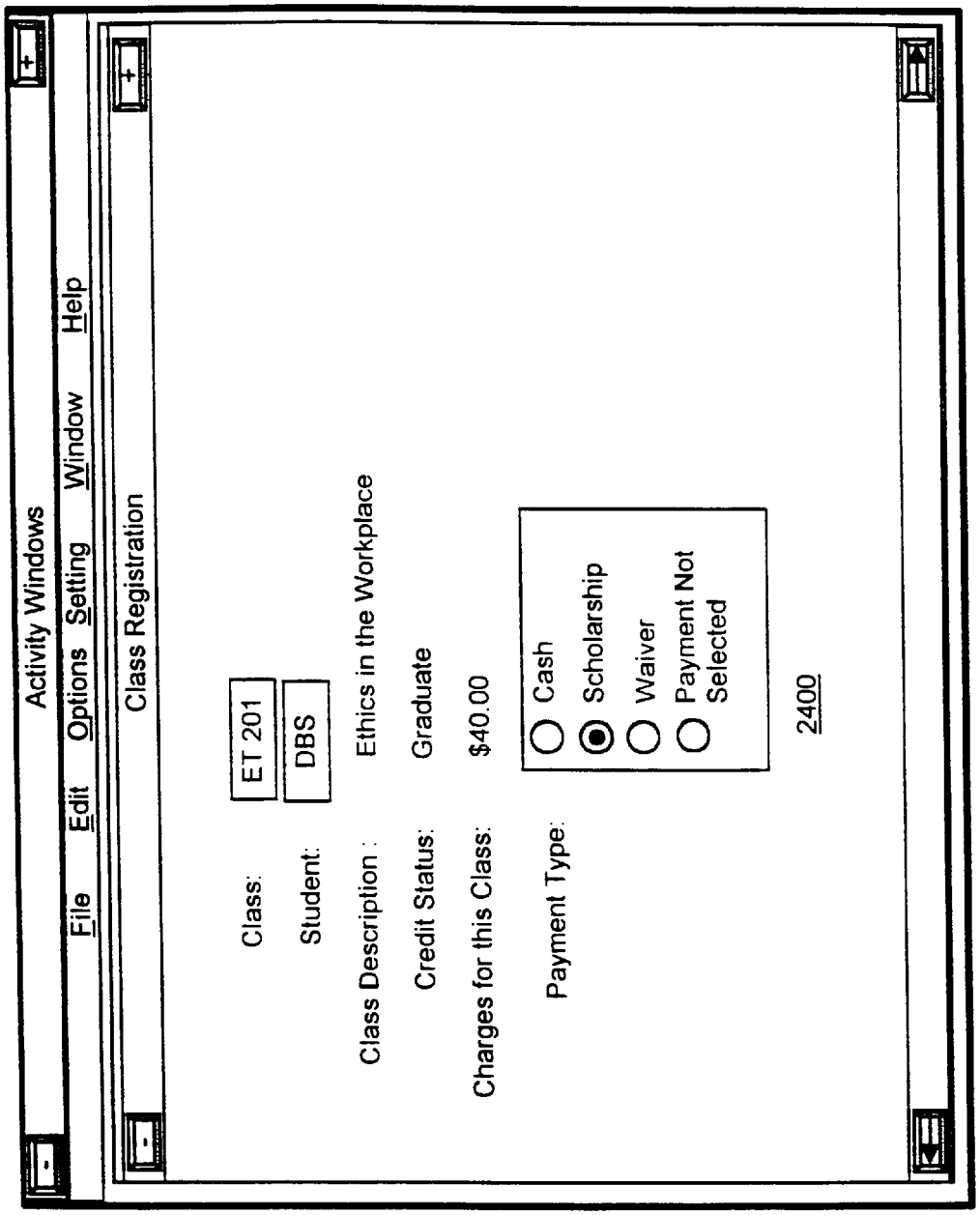
FIG. 22B depicts a computer screen, according to a preferred embodiment of the present invention, displaying an illustrative example of a Class Payment next activity window.

In this example, the class payment next activity/task category only contains one next activity/task. Therefore, the Next Task stored procedure selects the next activity/task, and the Next Task stored procedure send the Class Payment activity application program the next activity/task. The Next Task stored procedure also sends the Class Payment application program other information regarding this next activity/task. As shown in FIG. 22B, the Class Payment application program then reveals the Class Payment next activity/task in a Class Payment activity window 2400, as described above, for the Class Registration activity.

The user may also access next activities/tasks via, the Options mode. To illustrate, if the same user is responsible for an activity and corresponding next activity/task or next activity/task and corresponding next activity/task that occur sequentially, then the user may access the next activity/task from the activity or next activity/task window via the Options mode. For example, since the user (DBS) is responsible for both the Class Payment next activity/task and the just completed Class Registration activity, then DBS may access the Class Payment next activity/task from the Class Registration window via the Options mode.

Figure 22C:
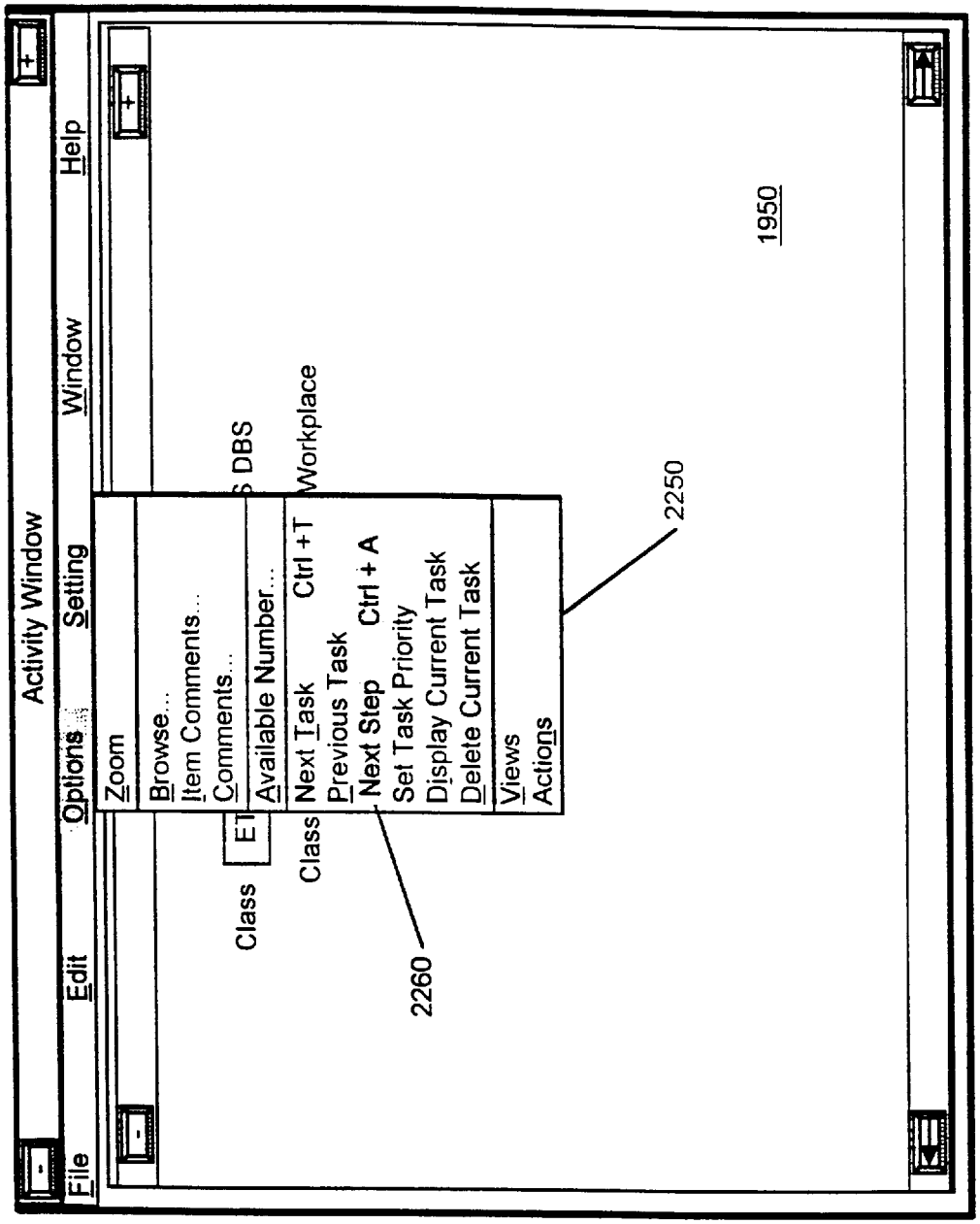
FIG. 22C depicts a computer screen, according to a preferred embodiment of the present invention, displaying an Options mode list accessed from the Class Registration activity window, where the user may select the Next Step command to access the next activity that occurs sequentially after the Class Registration activity and which the user is responsible for performing.

To illustrate, as shown in FIG. 22C, after DBS had completed registering for the SC101 class in the Class Registration activity window 1950, DBS accesses the Options mode. In doing so, the Class Registration application program calls the Options application program, which reveals a list of options 2250 for the user to select from. Next, in order to access the sequential next activity/task in connection with the Class Registration activity, the user selects the Next Step option 2260 from the Options mode list 2250.

Upon accessing the Next Step option 2260, the Option application program calls the Class Registration application program to obtain information to be sent to a Next Step application program. The information obtained is the USER_ID, ACTIVITY_ID, and a key value, which, for this example, is SC101 for the class value (COL_VAL_1) as well as its corresponding column identifier (COL_ID_2). The Options application program then calls the Next Step application program and sends the USER_ID formatted as the OWNER_ID and FROM_USER_ID for DBS, the ACTIVITY_ID formatted as the FROM_ACT_ID for the Class Registration activity, the COL_VAL_1 for SC101, and the COL_ID_1 for the class heading to the Next Step stored procedure.

Figure 23:
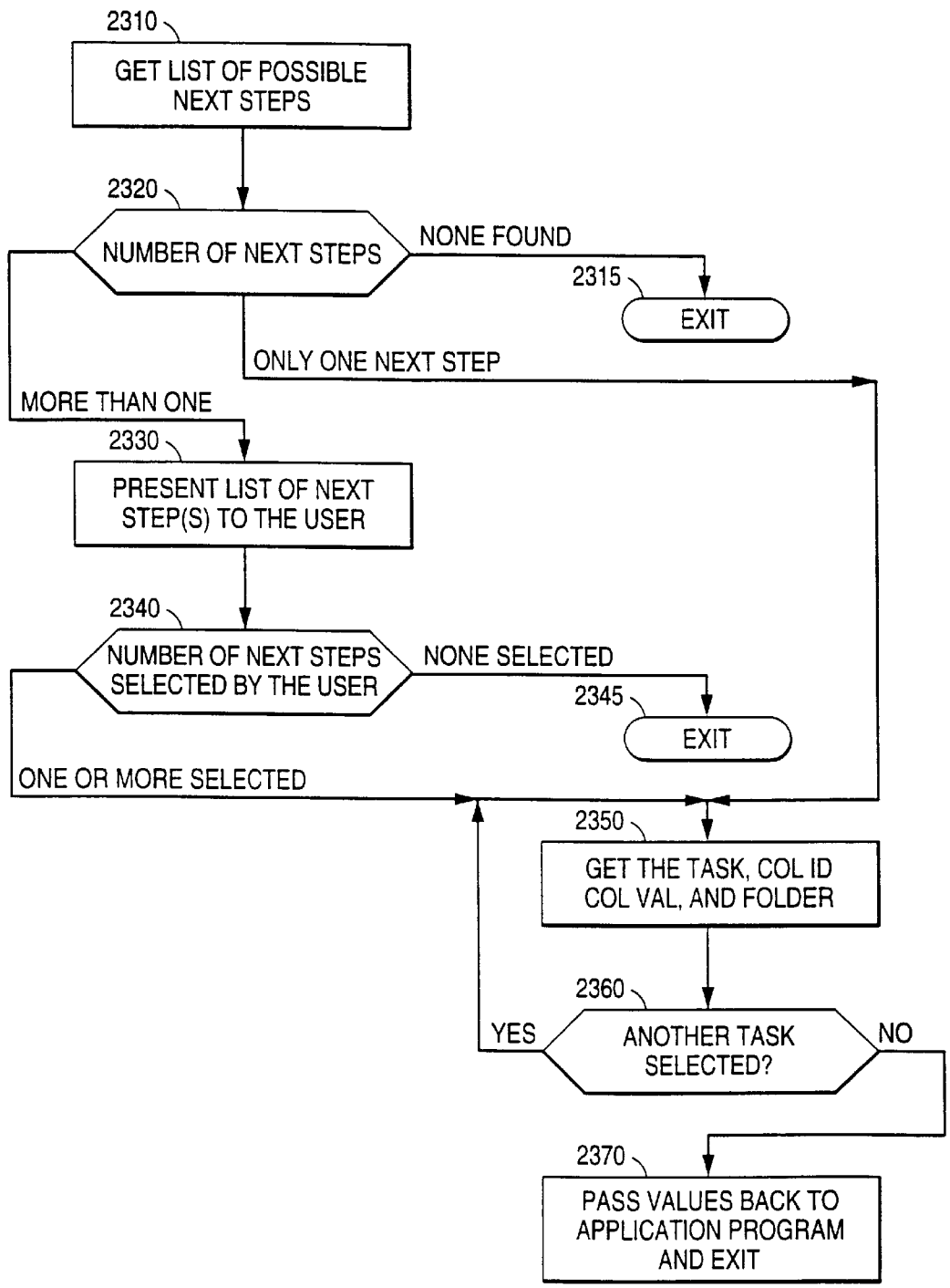
FIG. 23 depicts a flow diagram of a preferred embodiment of the Next Step procedure which determines the next activity that occurs sequentially after the just completed activity or next activity and which the user is responsible for performing.

The Next Step stored procedure is illustrated in FIG. 23. In one embodiment, the Next Step stored procedure is called psp_mque next step_1. At step 2310, the Next Step stored procedure obtains a list of all possible next steps in connection with the just completed activity for that user. In doing so, the Next Step stored procedure accesses the MESSAGE_QUEUE table 1140 (see FIG. 11) to obtain all next activities/tasks (represented as ACTIVITY_Ids) and their message identifiers (MSG_Ids) for the OWNER_ID and FROM_USER_ID corresponding to DBS, the FROM_ACT_ID for the Class Registration activity, and the key value corresponding to SC101 (COL_VAL_1) for the class heading (COL_ID_1). The Next Step stored procedure then proceeds to step 2320.

At step 2320, the Next Step stored procedure calculates the number of next steps encountered. If the number of next steps encountered equals zero, then the Next Step stored procedure is exited at step 2315 and a message to this effect is sent back to the Next Step application program which reveals this to the user. If there is only one Next Step, then the stored procedure proceeds to step 2350. However, if the number of next steps equals one or more, then the Next Step stored procedure proceeds to step 2330.

At step 2330, the Next Step stored procedure sends the ACTIVITY_Ids and MSG_Ids to the Next Step application program, which lists each next activity/task in a window (not shown) that corresponds to the just completed Class Registration activity for the SC101 class. The user may then select which next activities/tasks he or she would like to act upon. The Next Step application program then sends the ACTIVITY_Ids for these next activities/tasks selected back to the Next Step stored procedure. The Next Step stored procedure then proceeds to step 2340.

At step 2340, the Next Step stored procedure calculates the number of next steps selected by the user. If the number of next steps selected equals zero, then the Next Step stored procedure is exited at step 2345 and a message to this effect is sent back to the Next Step application program which exits the Options window 1950 (see FIG. 22C) accordingly. However, if the number of next steps selected equals one or more, then the Next Step stored procedure proceeds to step 2350.

At step 2350, the Next Step stored procedure accesses the MESSAGE_QUEUE table 1140 (see FIG. 11) and obtains the ACTIVITY_ID, FOLDERNO, and information contained in the COL_Ids and COL_VALs for the first next activity/task selected. The Next Step stored procedure then proceeds to step 2360, where it determines whether there are any other next activities/tasks which need to be accessed from the MESSAGE_QUEUE table 1140. If not, then the Next Step stored procedure proceeds to step 2370.

However, if there are other next activities/tasks to be accessed from the MESSAGE_QUEUE table 1140, then the Next Step stored procedure returns to step 2350 and the above-mentioned information is obtained for the second next activity/task. This cycle continues until the pertinent information for each next activity/task selected by the user has been obtained by the Next Step stored procedure. The Next Step stored procedure then proceeds to step 2370.

At step 2370, the information related to each next activity/task selected by the user is sent back to the Next Step application program. This includes all ACTIVITY_Ids, FOLDERNOs, COL_Ids, and COL_VALs. The Next Step stored procedure also sends a message as to the sequence that each next activity/task should be executed.

The Next Step application program then calls the application program responsible for performing the first next activity/task. If there are other next activities/tasks that need to be executed after the first (or current) next activity/task, then a message is sent to the application program indicating that it should call the Next Step application program upon completion of the first (current) next activity/task.

Figure 24:
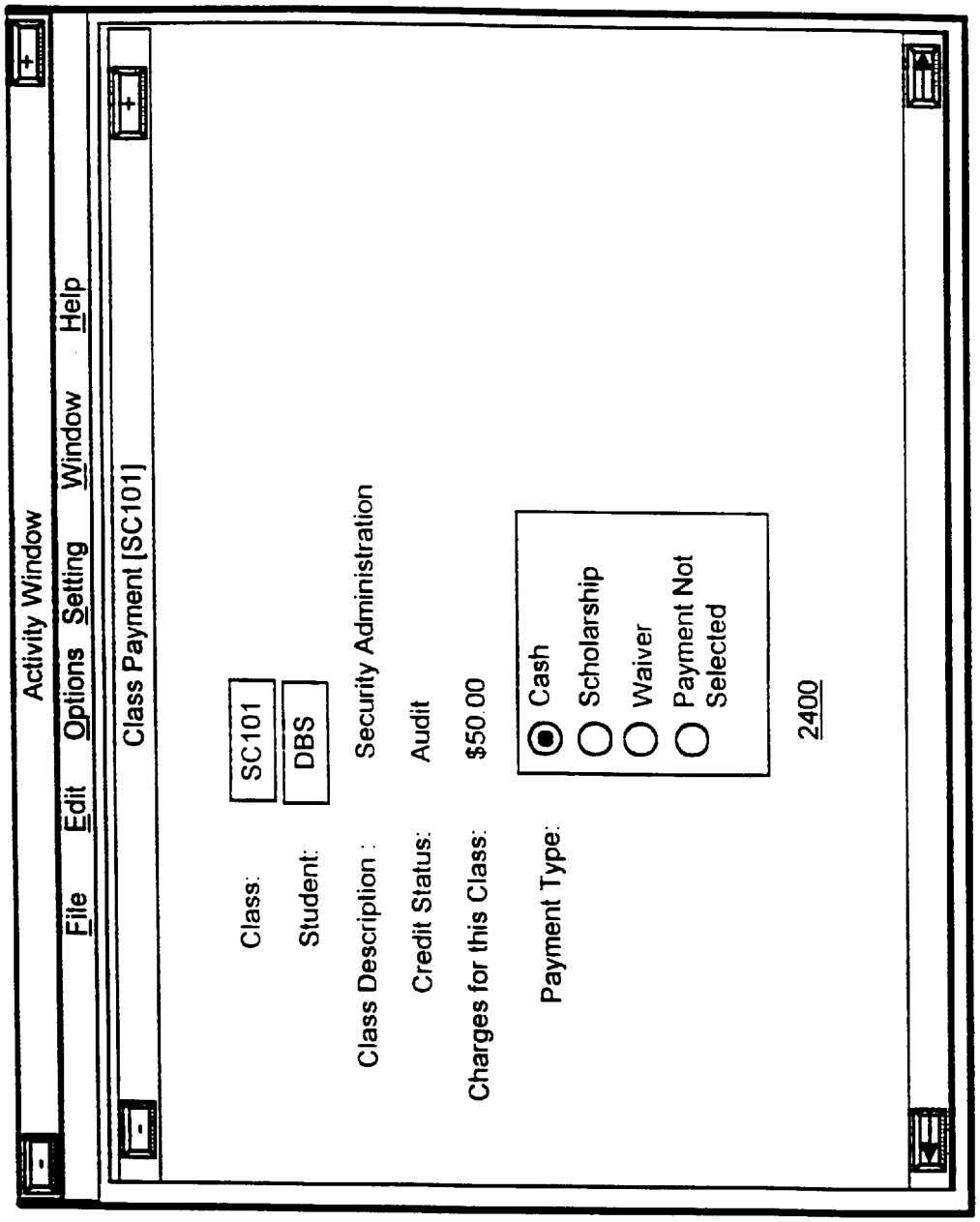
FIG. 24 depicts a computer screen, according to a preferred embodiment of the present invention, displaying an illustrative example of a Class Payment next activity window which is the sequentially subsequent next activity after the just completed Class Registration activity and which the user is also responsible for performing.

For this example, the Class Payment application program is called up. Therefore, referring to FIG. 24, the Class Payment application program reveals a Class Payment activity window 2400. As described in the foregoing, the user (DBS) may then complete the next activity/task by selecting the payment type (e.g., cash), and events and next steps will be triggered accordingly.

In another aspect of the present invention, the user may utilize the Options mode from a just completed activity or a just completed next activity/task window to simply call some next activity/task to the screen. The next activity/task chosen is selected, based on the following criteria. First, the highest priority next activity/task for the same next activity/task category. If no next activities/tasks exist for the preceding next activity/ task category or the user has just completed an activity, then the highest priority next activity/task from the user's personalized To Do List is selected. If no next activities/tasks exist in the user's personalized To Do List, then the highest priority next activity/task contained in any other To Do List in which the user has access is selected.

Figure 25:
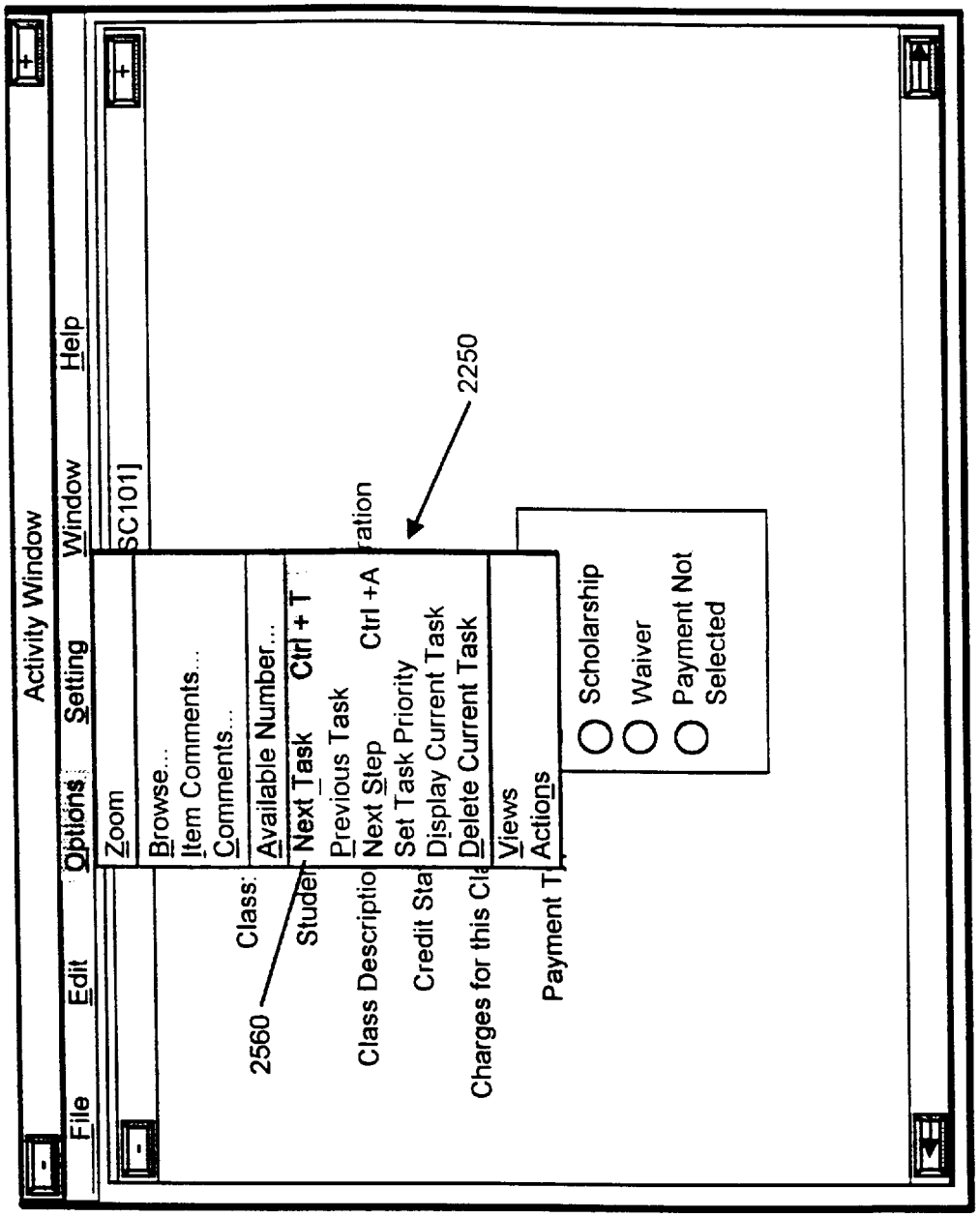
FIG. 25 depicts a computer screen, according to a preferred embodiment of the present invention, displaying an Options mode list accessed from the Class Registration activity window, where the user may select the Next Task command to access a next activity to the computer screen based on priority settings.

To illustrate, as shown in FIG. 25, after a user has completed registering for the SC101 class in the Class Registration activity window, the user (DBS) accesses the Options mode. In doing so the Class Registration application program then calls up the Options application program, which reveals a list of options 2250 for the user to select from. Next, the user selects the Next Task option 2560 from the Options mode list 2250.

Upon accessing the Next Task option, the Option application program calls the Class Registration application program to obtain information to be sent to the Next Task application program. The information obtained is the USER_ID, OWNER_type (user or work group), and ACTIVITY_ID. If the Options mode had been accessed from an application program associated with a next activity/task, then the MSG_ID and the FOLDERNO for the To Do List associated with the next activity/task would also have been obtained. The Option application program then calls the Next Task application program and sends it the USER_ID formatted as an OWNER_ID, the OWNER_TYPE and the ACTIVITY_ID. The Next Task application program then sends this information to the Next Task stored procedure.

In one embodiment, the Options application program calls the pam0015_next_msg (Next Task) application program, which sends the OWNER_ID, OWNER_TYPE, and ACTIVITY_ID to the psp_sel_mque_next_msg_1 (Next Task) stored procedure. If the Options mode had been accessed from an application program associated with a next activity/task, then the MSG_ID and FOLDERNO corresponding to the next activity/task would also have been sent to the Next Task stored procedure.

Referring to FIG. 26, the Next Task stored procedure is illustrated. At step 2610, the Next Task stored procedure checks the OWNER_TYPE to determine if the user has accessed the Next Task option from a user or work group list. If the user has accessed the Next Task option from a user list, then the Next Task stored procedure proceeds to step 2625. However, if the user has accessed the Next Task option from a work group list, then the Next Task stored procedure proceeds to step 2615.

At step 2615, the Next Task stored procedure determines if the user is currently a manager or member of the work group, in case the user's access privileges have been revoked since the time the user accessed the current work group list. If the user no longer has access privileges, then the Next Task stored procedure is exited at step 2618 and a message to this effect is sent back to the Next Task application program which reveals this to the user. If the user still has access privileges to the work group list, then the Next Task stored procedure proceeds to step 2625.

At step 2625, the Next Task stored procedure determines whether a folder number (FOLDERNO) for a To Do List was sent from the Next Task application program. If so, then the Next Task stored procedure understands that the Next Task option was called from either an individual user's or work group user's To Do List, and the stored procedure proceeds to step 2650.

At step 2650, the Next Task stored procedure determines if the To Do List represented by the FOLDERNO contains any of the same next activities/tasks categories represented as the MGS_Ids from the just completed next activity/task. If the FOLDERNO for the To Do List sent contains at least one same next activity/task category, then the Next Task stored procedure proceeds to step 2660. However, if the To Do List does not contain at least one same next activity/task category, the stored procedure proceeds to step 2652.

At step 2652, the Next Task stored procedure determines if the FOLDERNO for the To Do List sent contains at least one next activity/task. If the To Do List sent contains at least one next activity/task, then the Next Task stored procedure proceeds to step 2655.

At step 2655, the stored procedure evaluates each next activity/task in the user's To Do List sent to determine which next activity/task category (MSG_ID) has the highest sequence number and priority next activity/task. The sequence number is assigned to a next activity/task category by the user who will act upon the next activity/task, and the priority is assigned to the next activity/task by the user who is responsible for initiating the next activity/task. The Next Task stored procedure then proceeds to step 2660. On the other hand, at step 2652, if the Next Task stored procedure determines that the FOLDERNO for the To Do List sent does not contain at least one next activity/task, then the stored procedure proceeds to step 2630.

At step 2625, if a folder number was not sent to the Next Task stored procedure, then the stored procedure interprets this to mean that the activity is not currently in the context of a To Do List. An example of this occurs when the user selects the Next Task option from one of the user's activity lists. In this case, the stored procedure proceeds to step 2630.

Figure 11A:
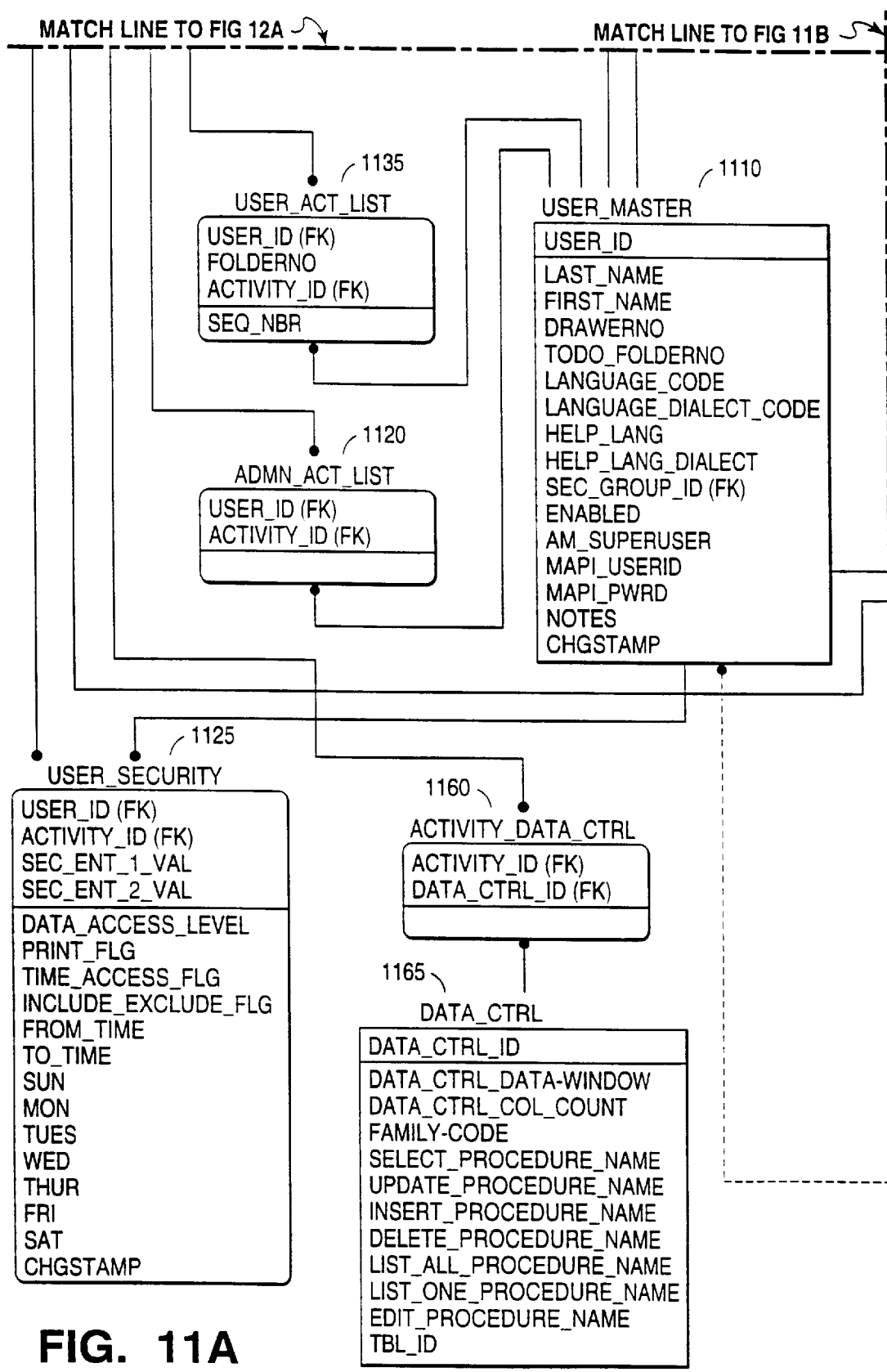
FIGS. 11–15 depict illustrative examples of tables used in a preferred embodiment of the present invention, including the tables relationships.
Figure 11B:
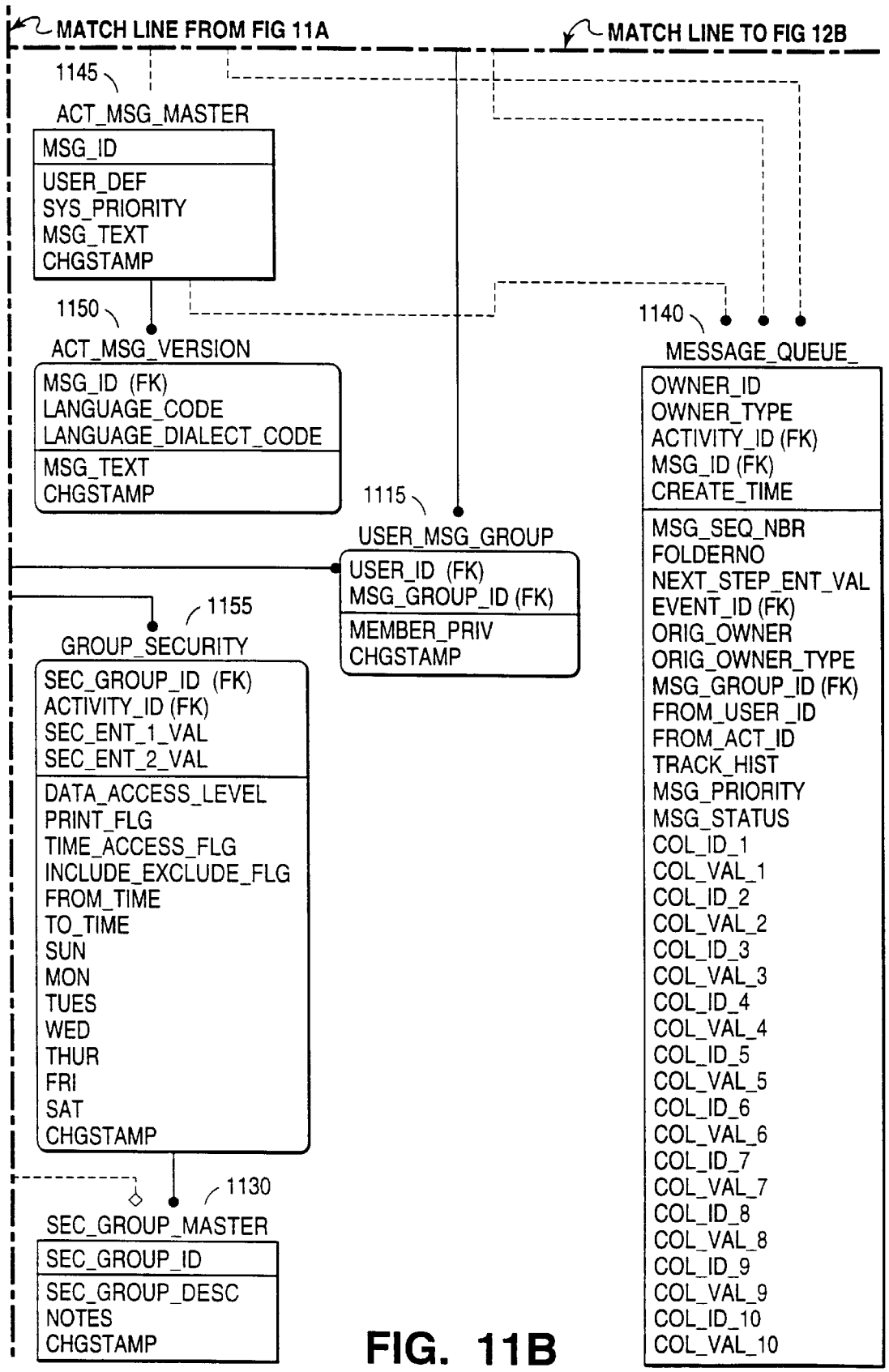
Figure 12A:
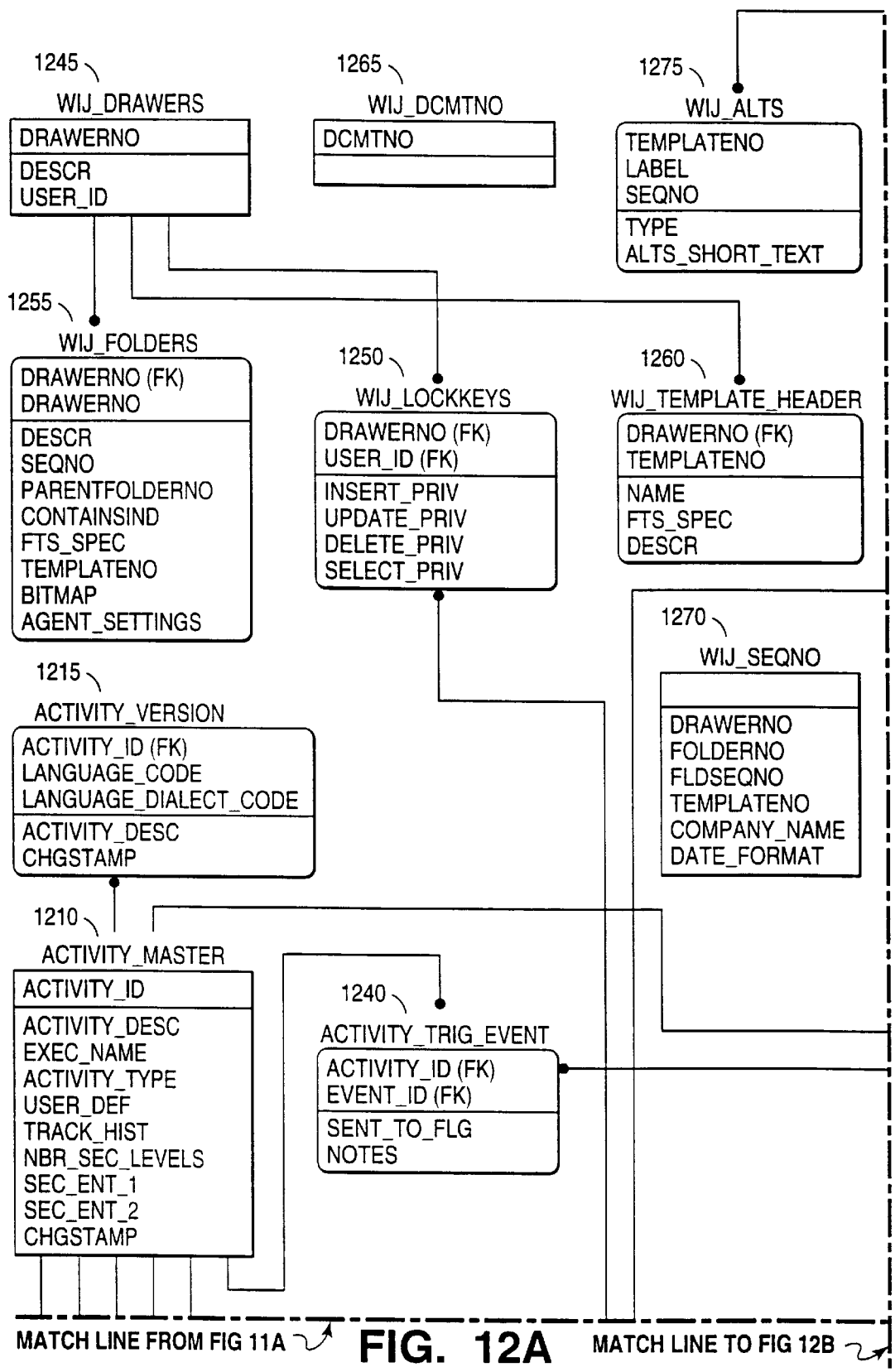
Figure 12B:
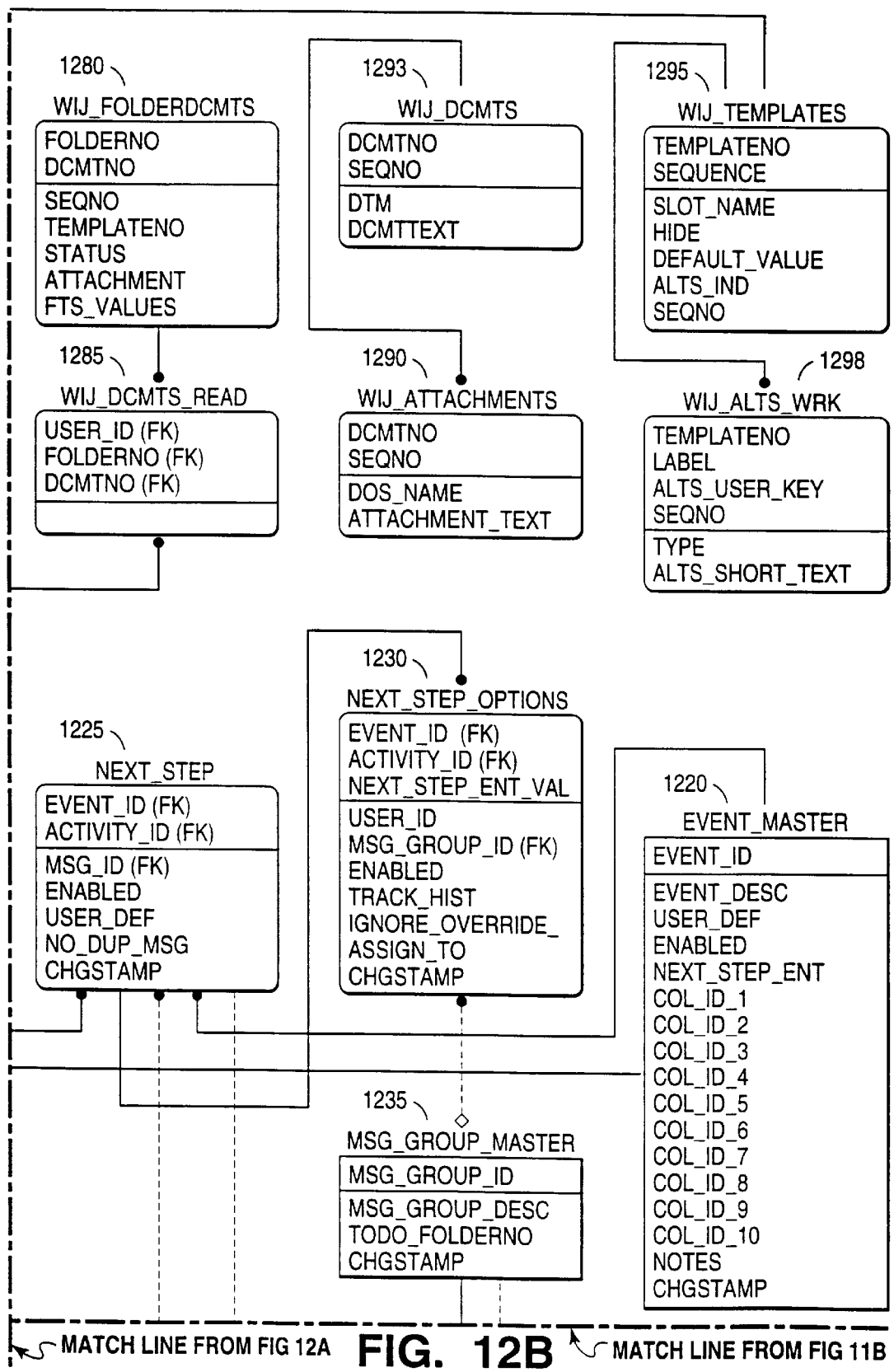
Figure 13:
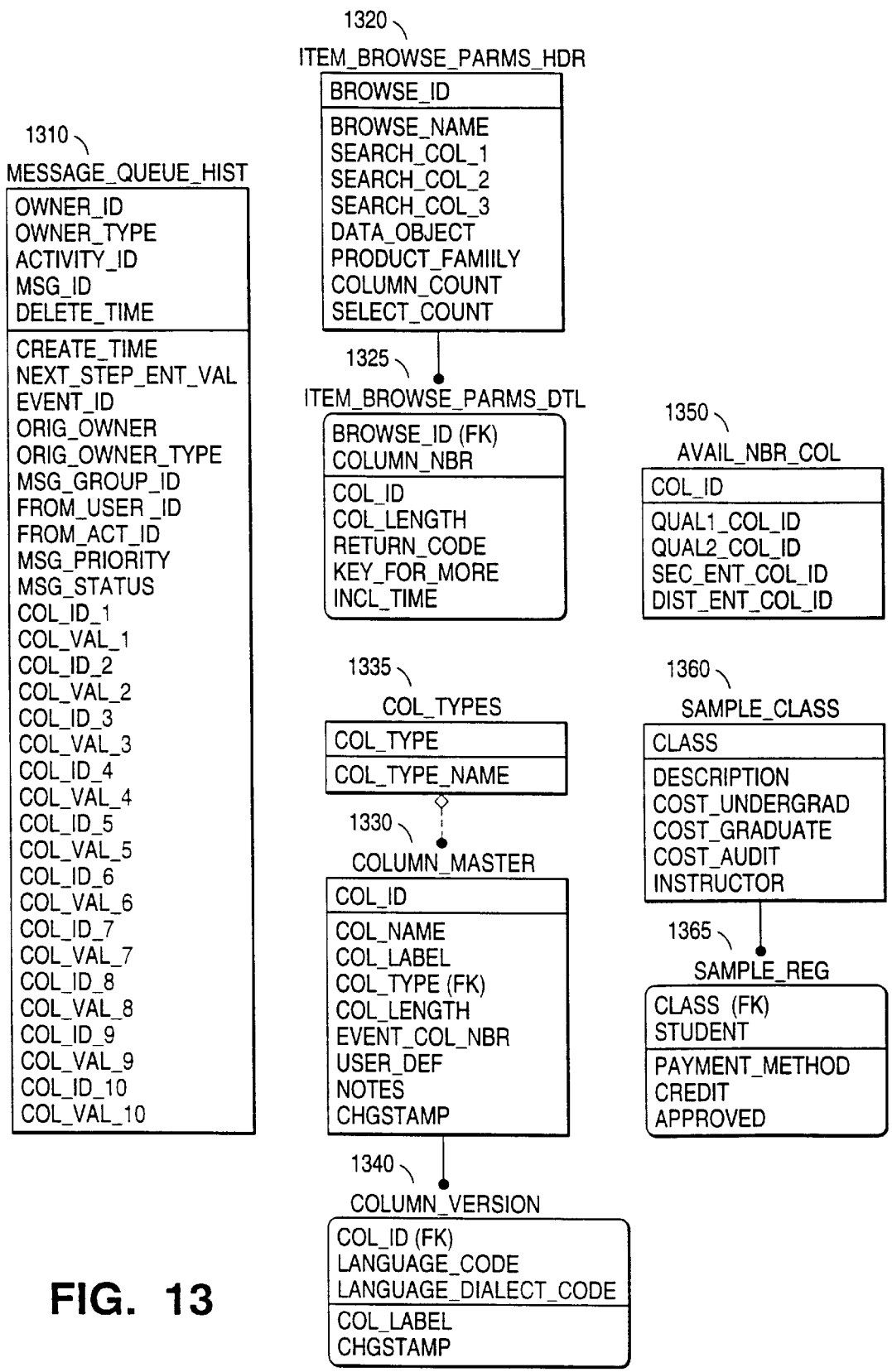
Figure 14:
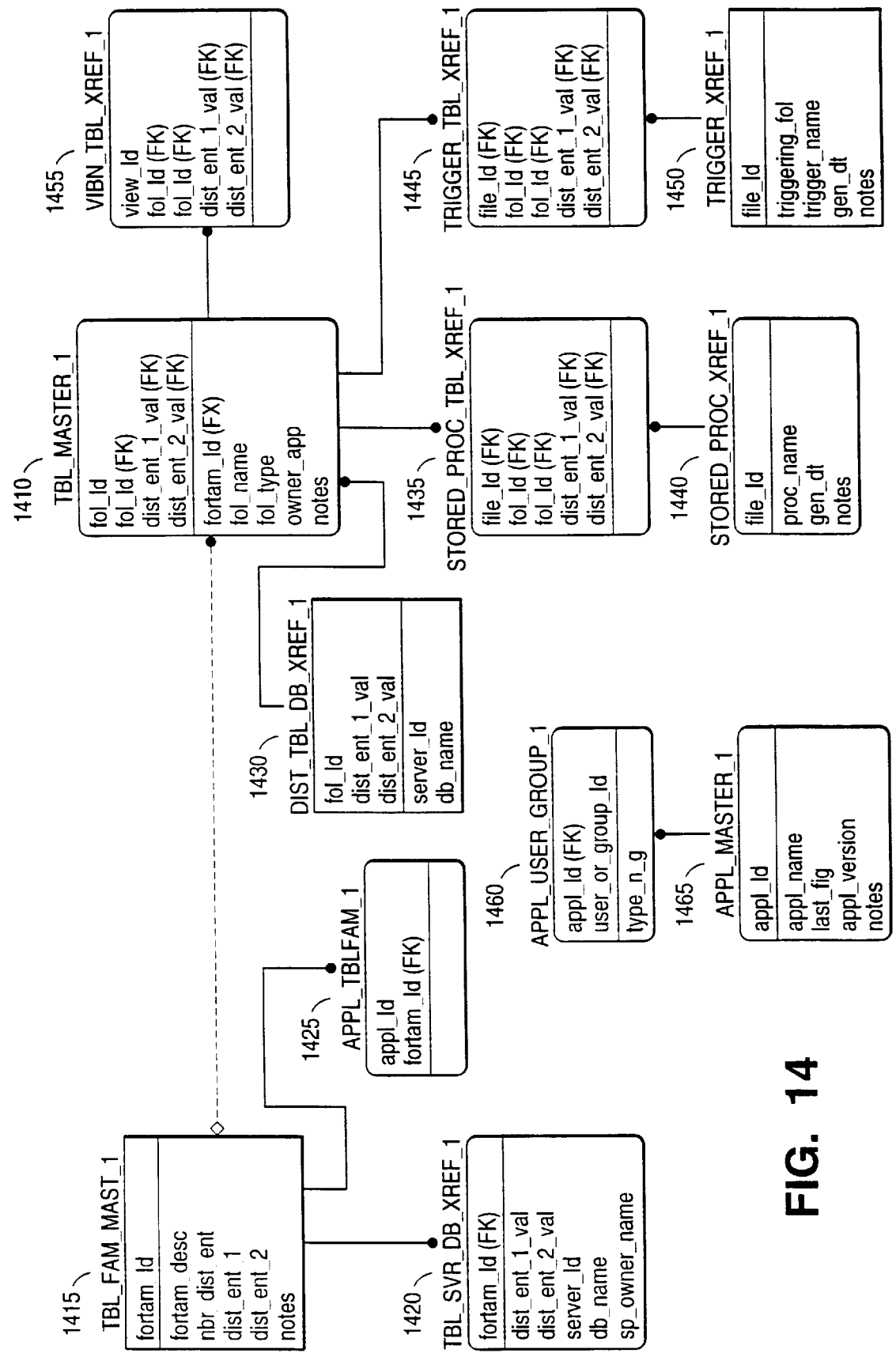

At step 2630, the Next Task stored procedure obtains the folder number for the user's personalized To Do List, represented as the TO DO_FOLDERNO, from the USER_MASTER table 1110 (see FIG. 11). Next, the Next Task stored procedure proceeds to step 2633 to determine if there is at least one next activity/task in the user's personalized To Do List.

If there is at least one next activity/task in the user's personalized To Do List, then the Next Task stored procedure proceeds to step 2635 to determine which next activity/task category, represented in the MSG_ID column, in the user's personalized To Do List has the highest sequence number and priority task. The Next Task stored procedure then proceeds to step 2660.

If the Next Task stored procedure does not find a next activity/task in the user's personalized To Do List at step 2633, then the stored procedure proceeds to step 2637. At step 2637, the Next Task stored procedure, scans all the user's other To Do Lists by FOLDERNO in the MESSAGE_QUEUE table 1140 (see FIG. 11) to determine if any other To Do Lists for the user contain next activities/tasks. If the Next Task stored procedure does not find a next activity/task in any of the user's other To Do Lists, then the stored procedure is exited at step 2645 and a message to this effect is sent back to the Next Task application program which reveals this to the user.

However, if one or more of the user's To Do Lists contain at least one next activity/task, then the Next Task stored procedure proceeds to step 2640. At step 2640, the Next Task stored procedure then evaluates each next activity/task in each of the user's To Do Lists to determine which next activity/task has the highest sequence number and priority task. The Next Task stored procedure then proceeds to step 2660.

At step 2660, the Next Task stored procedure selects a next activity/task based on the following hierarchy. First, the highest sequence number (MSG_SEQ_NBR) in the MESSAGE_QUEUE table 1140 for the task category, unless the stored procedure has proceeded from step 2650 such that the next activity/task category (MSG_ID) is already chosen. Second, the highest priority (MSG_PRIORITY) in the MESSAGE_QUEUE table 1140, where the priority may be high, medium, and low, for each next activity/task for the selected next activity task category. Third, the oldest create time (CREATE_TIME) in the MESSAGE_QUEUE table 1140 for the selected next activity/tasks with the highest priority in the selected next activity/task category.

If for some reason there are not any next activities/tasks encountered by the Next Task stored procedure in step 2660 (e.g., the user's access privilege to a To Do List was removed during the steps of the Next Task stored procedure as discussed above), then the stored procedure is exited at step 2665 and a message to this effect is sent back to the Next Task application program which reveals this to the user. However, if a next activity/task is selected at step 2660, then the Next Task stored procedure proceeds to step 2670. At step 2670, the Next Task stored procedures determines if the next activity/task selected is a work group next activity/task. If the next activity/task is not a work group next activity/task, then the stored procedure proceeds to step 2685.

However, at step 2670, if the next activity/task is a work group next activity/task, then the Next Task stored procedure proceeds to step 2675. At step 2675, the stored procedure determines whether the work group next activity/task still needs to be acted upon (e.g., has not already been assigned to another user within the work group or simply no longer needs to be acted upon). If the work group next activity/task still needs to be acted upon, then the stored procedure proceeds to step 2685. However, if the work group next activity/task no longer needs to be acted upon, the Next Task stored procedure proceeds to step 2680 where the stored procedure is instructed to "Try Again" by proceeding to step 2625 in order to locate another next activity/task as discussed above.

At step 2685, the Next Task stored procedure updates the message status (MSG_STATUS) column for the next activity/task (ACTIVITY_ID) selected to a "viewed" status. This status indicates that user is about to view the next activity/task. This status is one of several possible statuses. Other possible statuses include the "new" status, which indicates the next activity has recently been created and there have not been any users notified of its existence; the "notified" status which indicates that at least one user has been notified that the next activity/task exists; and the "complete" status which indicates that the next activity/task has been viewed, acted upon, and completed by a user.

Next, the Next Task stored procedure proceeds to step 2690, where, as long as the next activity/task still needs to be acted upon, pertinent next activity/task values are obtained from the MESSAGE_QUEUE table 1140 (see FIG. 11) to be sent to the activity application program which will perform this next activity/task. However, if for some reason the next activity/task no longer needs to be acted upon for whatever reason, then the Next Task stored procedure proceeds to step 2680 where the stored procedure is instructed to "Try Again" by proceeding to step 2625 in order to locate another next activity/task as discussed above.

Finally, if the pertinent values are obtained by the Next Task stored procedure at step 2690, then the stored procedure is exited at step 2699. At step 2699, the pertinent values are then sent back to the Next Task application program, which forwards them to the appropriate activity application program to perform the next activity/task.

Figure 27:
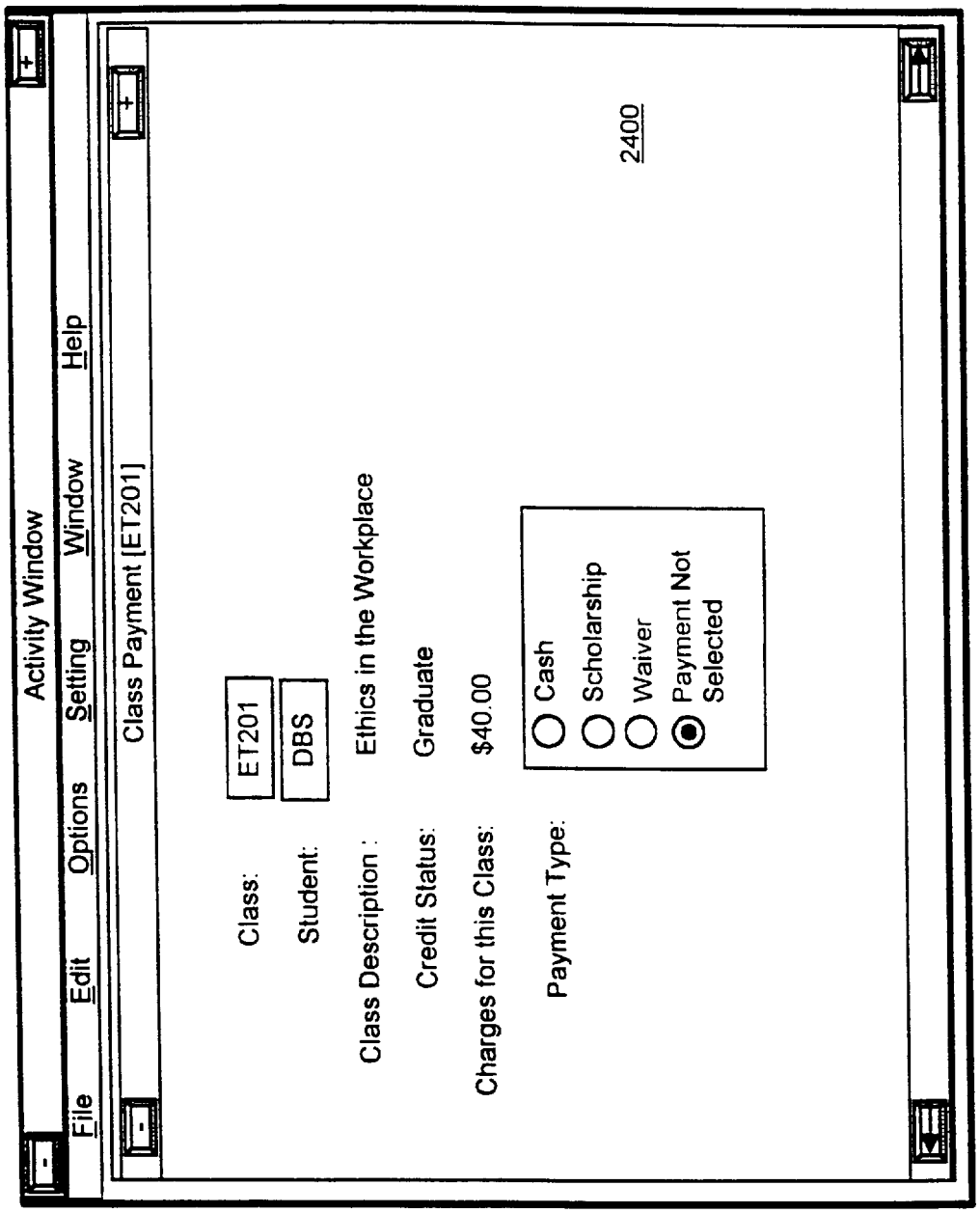
FIG. 27 depicts a computer screen, according to a preferred embodiment of the present invention, displaying an illustrative example of a Class Payment next activity which was selected by the Next Task procedure as a next activity that the user is responsible for performing.
Figure 28:
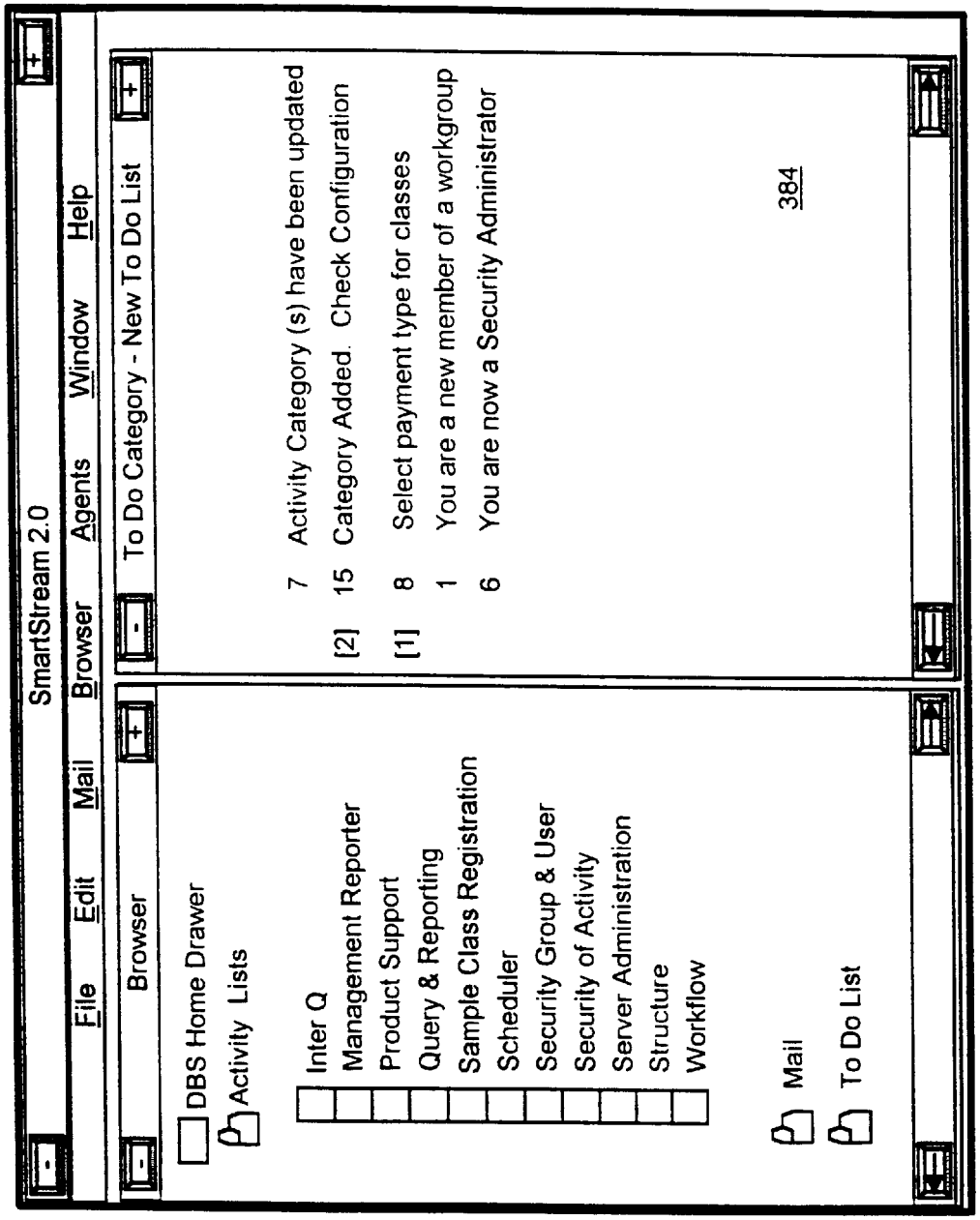
FIG. 28 depicts a computer screen, according to a preferred embodiment of the present invention, displaying an illustrative example of a "New To Do List" To Do List containing two class payment activities, represented by the "Select payment type for Class" Category, which have been completed (done).

For this example, referring to FIG. 27, the next activity/task category selected was class payment. Therefore, the activity application program is the Class Payment application program. Thus, the Class Payment application program reveals the Class Payment activity window 2400. For this example, the next activity/task selected is the class ET201 for student DBS for the Class Payment activity. Referring to FIG. 28, after the user has completed the two next activities/ tasks for the Class Payment activity, the summary To Do Category window 384 reveals that two Class Payment next activities/tasks exist and have both been completed (done).

Among other responsibilities, the administrator of the computer system of the present invention is responsible for the following. He or she defines entities (e.g., plants, sites, etc.); assigns USER_Ids to new users of the computer system of the present invention; assigns users to work groups; defines and maintains the security privileges of the users and work groups (e.g., which activities and next activities/tasks a user may access); disables and defines new next steps to comply with an organization's procedures; defines users and work groups responsible for performing next steps; changes the text of messages and other window text for each activity and next activity/task; and enters translated versions of messages and other window text for non-English speaking users.

A more complete understanding of the aforementioned component aspects of the present invention may be obtained by reference to Sections VIII-I through VIII-IX, infra.

The following illustrates how an administrator may define a new next step. As described above, for each activity, an event will be triggered. When an event is triggered, one or more next steps will be selected which will result in a new next activity/task being added to a user's or work group's To Do List.

Figure 29:
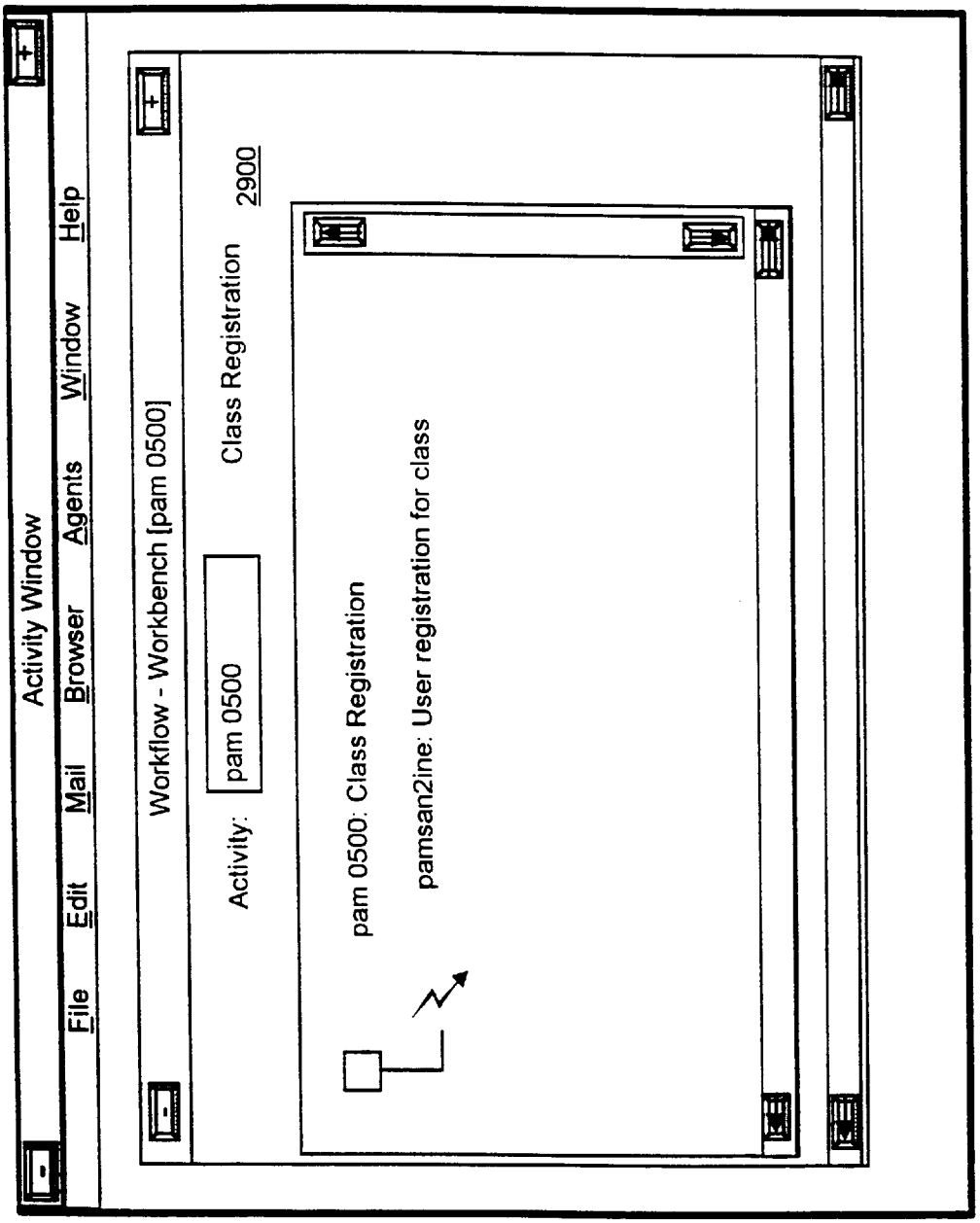
FIG. 29 depicts a computer screen, according to a preferred embodiment of the present invention, displaying the Workflow Workbench mode accessed by an administrator of the computer system of the present invention which displays an activity or corresponding event so that the administrator may define information flow procedures.

Referring to FIG. 29, the administrator accesses the Workflow Workbench activity from the administrator's list of activities (not shown). The Workflow Workbench activity window then displays an activity selected by the administrator, the activity application program name for that activity, all possible events for that activity, and the stored procedure name for each event in the WorkFlow Workbench window 2900. For this example, the Class Registration activity with its pam0500 activity application program name is displayed. For this activity, only one event exists. This event is "User registers for Class" (e.g. user adds a class) and the event identifier for the event is pamsam2ins.

Figure 30:
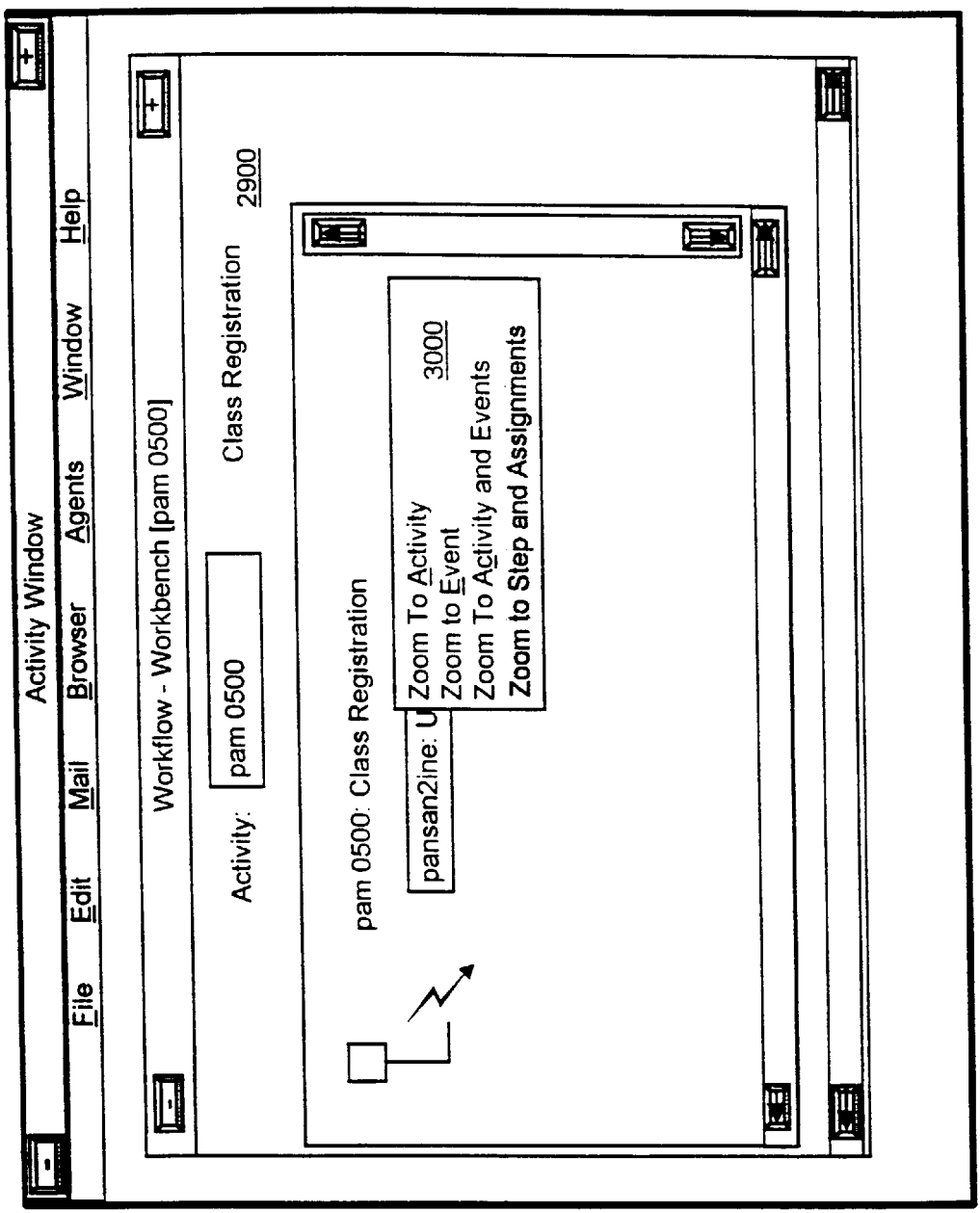
FIG. 30 depicts a computer screen, according to a preferred embodiment of the present invention, displaying the Zoom options list window, where the administrator may select an option to set up next steps in defining an information flow procedure.
Figure 31:
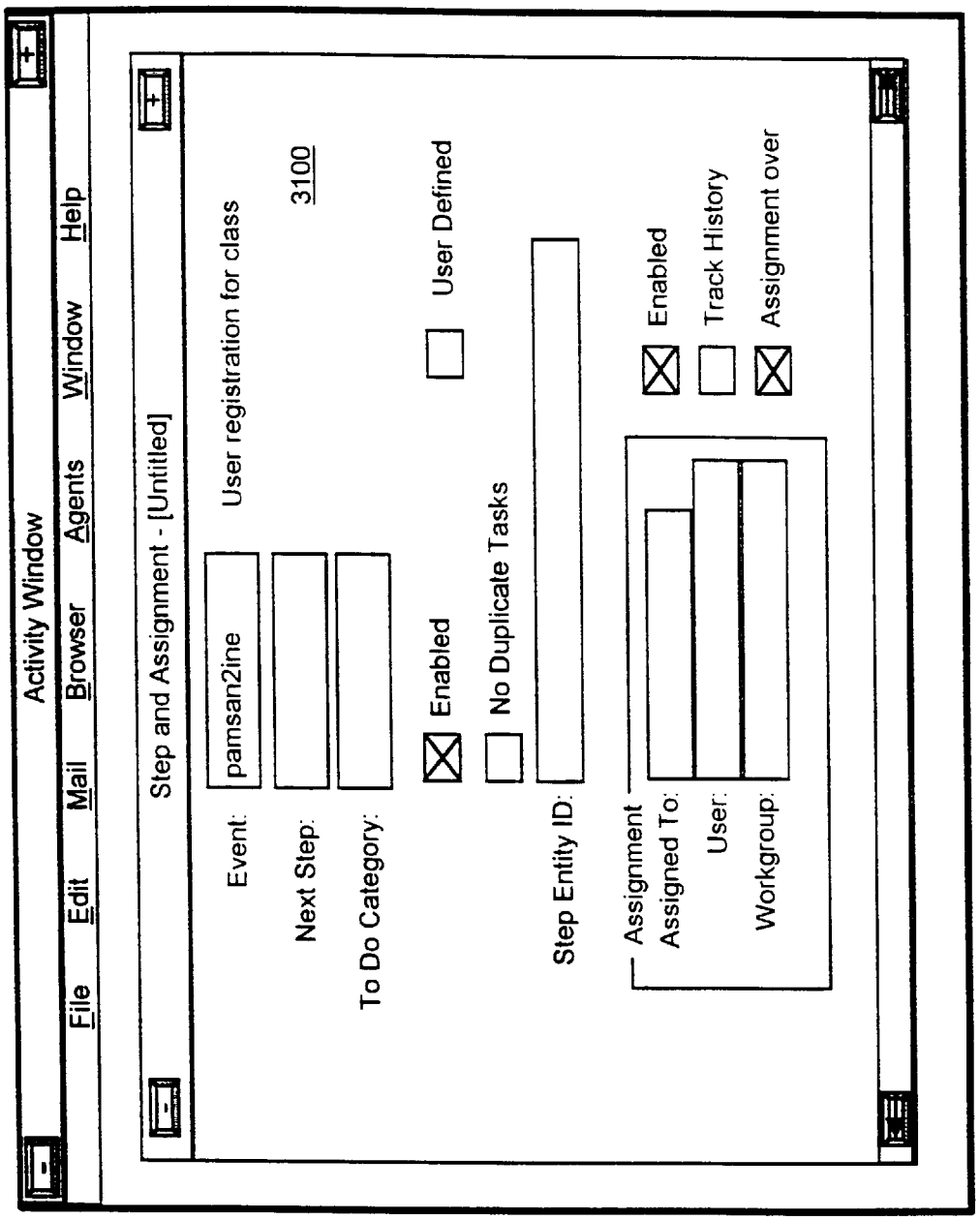
FIG. 31 depicts a computer screen, according to a preferred embodiment of the present invention, displaying the Step Assignments window which was selected from the Zoom options list window, where next steps may be assigned by the administrator.

Referring to FIG. 30, to add a new next step, the administrator may select, the "Zoom to Step and Assignments" option from a Zoom options list submenu (not shown). The user may access this option by selecting the Options mode and Zoom option from the Options mode list (not shown). The main application program then displays the Zoom mode list 3000 in which the "Zoom to Step and Assignments" may be selected. The Step and Assignments window 3100 is then displayed, as shown in FIG. 31, with the event selected.

Figure 32:
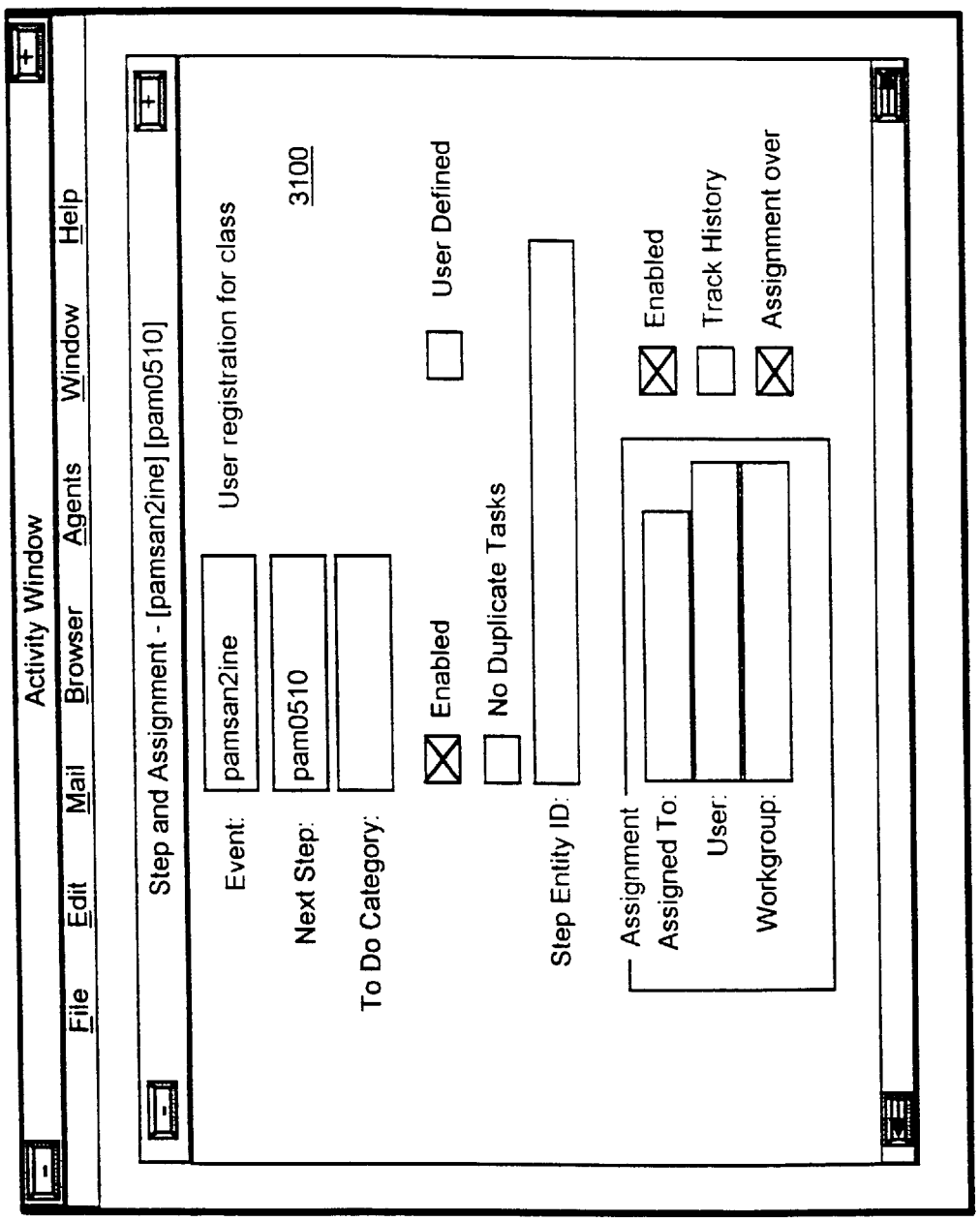
FIG. 32 depicts a computer screen, according to a preferred embodiment of the present invention, displaying the Step Assignments window of FIG. 31, where the administrator has partially selected next steps for the given activity.

Referring to FIG. 32, in the Step and Assignments window 3100, the administrator then selects an activity (next activity/task) application program from a list of next activities/tasks as the next step in the work flow process. For this example, the administrator has chosen pamO5lo, which represents the Class Payment application program. The administrator also selects the Enabled box to enable this new next step. Moreover, for this example, the Assignment Override box is selected by the administrator such that any user or workgroup information entered by the administrator will override any default values contained in the Class Payment application program. The main application program then sends the activity identifier for the next activity/ task (ACTIVITY_ID) and event identifier (EVENT_ID) to a stored procedure. In one embodiment, the name of the stored procedure is psp_ins_nxtm. This stored procedure then creates a new row for the next step represented by its ACTIVITY_ID and EVENT_ID in the Next Step table 1225 (see FIG. 12). The stored procedure then sends a message to the main application program revealing that the row has been created.

Figure 33:
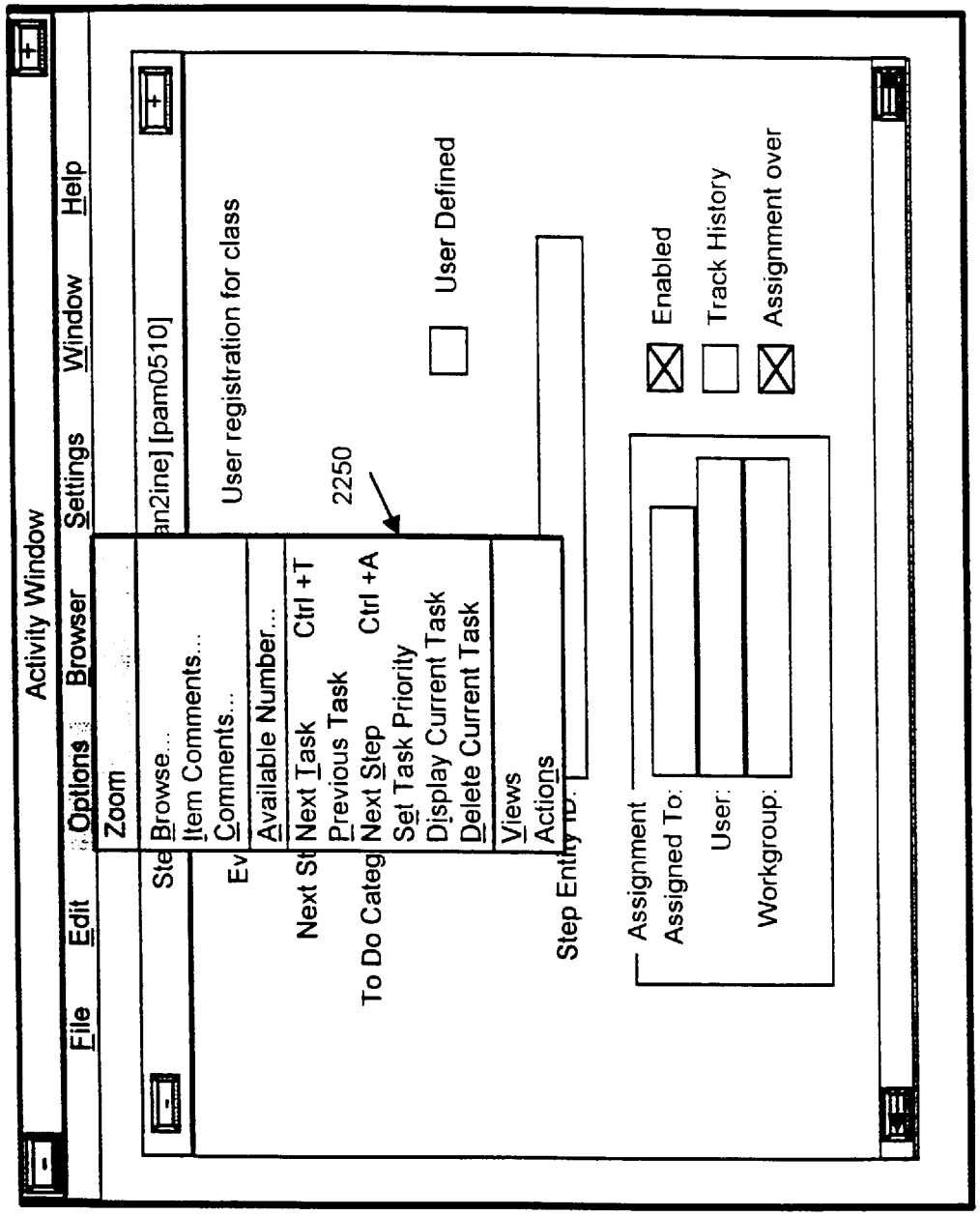
FIG. 33 depicts a computer screen, according to a preferred embodiment of the present invention, displaying the Options mode list, where the Zoom option has been selected so that a next activity may be selected.
Figure 34:
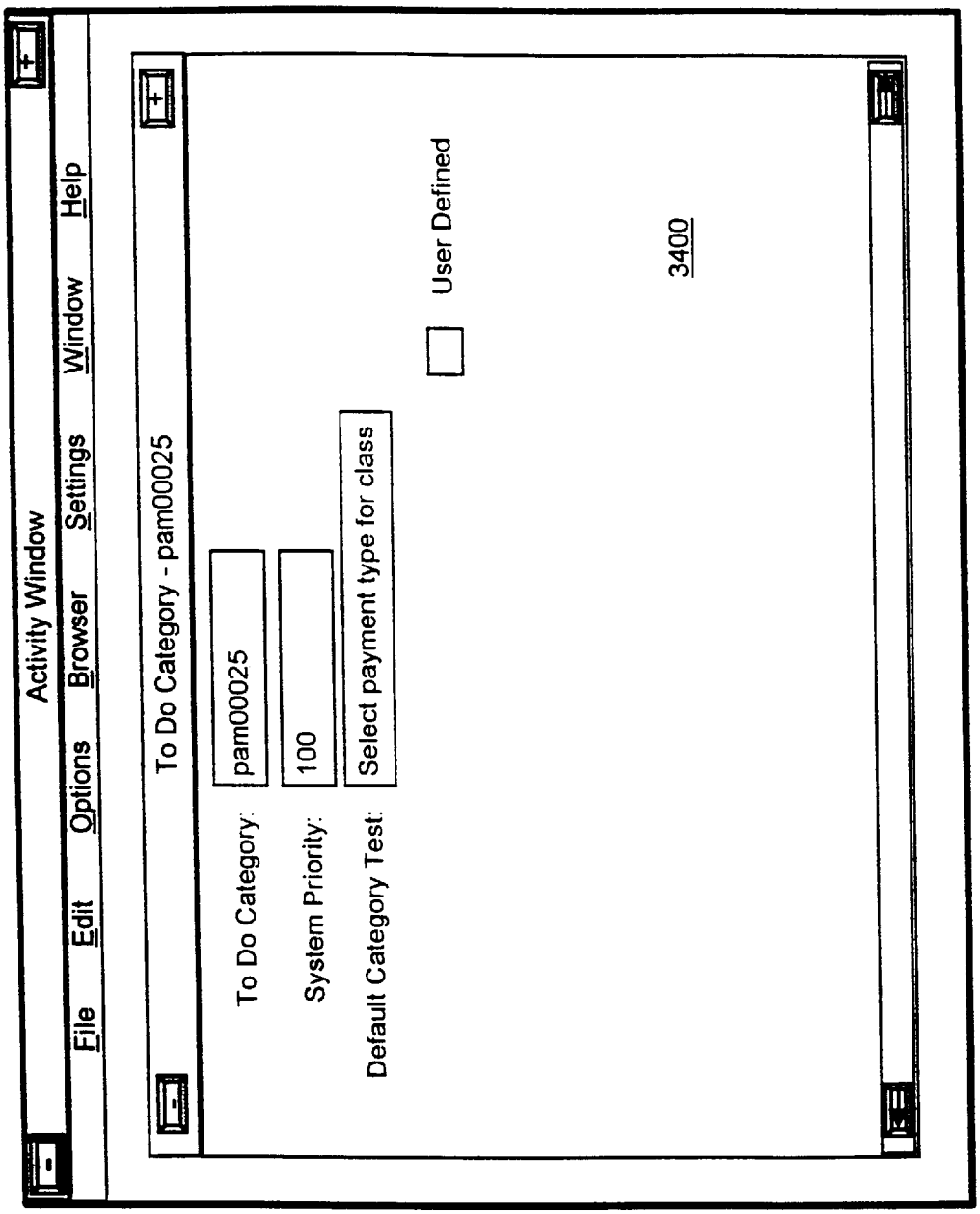
FIG. 34 depicts a computer screen, according to a preferred embodiment of the present invention, displaying a To Do Category window accessed from the Zoom option, where a next activity is selected by the administrator.

Next, the administrator selects a message representative of a next activity/task category in which to identify the next activity/task in a user or work group's To Do List. Referring to FIG. 33, the administrator accomplishes this by selecting the Options mode and Zoom option from the Options mode list 2250. As shown in FIG. 34, the main application program then reveals a To Do Category window 3400 which displays the default next activity/task category message, which the administrator may modify if he or she chooses. The To Do Category window 3400 also allows the administrator to assign a system priority to the next activity/task category, and to select if the next activity/task category will be user defined. The Main Application Program then sends the activity identifier (ACTIVITY_ID) for the next activity/ task, the event identifier (EVENT_ID), the category message identifier (MSG_ID), the message text, the user defined (USER_DEF) information, and the system priority information to a stored procedure. This stored procedure then stores the MSG_ID and the USER_DEF for the ACTIVITY_ID and EVENT_ID in the NEXT_STEP table 1225 (see FIG. 12).

Figure 35:
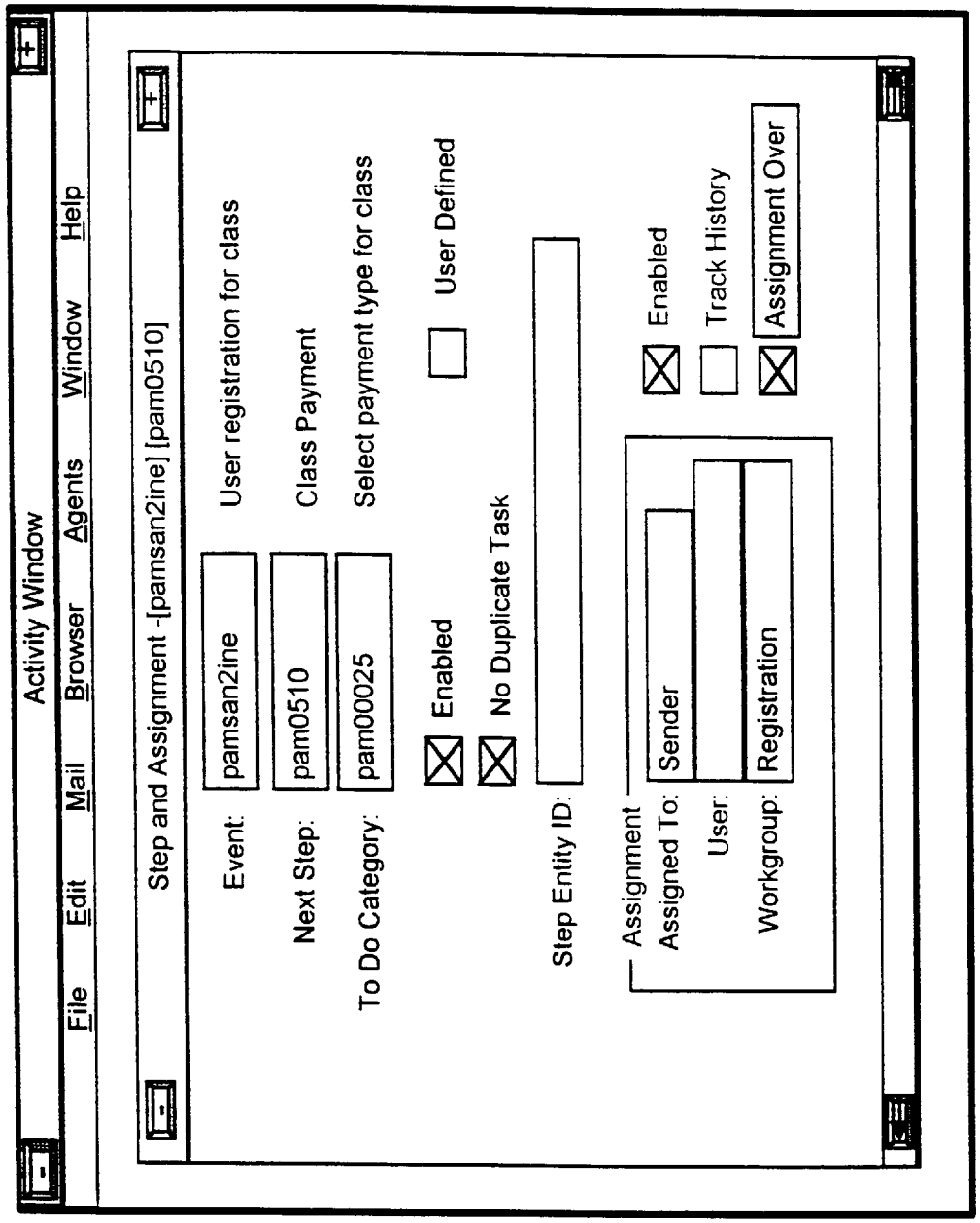
FIG. 35 depicts a computer screen, according to a preferred embodiment of the present invention, displaying the Step Assignments window of FIG. 31, where the users responsible for the next activity have been selected by the administrator.

Finally, the administrator may assign the next activity/ task to an entity, and a user and/or workgroup. Referring to FIG. 35, for this example, the administrator selects to assign the next activity/task to the default entity, represented as an asterisk (*), and the sender (e.g., the creator of the next activity/task) who is in the Registration workgroup.

Figure 36:
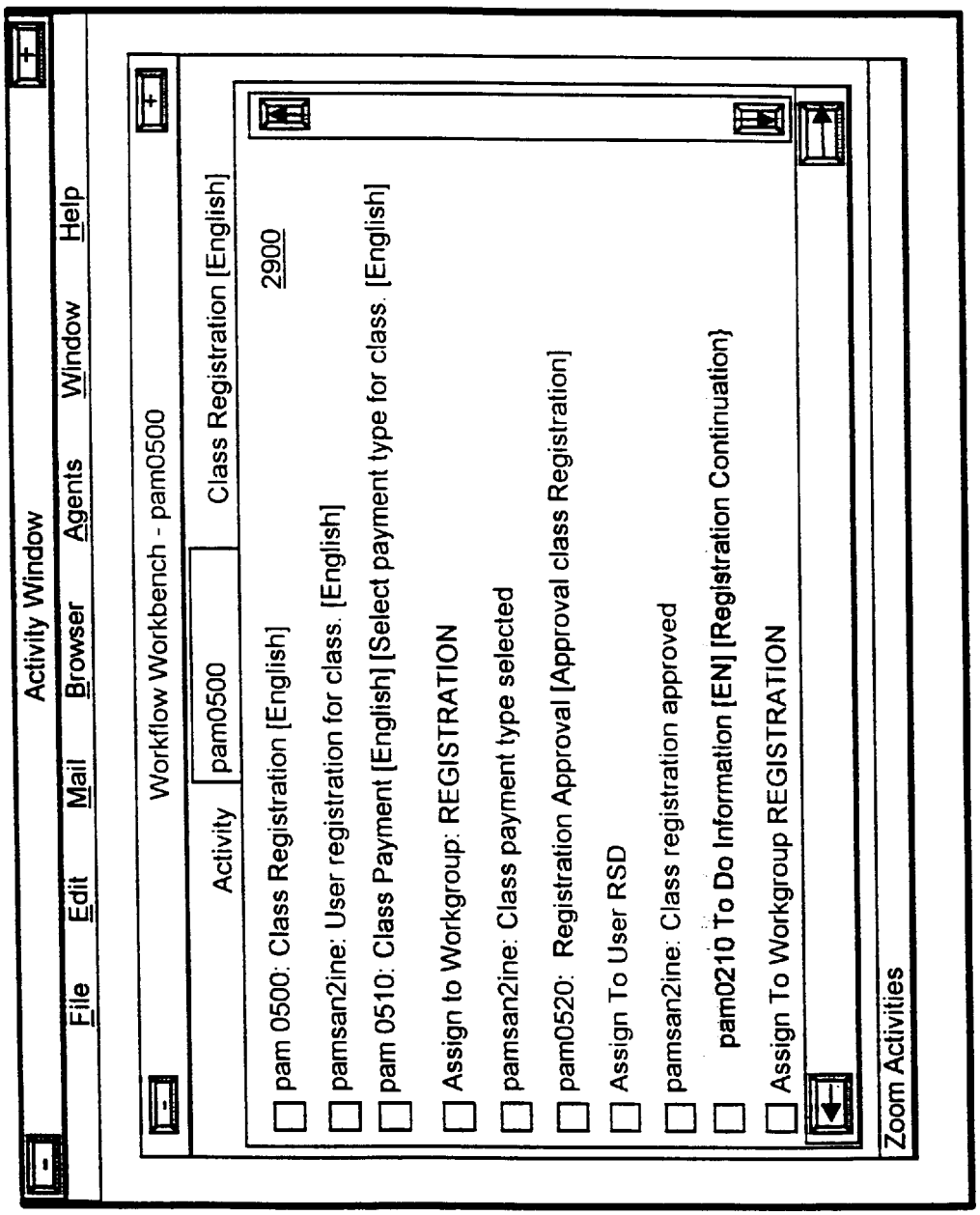
FIG. 36 depicts a computer screen, according to a preferred embodiment of the present invention, displaying an illustrative example of a Workflow Workbench window where next steps have been defined to complete an information flow procedure.

Referring to FIG. 36, as shown in the Workflow Workbench window 2900, the administrator may then add other next steps with corresponding assignments to a user or workgroup for the activity and each subsequent next activity/task. In this example, the administrator has assigned the Class Payment next activity/task to the Registration work group. Therefore, the work group identifier, represented as the MSG_GROUP_ID, is stored in the Next Step Options table 1230 (see FIG. 12). Other next steps selected by the administrator include the "Class payment type selected" (pamsam2up1) event with the next activity/task being "Registration Approval" (pam0520) which is assigned to user RSD.

The administrator may also activate the archiving feature of the computer system of the present invention. This feature may be used for backup and accountability purposes.

Figure 37:
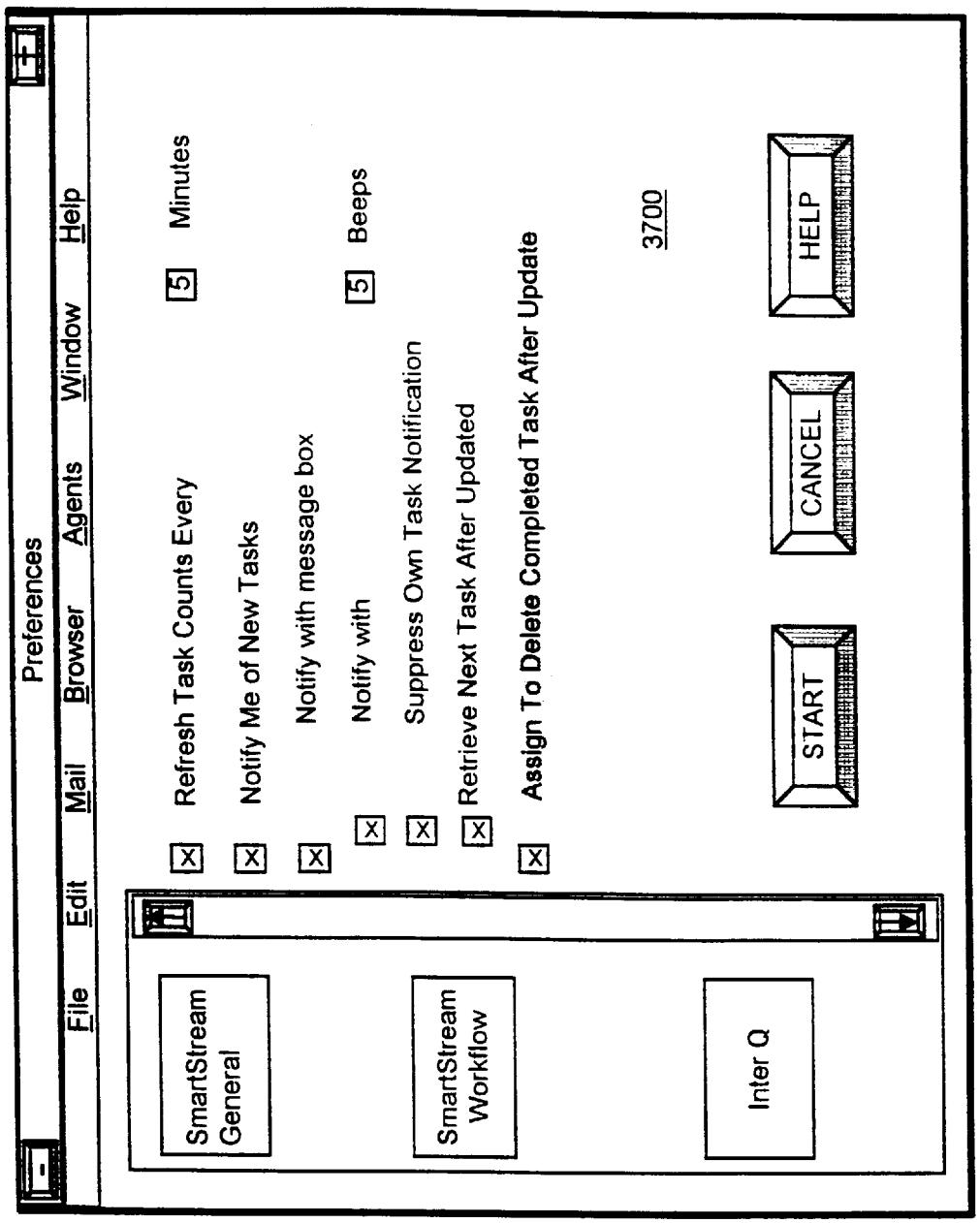
FIG. 37 depicts a computer screen, according to a preferred embodiment of the present invention, displaying the Preferences window which allows the user to select specific features relevant to his or her To Do List, including refresh task counts at certain time intervals and notify the user when a new next activity has been added to his or her To Do List.

As shown in FIG. 37, a user may access a variety of additional features included with the computer/system of the present invention in the Preferences window 3700. These features include selecting how often the user would like to have his or her number of uncompleted next activities/tasks recalculated. This feature is called the "Refresh Task Counts" feature. Further, the next activity/task counts are recalculated at the specified time intervals selected by the user as described above for the Summary To Do Category window (see FIG. 7).

The features a user may select from also include activating a notification feature which notifies the user of new next activities/tasks which have been added to one of his or her To Do Lists and need to be acted upon. This feature is called the "Notify Me of New Tasks" feature. The user may then select to be notified with a message box in any window the user is currently viewing or with a certain number of beeps. The user may also select the next activity/task notification feature to be suppressed when the next activity/task is created by the user.

When the "Notify Me of New Tasks" feature is activated, the main application program sends the user's USER_ID to a stored procedure at the time intervals specified by the user. In one embodiment, the name of the stored procedure is psp_sel_mque_list. This stored procedure then obtains the number for the user's personalized To Do List (TODO_FOLDERNO) from the USER_MASTER table 1110 (see FIG. 11) with the USER_ID. Next, the stored procedure accesses the MESSAGE_QUEUE table 1140 (see FIG. 11) and obtains the relevant information on the next activities/tasks in the user's personalized To Do List which have a MSG_STATUS equal to "new." Finally, information regarding these "new" next activities/tasks is sent back to the main application program, which notifies the user of them with the message box or the beep(s).

Further, the user may activate the "Retrieve Next Task After Update" feature. This feature performs relatively the same sequence of events as described for the Next Task feature of the present invention. However, by activating this feature, the Next Task application programs and stored procedures are automatically accessed after saving information for a next activity/task.

Figure 38A:
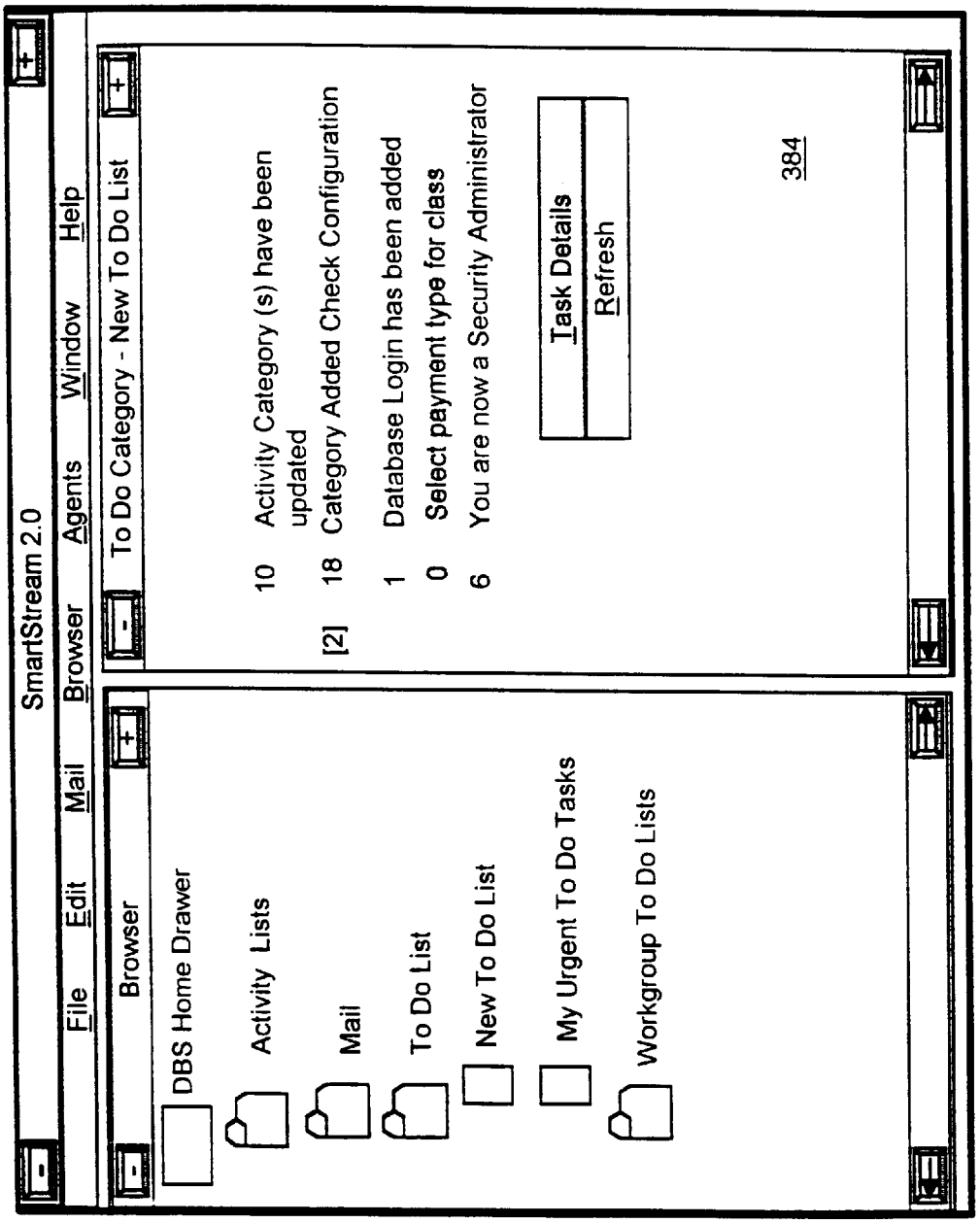
FIG. 38A depicts a computer screen, according to a preferred embodiment of the present invention, displaying a Summary To Do Category window, where completed next activities may be deleted manually.
Figure 38B:
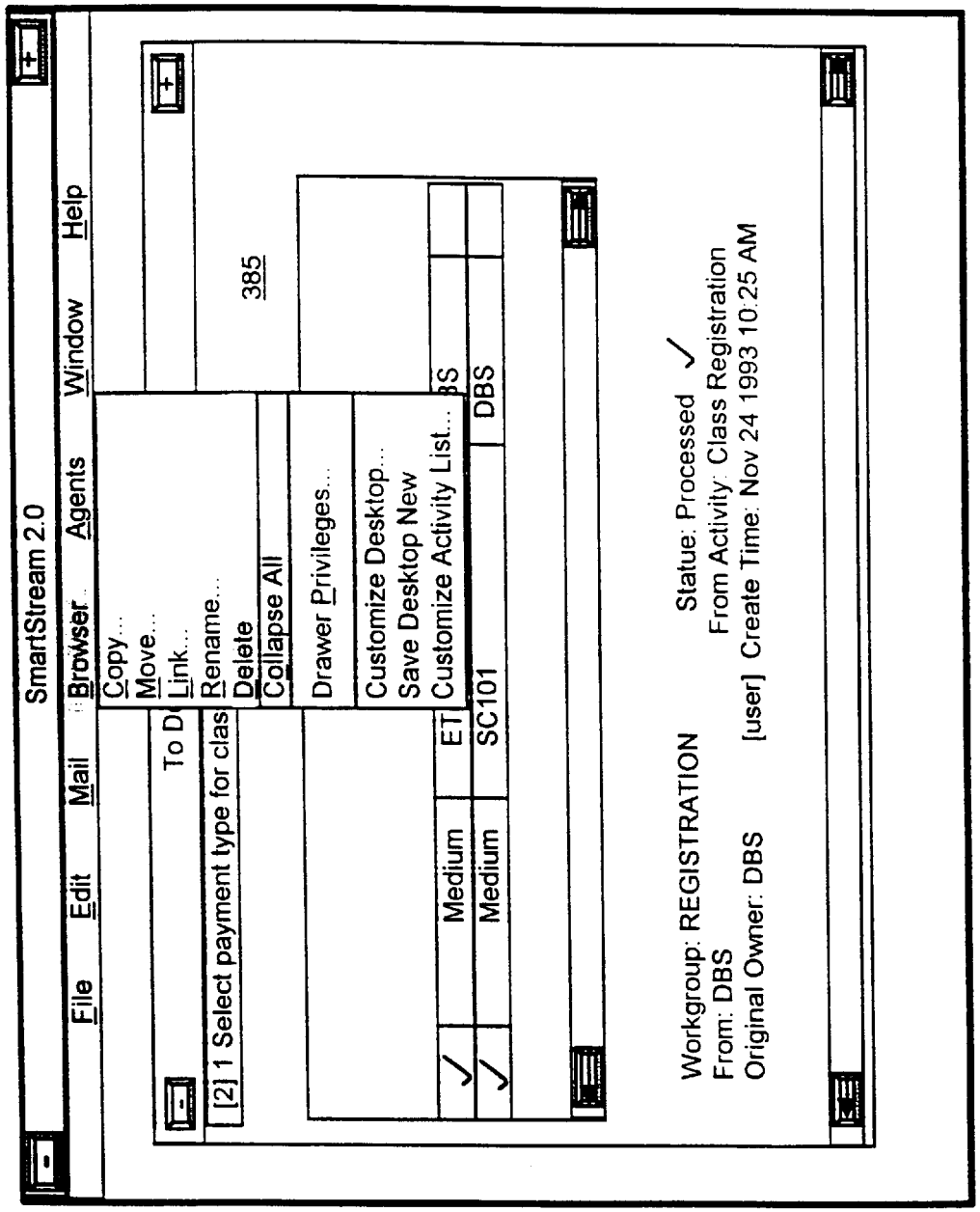
FIG. 38B depicts a computer screen, according to a preferred embodiment of the present invention, displaying a Detailed To Do Category window, where completed next activities may be deleted manually.

Moreover, the user may activate the "Delete Completed Tasks After Update" feature, which automatically deletes the next activity/task from the user's To Do List as shown in the Summary and Detailed To Do Category windows (see FIGS. 16H and 16L) when completed. When this feature is not selected, the Summary and Detailed To Do Category windows display the next activity/task as done or complete. As shown in FIG. 38A, the next activities/tasks may also be deleted manually by the user in the Summary To Do Category window 384 and Detailed To Do Category window 385 (see FIG. 38B).

Figure 39:
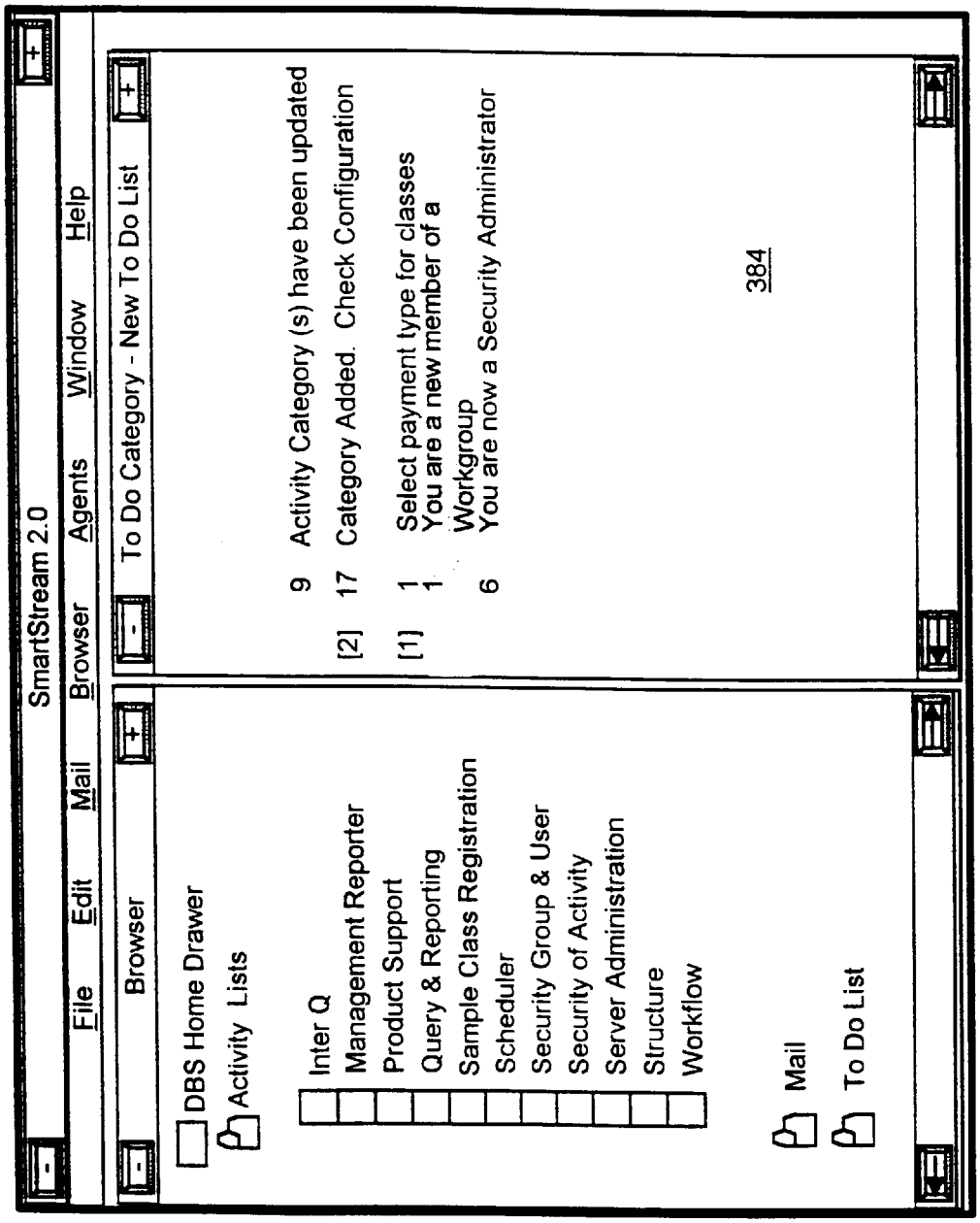
FIG. 39 depicts a computer screen, according to a preferred embodiment of the present invention, displaying a Summary To Do Category window, where the user may obtain detailed information on a particular next activity.

In another aspect of the computer system of the present invention, the user may obtain detailed information on a particular next activity/task. As shown in FIG. 39, the user may select a next activity/task category from the To Do Category window 384.

Figure 40:
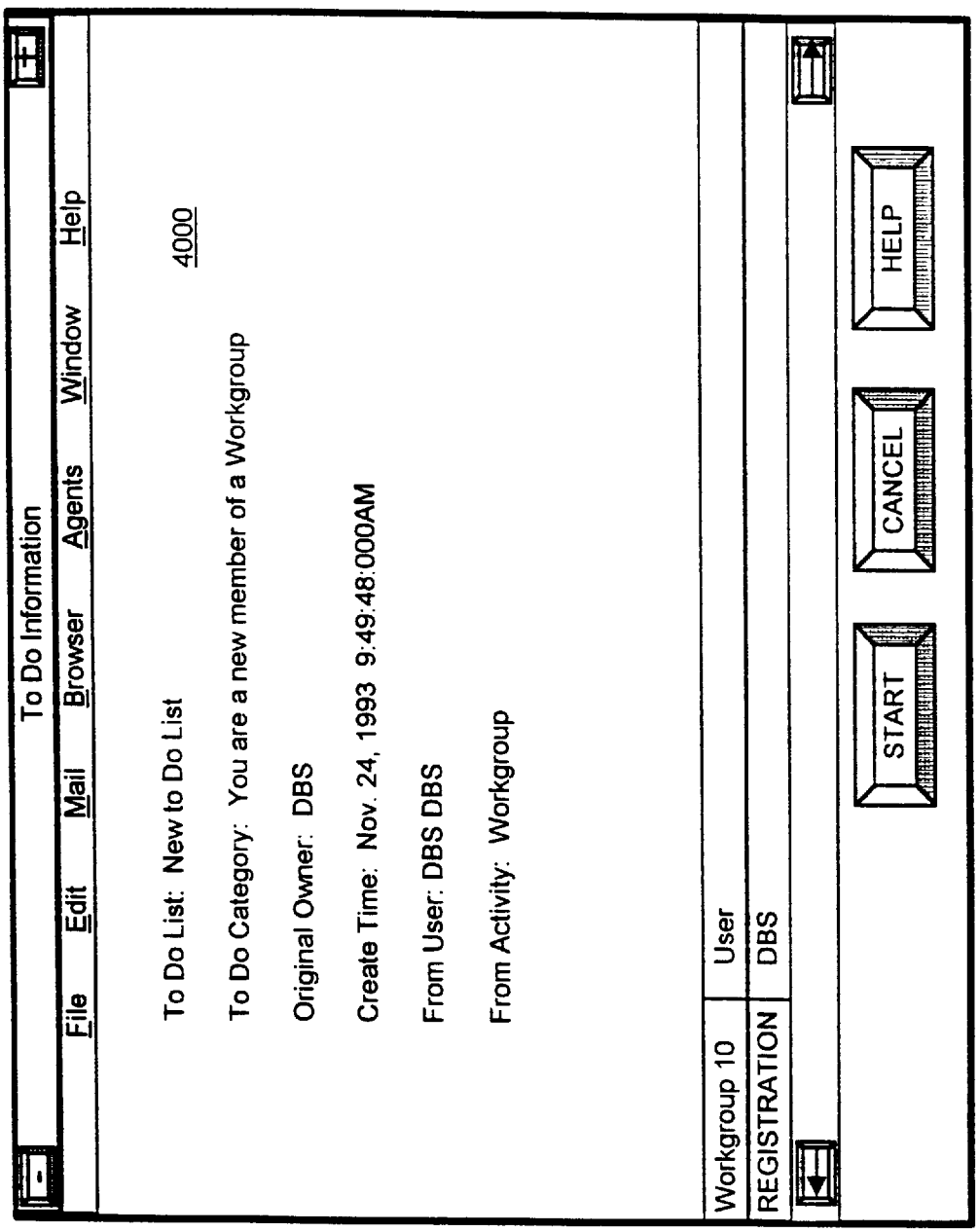
FIG. 40 depicts a computer screen, according to a preferred embodiment of the present invention, displaying a To Do Informational window which reveals detailed information on a particular next activity.

The main application program then sends the USER_ID formatted as the OWNER_ID, the OWNER_TYPE, and the FOLDERNO for the To Do List to a stored procedure. This stored procedure then calls the Next Task stored procedure, which accesses the MESSAGE_QUEUE table 1140 (see FIG. 11) with the OWNER_ID, OWNER_TYPE, MSG_ID, and FOLDERNO. This Next Task stored procedure then selects the highest prioritized next activity/task for the next activity/task category represented by its MSG_ID. Finally, the Next Task stored procedure sends the ACTIVITY_ID for the highest prioritized next activity/task from the next activity/task category back to a stored procedure. This stored procedure then accesses the MESSAGE_QUEUE table 1140 to obtain information on the user who initiated the next activity/task, also referred to as the original owner (ORIG_OWNER); the time the next activity/task was created (CREATE_TIME); the work group (MSG_GROUP_ID) responsible for the next activity/task; the user (FROM_USER_ID) who initiated the next activity/task; and the activity or next activity/task (FROM_ACT_ID) in which the next activity/task was initiated. This information is then sent back to the main application program which reveals it in the To Do Informational window 4000, as shown in FIG. 40.

According to a further aspect of the present invention, the computer system processes and prioritizes next activities/tasks for a user based on predefined conditions set by the user. These predefined conditions and actions resulting from the conditions in which the user may activate are referred to as agents.

A more complete understanding of the aforementioned component aspects of the present invention may be obtained by reference to Section IX-I, infra.

According to another aspect of the present invention, the computer system includes a job scheduler feature which allows the user to create, schedule and submit jobs to run automatically. A job is typically an executable program, a DOS batch file or the like and an example of a job is a month-end departmental report.

A more complete understanding of the aforementioned component aspects of the present invention may be obtained by reference to Sections X-I through X-III, infra.

According to yet a further aspect of the present invention, the computer system includes a mail feature. This feature allows the users to perform mail related activities including sending mail to and receiving mail from other users of the computer system of the present invention.

A more complete understanding of the aforementioned component aspects of the present invention may be obtained by reference to Section XI-I through XI-IV, infra.

According to another aspect of the present invention, the computer system includes components which may be used to support a variety of business-related activities. These components include a component which allows intelligent, high-speed access to data, and another component which provides decision-making analysis and support. Moreover, these components are designed for use in a variety of business functions including manufacturing, distribution, finance, and human resources.

A more complete understanding of the aforementioned component aspects of the present invention may be obtained by reference to Sections XIII-I through XIII-IV, infra.

To further enhance one's understanding of the computer system of the present invention, as described in the foregoing, a glossary of terms may be referenced in Sections XIV-I through XIV-III, infra. This glossary merely represents a tool for facilitating one's understanding of certain terms used to describe the computer system of the present invention but is not meant to be inclusive of all relevant terms related to the description of the present invention nor all relevant definitions to describe each term.

It is believed that the above-described description of the present invention includes enough detail so as to enable a person having ordinary skill in the relevant art to implement the underlying subject matter of the invention. Additionally, the best known mode for implementing the invention has also been disclosed. However, for completeness, selected portions of the source code for the present invention, including both PowerBuilder code and SQL stored procedures, are included and may be referenced in the accompanying Sections XV-I through XV-, infra. Many of the functions, routines, etc., which have been referenced previously by name are included in the accompanying source code listings. The details of the particular source code included in Section XV are described below.

First, Section XV-I contains the entire listing of the directory structure containing the entire source and object code files for implementing, in part, the present invention, according to a preferred embodiment. The directory structure includes files which are either cumulative to what has already been described above, or which do not directly relate to the implementation of the present invention. Accordingly, source code listing are included in the remaining Sections only for that code which may be used to implement the present invention, or is otherwise instructive for implementing the present invention. Source code which adds nothing to the implementation of the present invention is not included in the present specification.

Section XV-II, infra, contains a listing of the source code and GUI data within each application, function, window, etc., which is contained within the PowerBuilder libraries which have been used, in a preferred embodiment, to implement the present invention. Such libraries are contained in files which have ".PBL" as an extension (as listed in Section XV-I), and may readily be utilized in conjunction with the PowerBuilder development system, previously discussed. Each such library may contain a number of objects, including PowerBuilder applications, functions, graphical user interface (GUI) windows, etc. Note that each source code listing in Section XV-II begins on a new page (although some listings span more than one page), and the name of the application, function, window, etc., is included at the top of at least the first page. In some cases, and when practical as dictated by the limitations of the printing features of the PowerBuilder environment, the source code pages are numbered for each listing, and the name of the function, etc., appears on the top of each page, with other identifying information (such as the name of the directory within which the library is found, as identified in the directory listing of Section XV-I). In any event, the source code listings are logically grouped together in sequence, are commented to various degrees of detail, and are arranged so as to follow the directory listing in Section XV-I (with some omissions, as previously discussed).

Section XV-III, infra, contains a listing of the source code within the various SQL selected stored procedures which are used in one embodiment of the present invention. Such stored procedures are contained in files which have ".SP" as an extension (as listed in Section XV-I), and may readily be utilized in conjunction with SQL, previously discussed. Note that each stored procedure source code listing in Section XV-III begins on a new page (although some listings span more than one page), and the name of the stored procedure is included at the top of each page. Additionally, the page numbers for each stored procedure are included at the bottom of each page. The source code listings are logically grouped together in sequence, are commented to various degrees of detail, and are arranged so as to follow the directory listing in Section XV-III (with some omissions, as previously described).

The Smartstream Assistant and Product Request Component

According to still another aspect of the present invention, the computer system includes a product request feature. This feature allows users of the computer system to communicate electronically with the administrator of the computer system and the software vendor so that the user may ask questions, log error reports, receive system updates related to the computer system, and the like.

A more complete understanding of the aforementioned component aspects of the present invention may be obtained by reference to Section XII-I, infra. Additionally, this feature of the present invention is described in further detail below.

The product request aspect of the present invention is a tool which may be used with the invention primarily disclosed in application Ser. No. 08/213,022, in a preferred embodiment. The product request feature provides a way for the end user 4101 of the computer system to communicate electronically with the system administrator (product administrator) responsible for operating the computer system or for maintaining the specific software application. The product administrator 4102 may also be the person who is designated to act as a liaison between the end users 4101 (product users) and the customer service personnel of the vendor, and may also be an end user. In any event, the product administrator is typically the person who is an expert and/or the focal person for the software product.

As will be further explained below, the product request feature may operate to capture diagnostic information in the event that the application software encounters a serious error. This diagnostic information may then be sent to the product administrator 4102 and/or the customer support personnel of the vendor in order to solve the problem. The product administrator 4102 may utilize another feature of the present invention (hereinafter referred to for ease of reference as "SmartStream Assistant"). This feature allows the product administrator 4102 to send information generated by the end user 4101, or diagnostic information captured by the end user's 4101 computer, to and from the vendor's customer support personnel.

Figure 41:
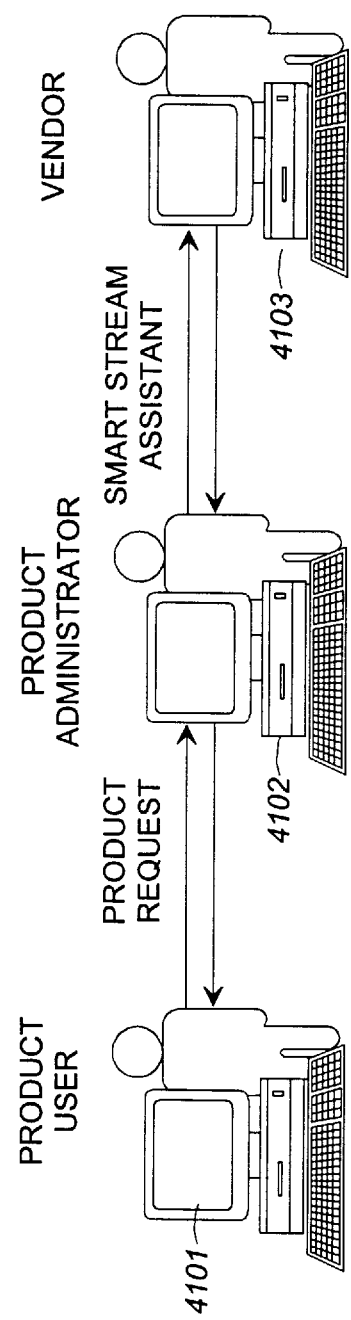
FIG. 41 depicts a block diagram of the Product Request/Smartstream Assistant feature of the present invention, in a preferred embodiment.

FIG. 41 illustrates graphically the relationship between the end user 4101, the product administrator 4102 and the vendor's customer support personnel 4103. The end user in 4101 may communicate with the product administrator 4102 by means of the product request interface. Similarly, if necessary, the product administrator 4102 may communicate with the vendor's customer support personnel by using SmartStream Assistant. In all cases, such communication may be performed purely electronically by means of the client/server network (such as generically illustrated in FIG. 1).

Figure 42:
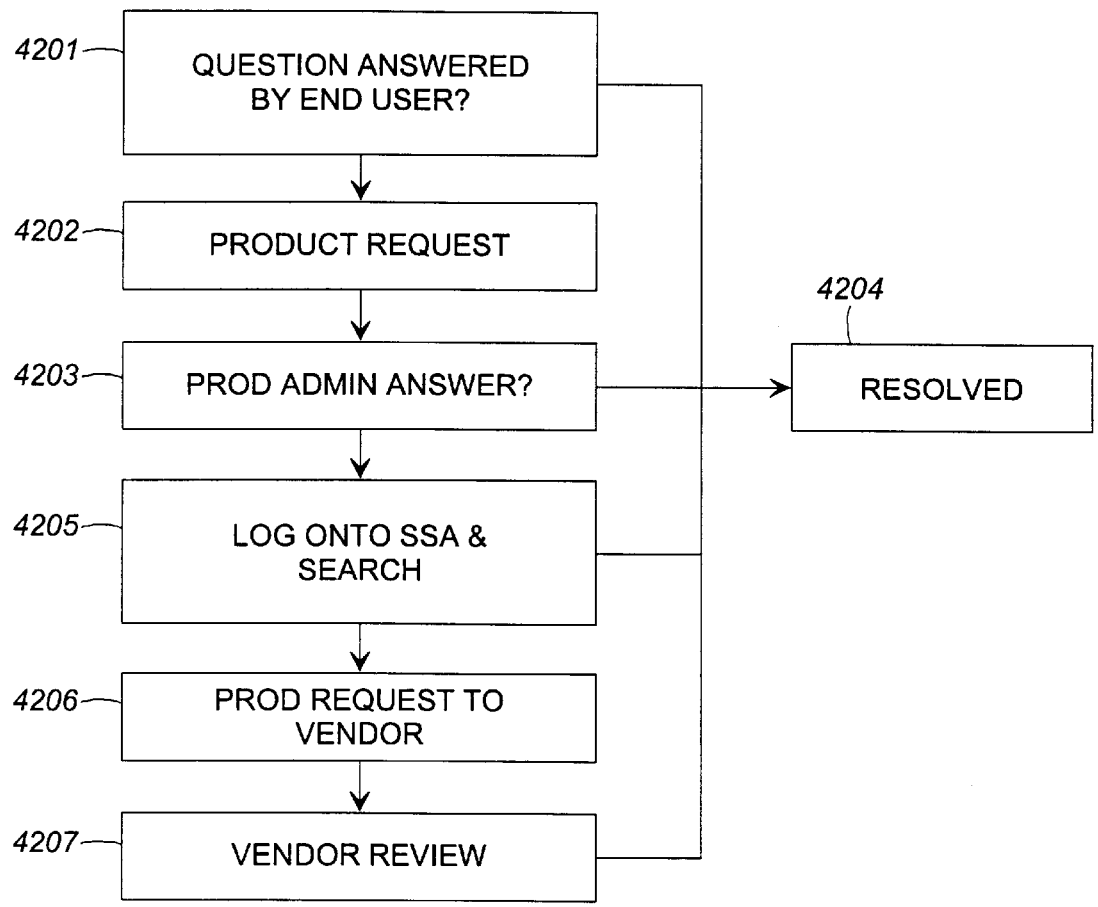
FIG. 42 is a flow diagram showing the operation of the Product Request/Smartstream Assistant feature of the present invention, in a preferred embodiment.

In practice, if an end user 4101 (product user) needs help with a question or problem, he or she can send a product request to the product administrator 4102. FIG. 42 illustrates a typical process which the end user 4101 may use in order to initially attempt to solve a problem. First, in step 4201, the user may attempt to answer the question by referring to the help system which may be available online within the software application, or may look at the application's user manual. If the end user 4101 is successful in resolving the question, step 4204 is encountered, and the process ends.

In step 4202, if the end user 4101 cannot resolve the question by him or herself, the end user 4101 records the question or problem in a "product request" (described in further detail below), and sends it to the product administrator 4102. In step 4203, the product administrator 4102 attempts to provide an answer immediately, and returns the product request to the end user 4101 with the answer. The answer has thereafter been resolved, and step 4204 is accordingly reached.

Of course, the product administrator 4102 may not be able to answer the product request by him or herself. In this case, step 4205 is encountered wherein the product administrator 4102 may log onto "SmartStream Assistant" and search the vendor's customer service resolution data base. This data base includes information concerning how to resolve problems which have already been encountered by other users and which have been placed in the data base by the vendor's personnel. If the problem is able to be resolved at this point, step 4204 is encountered.

If the product administrator 4102 is unable to find the answer to a product request in the resolution data base, he or she can log onto SmartStream Assistant and send the product request to the vendor's customer support personnel, illustrated in step 4206. In step 4207, the vendor's customer service representative reviews their request for assistance, finds a solution, and communicates it back to the product administrator in step 4207. Thereafter, step 4204 is encountered, and the problem is resolved.

The product request feature of the present invention may be accessed in a variety of ways. For example, the end user 4101 may choose to create a product request message by utilizing appropriate menus within the software application. In the invention disclosed in application Ser. No. 08/213, 022, the product request feature may be chosen from within the "help" menu. Alternatively, if the software application encounters a serious error, the product request feature may be automatically accessed. In this case, all of the diagnostic information associated with the software application at the time the error occurred is captured, and is automatically included in the product request. System and application configuration files can also be attached to the product request.

A typical product request may include the following information: identifying information, including the end user's name, identifier, telephone number, the software application name, the nature of the product request, etc.; descriptive information including a description of the problem or question by the end user (product user) and, eventually, a response by the product administrator; administrator information, including the product administrator's identification, the status and priority, and a reference number, if appropriate. Of course, these are simply samples of what may be included in a product request, and other appropriate information may also be included.

A product request may also include other components that better enable the product administrator to provide solutions and answers for the end user. For example, a product request may contain attached files (such as configuration files) and diagnostic information, as previously discussed.

In actual use, an end user may implement the product request feature of the present invention by utilizing the window depicted in FIG. 43 and the underlying database structure. The window (which in a preferred embodiment may be created within the window's operating environment), may include the product name (software application) 4301, the type of the product request 4302 (i.e., question, serious error, etc.), a description of the problem 4303, a short description of the problem 4304, information about the user 4305, and fields which may be used by a product administrator for internal use (reference number 4306).

If a serious error occurs while an end user is using the software application, a product request may automatically be created and displayed for the end user. FIG. 44 depicts a sample window which may be displayed to the end user when a serious error occurs. Referring to FIG. 44, the following components are shown within this window: user name 4401, run time diagnostic information 4402, and application diagnostic information 4403. Of course, other diagnostic information may also be included. This diagnostic information may readily be used by the product administrator in order to isolate the cause of the problem, and determine whether it truly is a bug in the software application.

In one embodiment, if the computer system is unable to generate a product request, then all of the information necessary to create the product request may be written to a file, which may later be restored as a product request.

Once a product request is created, either at the end user's request or because a serious error occurred, the product request information may be sent to the product administrator. The product administrator will typically try to answer the request and send it back to the end user as soon as possible. This may include attaching files necessary to resolve the problem. However, as previously explained, if the product administrator needs additional help, he or she may log into a data base maintained by the vendor's customer support personnel, and may search the data base to see if this problem has previously been resolved. If not, then the product administrator may forward the product request to the vendor's customer support personnel, who may work to find a solution thereto.

Figure 45:
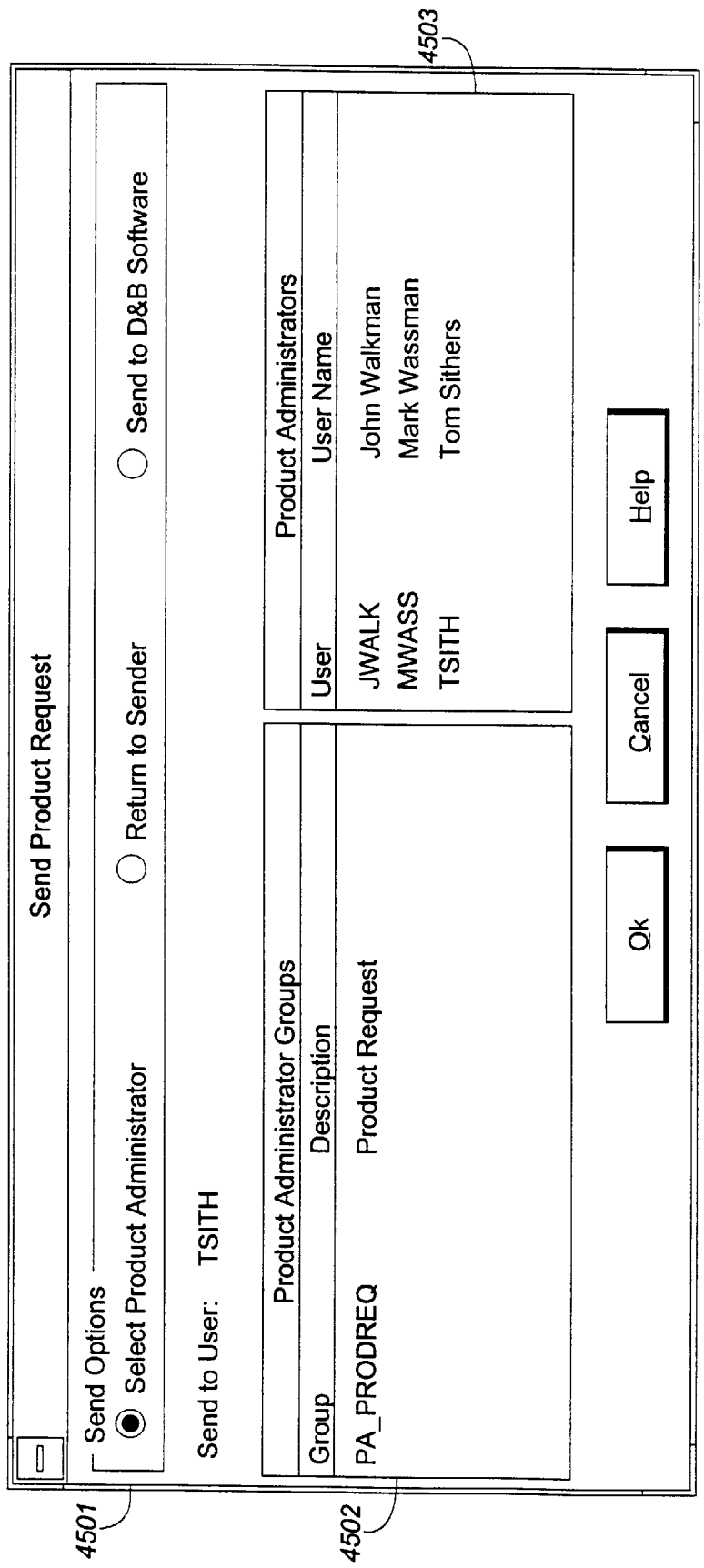

FIG. 45 depicts a window which may be used when sending the product request to the product administrator. The window of FIG. 45 includes send options 4501 by which the end user may determine where the product request is to go. If the product is to go to the product administrator (product administrator), then the end user must also select the product/administrator group 4502 and the specific user 4503 within the product administrator group 4502.

Figure 46:
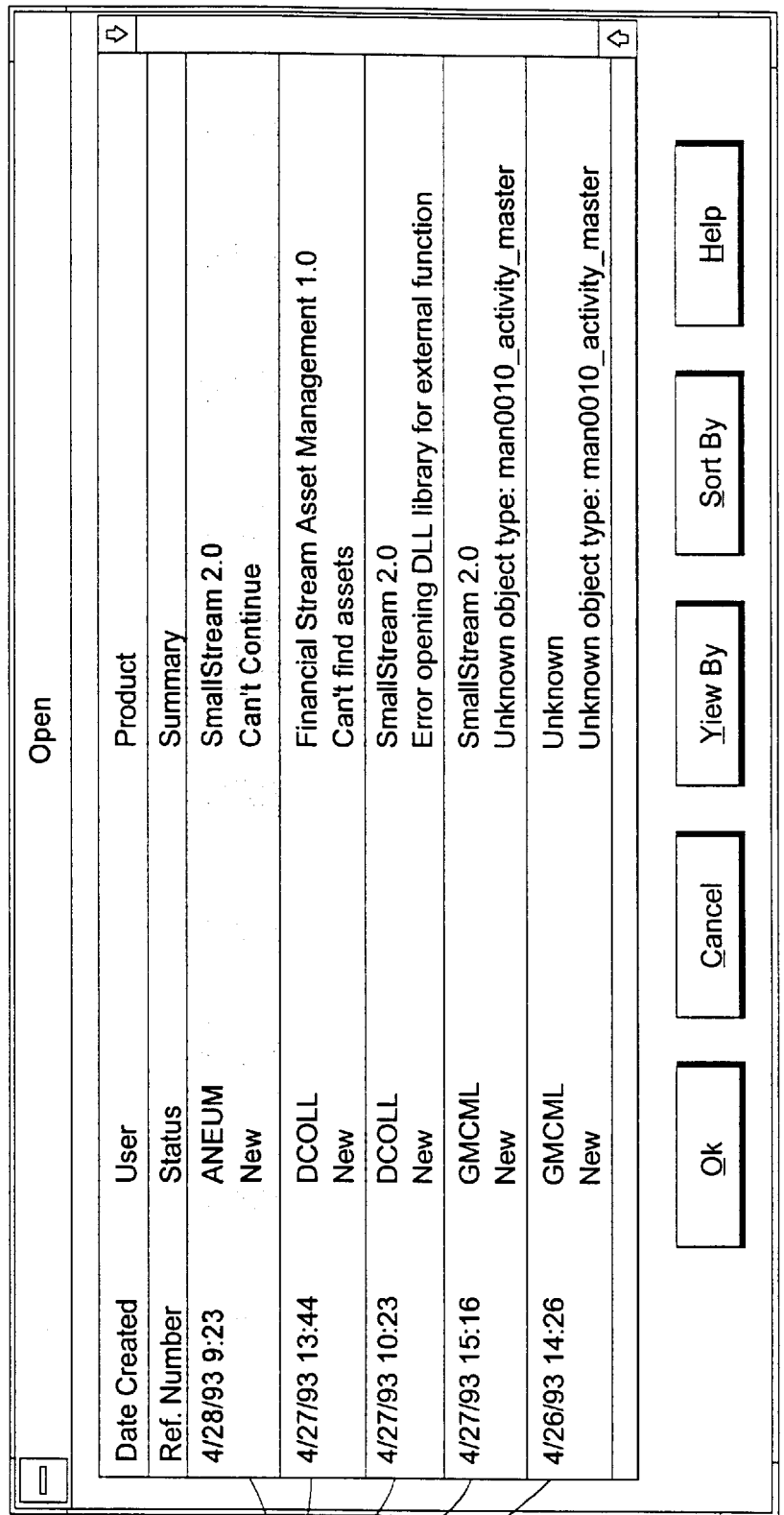

Once a product request is sent, it is maintained within a data base and may be viewed, changed, etc. FIG. 46 illustrates how to open preexisting product requests through an open product request window. This window display is a list of product requests, and may be used by the end user to find a specific product request previously submitted, or to check the status of a previously submitted product request, examine the workload, analyze trends, search for specific product requests, etc. Reference numeral 601 refers to the various entries within the window of FIG. 46.

Figure 47:
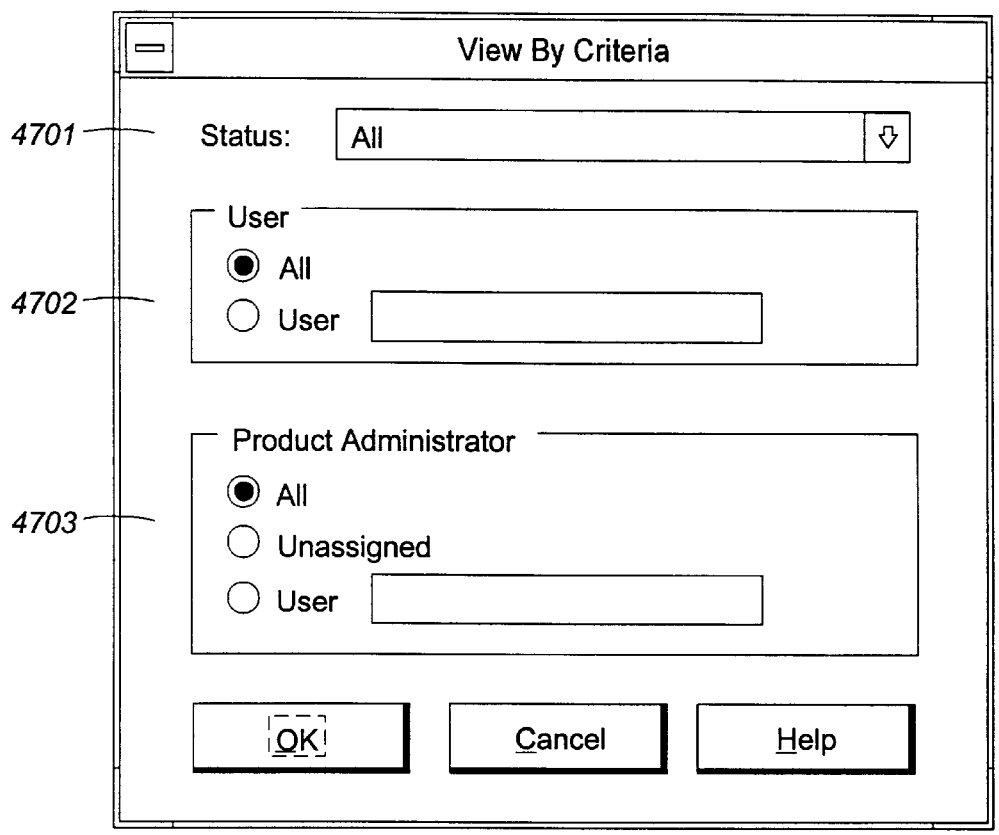

FIG. 47 illustrates a "view by" window within which product requests are listed in the open window of FIG. 46. The end user may select only those product requests having a specific status in field 4701, may select only those product requests associated with a specific user in field 4702, and may select only those product requests associated with a specific product administrator in field 4703.

Figure 48:
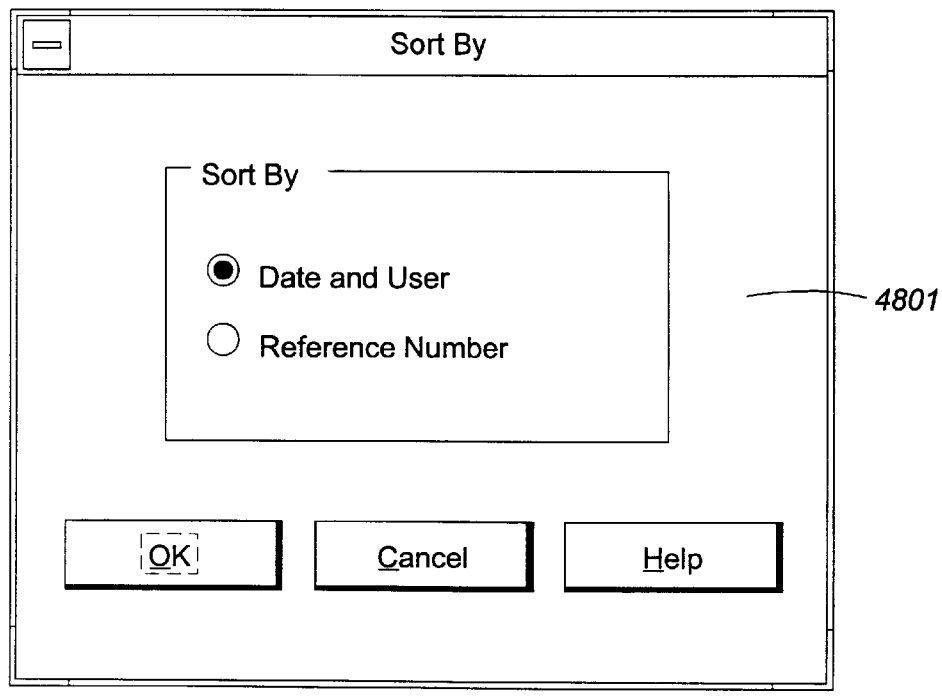

Similarly, in FIG. 48, the end user may sort the product request shown in FIG. 46 by the criteria illustrated in field 4801.

Figure 49:
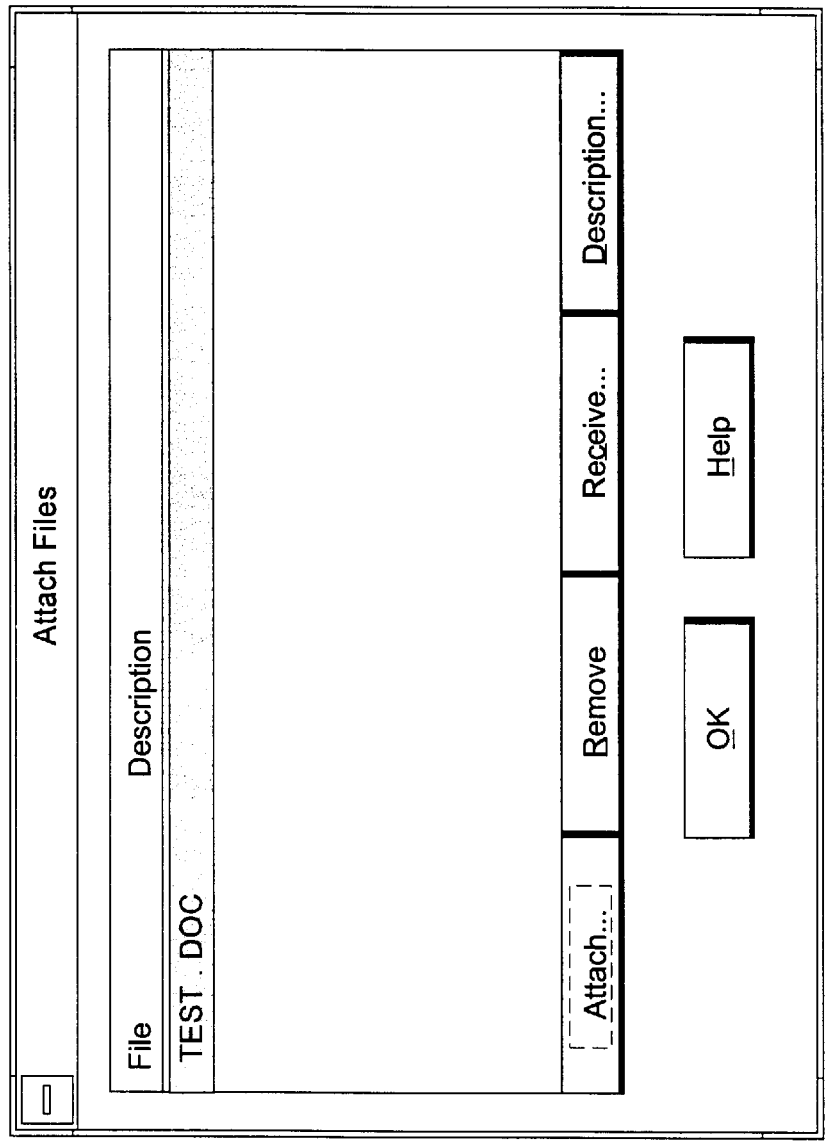
Figure 50:
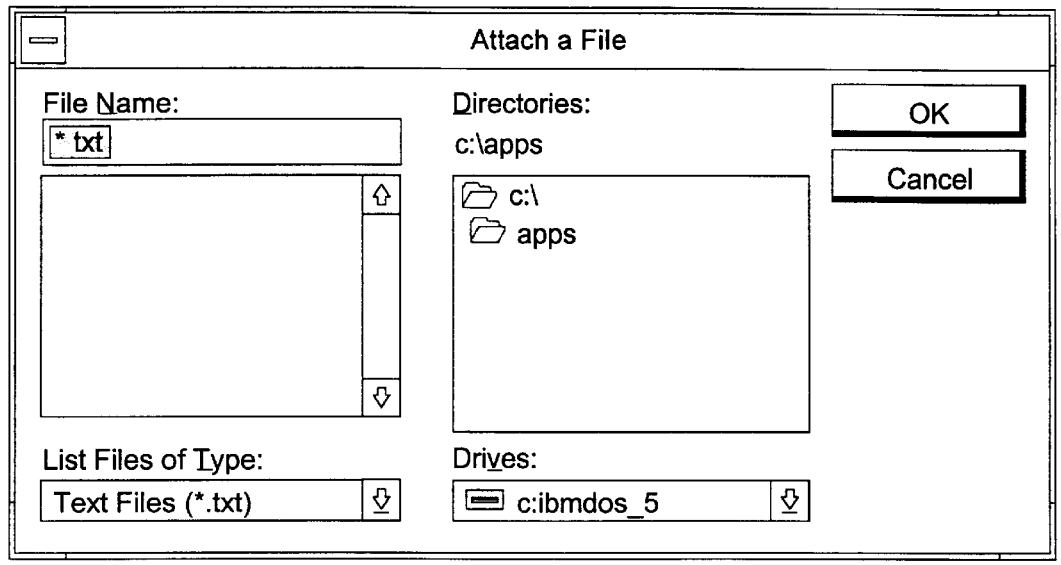
Figure 51:
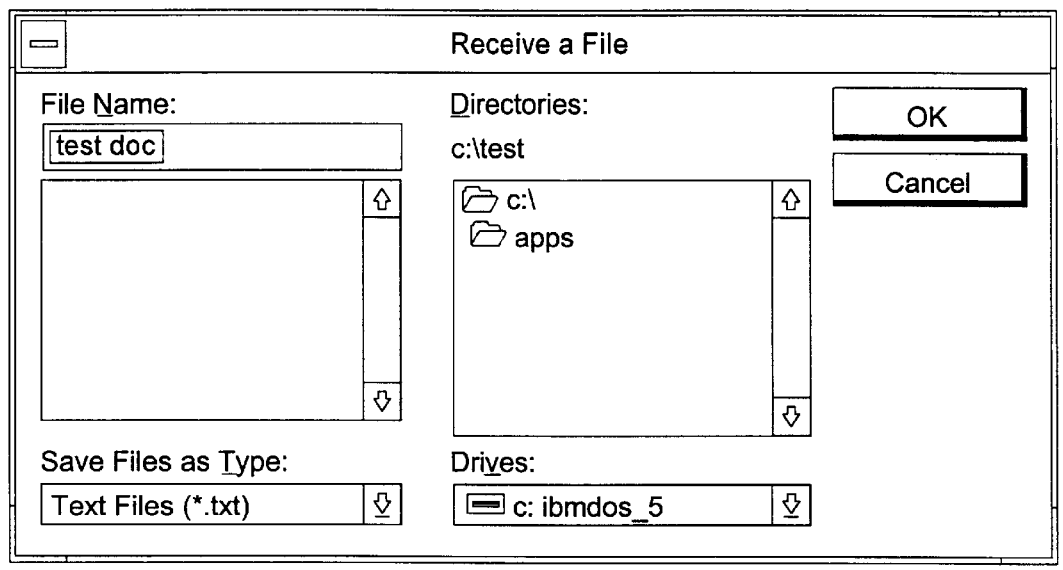
Figure 52:
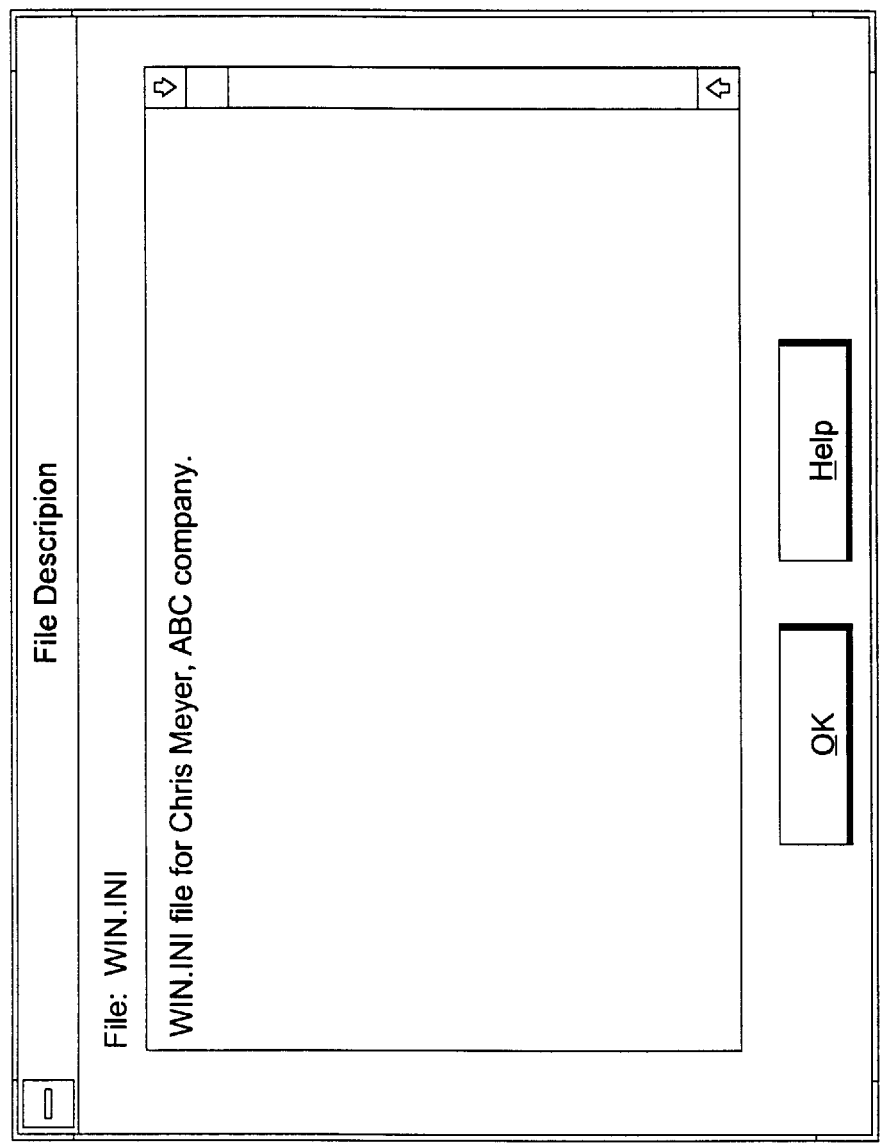

As explained previously, a file may be attached to a product request so as to assist the product administrator for the vendor's customer support personnel in resolving the problem. FIG. 49 illustrates a window which may be used to attach a file to a product request. FIG. 49 shows the list of attached files. From this window, the end user may attach other files by using the window depicted in FIG. 50. Additionally, from the window of FIG. 49 the end user may remove and attach files, copy and attach files to the end user's work station so that the end user may use other software to work with it, and enter a description about the file so that the end user and/or the product administrator can keep track of what the file contains. FIG. 51 illustrates a window which may be used by the end user to copy a file to his or her computer, while FIG. 52 illustrates the additional window which may be used by the end user to display or modify the description of an attached file.

Just as an end user (product user) may add a product request, a product administrator may also add a product request. FIG. 53 illustrates a window which the product administrator may use to change the user name and identifier to the person for whom they are adding the product request.

In a preferred embodiment, the Smartstream Assistant aspect of the present invention, previously described, may be implemented as described in Sections XVI-I and XVI-II of the accompanying appendices. Particularly, Section XVI-I is an overall design document describing Smartstream Assistant, and Section XVI-II is a technical design document describing Smartstream Assistant. Both of these documents are self-explanatory. In essense, Smartstream Assistant provides a means for communicating between the product administrator and the vendor, including accessing the vendor's databases and forwarding product requests to the vendor as appropriate, as well as receiving solutions which may include files to correct the problem.

What has been described above are preferred embodiments of the present invention. It is of course not possible to describe every conceivable combination of components or methodologies for purposes of describing the present invention, but one of ordinary skill in the art will recognize that many further combinations and permutations of the present invention are possible. All such possible modifications are to be included within the scope of the claimed invention, as defined by the appended claims below.

We claim:

1. A customer service system for resolving a inquiry concerning an end-user software application program in a computing environment, comprising:
   (a) a first computer system accessible by an end-user, wherein said first computer system includes:
      (i) a central processing unit and a data storage media communicatively linked for the communication of data therebetween,
      (ii) an end-user software application program residing on said data storage media of said first computer system and executed by said central processing unit of said first computer system, wherein said end-user software application program includes a user interface environment and an inquiry sub-program accessible by the end-user from the user interface environment during execution of the end-user software application program, said inquiry sub-program being integral with said end-user software application and enabling receipt of an inquiry from the end-user concerning an aspect of the end-user software application program, and
      (iii) a communication interface;
   (b) a second computer system accessible by an administrator, wherein said second computer system includes:
      (i) a central processing unit and a data storage media communicatively linked for the communication of data therebetween,
      (ii) an administrator software application program residing on said data storage media of said second computer system and executed by said central processing unit of said second computer system, wherein said administrator software application program includes a user interface environment and an inquiry resolution sub-program accessible by the administrator from the user interface environment, said inquiry resolution sub-program enabling the administrator to view an inquiry received from said first computer system, and
      (iii) a communication interface linked to said communication interface of the first computer system, wherein said respective communication interfaces enable the communication of an inquiry and an inquiry answer between said first and second computer systems; and,
   (c) a third computer system accessible by the administrator and a vendor representative, wherein said third computer system comprises:
      (i) a central processing unit and a data storage media communicatively linked for the communication of data therebetween,
      (ii) a data base residing on said data storage media of said third computer system and containing a plurality of inquiry answers associated with a respective plurality of inquiries, wherein said data base is accessible by said inquiry resolution sub-program of said second computer system and said inquiry answers of said plurality of inquiry answers are extractable from said data base by said inquiry resolution sub-program, and
      (iii) a communication interface linked to said respective communication interfaces of said first and second computer systems, wherein said respective communication interfaces enable the communication of an inquiry answer between said data base of said third computer system and said second computer system and between said data base of said third computer system and said first computer system.

2. The customer service system as defined in claim 1, wherein said inquiry resolution sub-program further includes a means for sending an inquiry from said second computer system to said third computer system and said third computer system further includes a vendor software application program residing on said data storage media and executed by said central processing unit for receiving an inquiry from said second computer system.

3. The customer service system as defined in claim 2, wherein an inquiry received by said third computer system from said second computer system includes the same information as an inquiry received by said second computer system from said first computer system.

4. The customer service system as defined in claim 2, wherein an inquiry received by said third computer system from said second computer system includes information specially generated by the administrator at said second computer system, and is different from an inquiry received by said second computer system from said first computer system.

5. The customer service system as defined in claim 2, wherein an inquiry received by said second computer system from said first computer system includes identification information which identifies an end-user as the originator of the inquiry, and an inquiry received by said third computer system from said second computer system includes identification information which identifies the administrator as the originator of the inquiry.

6. The customer service system as defined in claim 2, wherein said vendor application program further includes means for generating and transmitting an inquiry answer.

7. The customer service system as defined in claim 1, wherein said end-user software application program includes a help sub-program integral with the end-user software application program and accessible by the end-user from said user interface environment during execution of the end-user software application program, and wherein said inquiry sub-program is integral with said help sub-program and is accessible to the end-user from said help sub-program.

8. The customer service system as defined in claim 1, wherein said first, second, and third computer systems are part of a client/server arrangement of computer systems.

9. In a computing environment including a first computer system accessible by a first user, a second computer system accessible by a second user, and a third computer system accessible by a third user, wherein the first, second, and third computer systems are configured for intercommunication, a software problem resolution method for an end-user software application program, the method comprising the steps of:
   (a) executing an end-user software application program on the first computer system;
   (b) detecting a software error during execution of the end-user software application program;
   (c) in response to detecting a software error at step (b), capturing diagnostic information including identification of the software error and data related to the state of the first computer system and the state of the end-user software application program at the time of detection of the software error;

(d) creating a problem resolution request comprising the diagnostic information;

(e) interrupting execution of the end-user software application program upon creation of the problem resolution request;

(f) displaying the problem resolution request to the end-user at the time of interruption;

(g) communicating the problem resolution request to a second user at the second computer system;

(h) attempting to resolve the software error at the second computer system;

(i) upon failing to resolve the software error at step (h), communicating the problem resolution request from the second computer system to a third user at the third computer system;

(j) finding a resolution to the software error at the third computer system; and (k) generating a solution signal to the software error at the third computer system.

10. The software problem resolution method as defined in claim 9, further including the step of transmitting the solution signal generated at the third computer system to the second computer system for relay on to the first computer system.

11. The software problem resolution method as defined in claim 9, further including the step of transmitting the solution signal generated at the third computer system directly to the first computer system.

12. The software problem resolution method as defined in claim 9, wherein the attempting to resolve step includes searching a data base having a plurality of information items associated with the end-user software application program and corresponding solutions.

13. The software problem resolution method as defined in claim 9, wherein the finding a resolution step includes searching a data base having a plurality of information items associated with the end-user software application program and corresponding solutions.

14. The software problem resolution method as defined in claim 9, further including a step of attaching data files potentially aiding in the resolution of the software error to the problem resolution request at the first computer system prior to the step of communicating the problem resolution request to the second user at the second computer system.

15. The software problem resolution method as defined in claim 9, further including a step of displaying status information indicating whether a problem resolution request has been resolved.

16. The software problem resolution method as defined in claim 9, wherein the end-user software application program includes end-user software which manages the performance of computer-aided activities and tasks assigned to the end-user for completion by the end-user.

17. In a computing environment including a first computer system accessible by a first user, a second computer system accessible by a second user, and a third computer system accessible by a third user, wherein the first, second, and third computer systems are configured to intercommunicate, a software question resolution method for an end-user software application program the method comprising the steps of:

(a) executing an end-user software application program on the first computer system;

(b) in response to input from the first user to the end-user software application program, launching an on-line help software component of the end-user software application program at the first computer system, whereby the first user attempts to locate an answer to a software question concerning the end-user software application program;

(c) in response to input from the first user to the on-line help software component of the end-user software application program, displaying a user interface from within the help software component at the first computer system enabling the collection of information related to a software question;

(d) collecting request information at the first computer system from the first user which defines a software question regarding the operation of the end-user software application program;

(e) communicating the request information from the first computer system to a second user at the second computer system; and, (f) attempting to resolve the software question at the second computer system.

18. The software question resolution method as defined in claim 17, wherein upon resolving the software question at step (f), the method further comprises the following steps of:

generating at the second computer system a solution signal corresponding to the resolution of the software question; and, communicating the solution signal from the second computer system to the first computer system.

19. The software question resolution method as defined in claim 17, wherein upon failing to resolve the software question at step (f), the method further comprises the following steps of:

communicating the request information from the second computer system to a third user at the third computer system;

finding at the third computer system a resolution to the software question; and, generating at the third computer system a solution signal corresponding to the resolution of the software question.

20. The software question resolution method as defined in claim 19, further including the step of transmitting the solution signal generated at the third computer system to the second computer system for relay on to the first computer system.

21. The software question resolution method as defined in claim 19, further including the step of transmitting the solution signal generated at the third computer system directly to the first computer system.

22. The software question resolution method as defined in claim 19, wherein the finding a resolution step includes searching a data base at the third computer system having a plurality of information items associated with the application program and corresponding solutions.

23. The communications method as defined in claim 17, wherein the attempting to find step includes searching a data base having a plurality of request information items associated with the application program and corresponding solutions.

24. The software question resolution method as defined in claim 17, wherein the end-user software application program includes end-user software which manages the performance of computer-aided activities and tasks assigned to the end-user for completion by the end-user.

25. The software question resolution method as defined in claim 17, wherein the method further includes, prior to the step of communicating the request information from the first computer system, a step of attaching data files at the first computer system containing information potentially helpful in resolving the software question through interaction with the user interface.

* * * * *